US011280394B2

(12) United States Patent
Hoebel et al.

(10) Patent No.: US 11,280,394 B2
(45) Date of Patent: Mar. 22, 2022

(54) GEAR, MOTOR-GEAR UNIT, VEHICLE, GENERATOR WITH A GEAR, AND FORCE TRANSMITTING ELEMENT

(71) Applicant: TQ-SYSTEMS GMBH, Seefeld (DE)

(72) Inventors: Rudi Hoebel, Munich (DE); Antonius Georg Rossberger, Munich (DE)

(73) Assignee: TQ-SYSTEMS GMBH

( * ) Notice: Subject to any disclaimer, the term of this patent is extended or adjusted under 35 U.S.C. 154(b) by 0 days.

(21) Appl. No.: 16/289,703

(22) Filed: Mar. 1, 2019

(65) Prior Publication Data

US 2019/0257401 A1    Aug. 22, 2019

Related U.S. Application Data

(63) Continuation of application No. 15/241,413, filed on Aug. 19, 2016, now Pat. No. 10,247,287, which is a
(Continued)

(30) Foreign Application Priority Data

Mar. 30, 2009    (DE) .......................... 102009003695.4

(51) Int. Cl.
*F16H 49/00*      (2006.01)
*B60K 7/00*       (2006.01)
(Continued)

(52) U.S. Cl.
CPC ............ *F16H 49/001* (2013.01); *B60K 7/00* (2013.01); *B60K 7/0007* (2013.01); *F16H 7/06* (2013.01);
(Continued)

(58) Field of Classification Search
CPC ..... Y10T 74/19; F16H 49/001; F16H 49/003; F16H 1/32
(Continued)

(56) References Cited

U.S. PATENT DOCUMENTS

| 499,694 A | * | 6/1893 | Wright | ...................... | F16H 9/26 |
| | | | | | 475/182 |
| 541,713 A | * | 6/1895 | Bolton | ...................... | F16H 7/06 |
| | | | | | 474/139 |

(Continued)

FOREIGN PATENT DOCUMENTS

| AT | 372767 | 11/1983 |
| CA | 2011232 | 9/1990 |

(Continued)

OTHER PUBLICATIONS

Rossberger, Antonius Georg; International Preliminary Report on Patentability for PCT/IB2014/059999, filed Mar. 20, 2013, dated Sep. 22, 2015, 17 pgs.

(Continued)

*Primary Examiner* — Henry Y Liu
(74) *Attorney, Agent, or Firm* — Taylor English Duma LLP

(57) ABSTRACT

Disclosed is a gear including an input shaft; an output shaft an outer wheel; an inner wheel positioned concentrically in relation to the outer wheel; a pressure means extending between the outer wheel and the inner wheel; and at least one revolving transmitter configured to push the pressure means away from the inner periphery of the outer wheel and push the pressure means onto the outer periphery the inner wheel.

8 Claims, 46 Drawing Sheets

Figure 1:
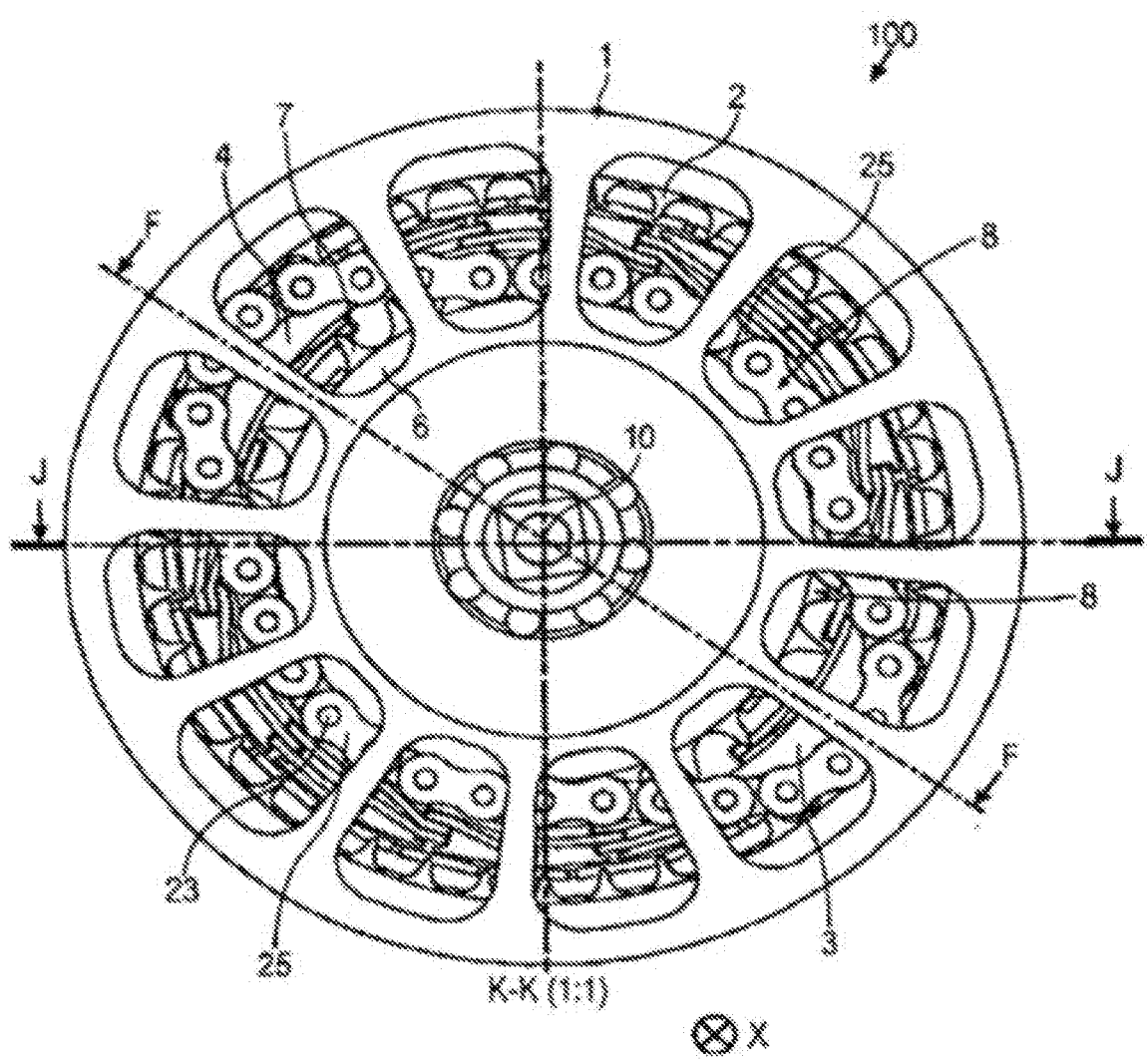

US 11,280,394 B2
Page 2

Related U.S. Application Data continuation of application No. 14/666,968, filed on Mar. 24, 2015, now Pat. No. 9,435,419, which is a continuation of application No. 13/260,917, filed as application No. PCT/IB2010/051383 on Mar. 30, 2010, now Pat. No. 9,017,198.

(51) Int. Cl.
  *H02K 7/116* (2006.01)
  *F16H 7/06* (2006.01)
  *H02K 21/12* (2006.01)

(52) U.S. Cl.
  CPC .............. *H02K 7/116* (2013.01); *H02K 21/12* (2013.01); *B60K 2007/0092* (2013.01); *F16H 2049/003* (2013.01); *Y02T 10/72* (2013.01)

(58) Field of Classification Search
  USPC .......................................................... 474/139
  See application file for complete search history.

(56) References Cited

U.S. PATENT DOCUMENTS

| | | | | |
|---|---|---|---|---|
| 550,474 A * | 11/1895 | Bolton | | F16H 7/06 474/139 |
| 573,230 A * | 12/1896 | Monkiewicz | | B62M 11/145 474/139 |
| 618,190 A * | 1/1899 | Sturgess | | F16H 48/12 74/650 |
| 1,423,028 A * | 7/1922 | Roth | | F16H 7/06 474/139 |
| 1,670,144 A * | 5/1928 | Ewart | | F16H 9/26 475/182 |
| 1,877,338 A * | 9/1932 | Kottlowski | | F16H 7/06 474/139 |
| 2,210,240 A * | 8/1940 | Herrick | | F16H 3/72 475/167 |
| 2,326,235 A * | 8/1943 | Lienhard | | B62M 3/04 475/182 |
| 2,852,954 A * | 9/1958 | Hobbs | | F16H 35/02 475/14 |
| 2,941,421 A * | 6/1960 | Plotti | | F16H 9/26 475/182 |
| 2,966,808 A * | 1/1961 | Grudin | | F16H 49/001 74/640 |
| 3,068,719 A * | 12/1962 | Singelmann | | F16H 49/001 74/640 |
| 3,148,560 A * | 9/1964 | Woodward, Jr. | | F16H 9/26 74/640 |
| 3,726,158 A * | 4/1973 | Brown | | F16H 1/32 475/167 |
| 3,861,242 A * | 1/1975 | Adams | | F16H 9/26 475/167 |
| 3,893,532 A * | 7/1975 | Perlowin | | B60L 3/0092 180/19.1 |
| 3,950,950 A * | 4/1976 | Doerner | | F01D 15/10 60/657 |
| 4,023,440 A * | 5/1977 | Kennington | | F16H 1/32 475/159 |
| 4,060,006 A * | 11/1977 | Abel | | F16G 13/00 474/207 |
| 4,194,415 A * | 3/1980 | Kennington | | F16H 1/32 475/167 |
| 4,223,757 A * | 9/1980 | Olander | | B60K 23/00 180/273 |
| 4,227,092 A * | 10/1980 | Campagnuolo | | H02K 7/116 290/1 C |
| 4,235,129 A * | 11/1980 | Takasu | | F16H 1/32 475/168 |
| 4,307,630 A * | 12/1981 | Osborn | | F16H 1/32 384/138 |
| 4,429,595 A * | 2/1984 | Butterfield | | F16D 3/04 475/168 |
| 4,471,672 A * | 9/1984 | Butterfield | | F16H 25/06 188/82.84 |
| 4,491,033 A * | 1/1985 | Carlson | | F16H 49/001 74/640 |
| 4,518,308 A * | 5/1985 | Grzybowski | | B25J 9/046 414/735 |
| 4,526,064 A * | 7/1985 | Carden | | F16H 1/32 475/167 |
| 4,567,790 A * | 2/1986 | Butterfield | | F16H 25/06 475/168 |
| 4,574,659 A * | 3/1986 | Arndt | | F16H 1/32 475/5 |
| 4,583,962 A * | 4/1986 | Bytzek | | F16H 7/1218 474/133 |
| 4,584,904 A * | 4/1986 | Distin, Jr | | F16H 1/32 475/168 |
| 4,604,916 A * | 8/1986 | Distin, Jr. | | F16H 1/32 475/168 |
| 4,715,247 A * | 12/1987 | Honda | | F16H 49/001 384/523 |
| 4,729,756 A * | 3/1988 | Zimmer | | F16G 13/06 474/214 |
| 4,807,494 A * | 2/1989 | Lew | | F16H 1/32 475/166 |
| 4,900,165 A | 2/1990 | Kun et al. | | |
| 5,123,300 A * | 6/1992 | Himmelein | | F16H 35/008 475/347 |
| 5,286,237 A * | 2/1994 | Minegishi | | F16H 1/32 475/178 |
| 5,445,572 A * | 8/1995 | Parker | | A61G 5/04 475/182 |
| 5,456,139 A * | 10/1995 | Aubin | | F16H 49/001 74/462 |
| 5,662,008 A * | 9/1997 | Aubin | | F16H 49/001 74/640 |
| 5,678,671 A | 10/1997 | Leimbach et al. | | |
| 5,772,573 A * | 6/1998 | Hao | | B04B 1/2016 184/11.2 |
| 5,860,331 A | 1/1999 | Hashimoto et al. | | |
| 5,954,611 A * | 9/1999 | Mills | | F16H 9/26 475/182 |
| 5,970,822 A * | 10/1999 | Jung | | B62M 1/00 74/810.1 |
| 6,012,347 A * | 1/2000 | Hasegawa | | B62D 5/0415 180/443 |
| 6,026,711 A | 2/2000 | Tortora et al. | | |
| 6,148,684 A | 11/2000 | Gardiner | | |
| 6,152,249 A | 11/2000 | Li et al. | | |
| 6,258,007 B1 * | 7/2001 | Kristjansson | | H02K 7/116 477/20 |
| 6,296,072 B1 * | 10/2001 | Turner | | B62M 11/18 180/220 |
| 6,328,006 B1 * | 12/2001 | Heer | | F01L 1/34 123/90.11 |
| 6,998,730 B2 | 2/2006 | Tharp | | |
| 7,249,534 B1 | 7/2007 | Devenyi | | |
| 7,377,243 B2 | 5/2008 | Meintschel et al. | | |
| 7,421,990 B2 | 9/2008 | Taye et al. | | |
| 7,631,553 B2 | 12/2009 | Heim et al. | | |
| 8,191,439 B2 | 6/2012 | Kobayashi et al. | | |
| 8,485,064 B2 | 7/2013 | Kanai | | |
| 8,656,809 B2 * | 2/2014 | Bayer | | F16H 25/06 74/640 |
| 9,017,198 B2 | 4/2015 | Hoebel | | |
| 9,140,342 B2 | 9/2015 | Hoebel et al. | | |
| 9,228,651 B2 * | 1/2016 | Waide | | F16H 49/001 |
| 10,247,287 B2 | 4/2019 | Hoebel et al. | | |
| 10,371,240 B2 | 8/2019 | Rossberger | | |
| 2003/0089186 A1 * | 5/2003 | Bogelein | | F16H 49/001 74/82 |
| 2003/0089194 A1 * | 5/2003 | Ruttor | | F16H 49/001 74/640 |
| 2003/0121363 A1 * | 7/2003 | Poehlau | | H02K 7/06 74/640 |
| 2003/0220165 A1 * | 11/2003 | He | | F16G 9/00 474/203 |

(56) References Cited

U.S. PATENT DOCUMENTS

| | | | |
|---|---|---|---|
| 2004/0059331 A1* | 3/2004 | Mullaney | A61B 17/6458 606/59 |
| 2006/0027201 A1 | 2/2006 | Ryou | |
| 2006/0046889 A1* | 3/2006 | Christensen | F16H 37/041 475/170 |
| 2006/0135305 A1* | 6/2006 | Erez | F16H 49/001 474/202 |
| 2006/0283289 A1* | 12/2006 | Baudendistel | H02K 41/06 74/640 |
| 2007/0039414 A1* | 2/2007 | Takemura | F16H 49/001 74/640 |
| 2007/0051187 A1 | 3/2007 | McDearmon | |
| 2007/0101820 A1* | 5/2007 | Bulatowicz | F16H 49/001 74/640 |
| 2007/0158497 A1* | 7/2007 | Edelson | B64C 25/405 244/103 S |
| 2008/0161142 A1* | 7/2008 | Shiozaki | F02B 61/02 474/70 |
| 2008/0251302 A1 | 10/2008 | Lynn | |
| 2008/0254929 A1* | 10/2008 | Wesling | B62M 9/16 475/182 |
| 2009/0284089 A1* | 11/2009 | Wingett | H02K 7/116 310/77 |
| 2010/0012407 A1* | 1/2010 | Oba | B60K 6/445 180/65.23 |
| 2010/0024593 A1* | 2/2010 | Schmidt | F16H 25/06 74/640 |
| 2011/0039650 A1* | 2/2011 | Rosemeier | B60L 15/2009 475/149 |
| 2011/0088496 A1* | 4/2011 | Cho | F16H 49/001 74/411 |
| 2011/0187179 A1 | 8/2011 | Zwarts et al. | |
| 2012/0046140 A1* | 2/2012 | Shelef | F16H 49/001 475/182 |
| 2012/0270692 A1 | 10/2012 | Hoebel | |
| 2013/0276575 A1 | 10/2013 | Hoebel | |
| 2013/0288848 A1 | 10/2013 | Carter et al. | |
| 2015/0276036 A1 | 10/2015 | Hoebel | |
| 2016/0245386 A1 | 8/2016 | Rossberger | |
| 2016/0356374 A1 | 12/2016 | Hoebel | |
| 2020/0063793 A1 | 2/2020 | Rossberger | |
| 2021/0332869 A1 | 10/2021 | Rossberger | |

FOREIGN PATENT DOCUMENTS

| | | |
|---|---|---|
| CN | 102365474 | 2/2012 |
| DE | 8513367 | 6/1986 |
| DE | 3738521 | 12/1988 |
| DE | 102009003695.4 | 3/2009 |
| DE | 102009033790.3 | 7/2009 |
| DE | 202009011082.6 | 9/2009 |
| DE | 102010000318.0 | 3/2010 |
| DE | 102014115043 | 4/2016 |
| EP | 0316713 | 5/1989 |
| EP | 0984201 | 3/2000 |
| EP | 2672147 | 12/2013 |
| JP | 48-031368 | 4/1972 |
| JP | S4831368 | 4/1973 |
| JP | S59187152 | 10/1984 |
| JP | S61547 | 1/1986 |
| JP | 1261537 | 10/1989 |
| JP | H02271144 | 11/1990 |
| JP | H10-100372 | 4/1998 |
| JP | 11-079627 | 3/1999 |
| JP | H1179627 | 3/1999 |
| JP | 11227665 | 8/1999 |
| JP | 2005330990 | 12/2005 |
| JP | 2006522294 | 9/2006 |
| JP | 2007155076 | 6/2007 |
| JP | 2007205397 | 8/2007 |
| JP | 2008174069 | 7/2008 |
| KR | 20100070607 | 6/2010 |
| WO | 1999037017 | 7/1999 |
| WO | 2004088166 | 10/2004 |
| WO | 2006119033 | 11/2006 |
| WO | 2010113115 | 10/2010 |
| WO | 2012046216 | 4/2012 |
| WO | 2014060974 | 4/2014 |
| WO | 2014060975 | 4/2014 |
| WO | 2014147583 | 9/2014 |
| WO | 2018096521 | 3/2018 |
| WO | 2019229574 | 12/2019 |

OTHER PUBLICATIONS

Rossberger, Antonius Georg; International Search Report for PCT/IB2014/059999, filed Mar. 20, 2013, dated Jul. 8, 2014, 44 pgs.

Rossberger, Antonius Georg; Non-Final Office Action for U.S. Appl. No. 14/778,404, filed May 17, 2016, dated May 30, 2018, 11 pgs.

Rossberger, Antonius Georg; Notice of Allowance for U.S. Appl. No. 14/778,404, filed May 17, 2016, dated Mar. 20, 2019, 7 pgs.

Hoebel, Rudi; Chinese Office Action for serial No. 201180057084.7, filed Oct. 7, 2010, dated Mar. 30, 2015, 8 pgs.

Hoebel, Rudi; Extended European Search Report for serial No. 11830282.7, filed May 7, 2013, dated Mar. 16, 2018, 18 pgs.

Hoebel, Rudi; International Preliminary Report on Patentability for PCT/IB2011/054431, filed Oct. 7, 2011, dated Apr. 9, 2013, 7 pgs.

Hoebel, Rudi; International Search Report and Written Opinion for PCT/IB2011/054431, filed Oct. 7, 2011, dated Mar. 8, 2012, 11 pgs.

Hoebel, Rudi; Issue Notification for U.S. Appl. No. 13/857,277, filed Apr. 5, 2013, dated Sep. 2, 2015, 1 pg.

Hoebel, Rudi; Non-Final Office Action for U.S. Appl. No. 13/857,277, filed Apr. 5, 2013, dated Dec. 4, 2014, 17 pgs.

Hoebel, Rudi; Notice of Allowance for U.S. Appl. No. 13/857,277, filed Apr. 5, 2013, dated May 19, 2015, 11 pgs.

Hoebel, Rudi; Australian Patent Examintion Report for serial No. 2010231573, filed Mar. 30, 2010, dated Apr. 24, 2014, 5 pgs.

Hoebel, Rudi; Chinese Office Action for serial No. 201080015450, filed Mar. 30, 2010, dated Apr. 2, 2014, 7 pgs.

Hoebel, Rudi; Chinese Office Action for serial No. 201080015450, filed Mar. 30, 2010, dated Sep. 25, 2014, 8 pgs.

Hoebel, Rudi; Corrected Notice of Allowability for U.S. Appl. No. 13/260,917, filed Jul. 4, 2012, dated Jan. 8, 2015, 13 pgs.

Hoebel, Rudi; European Search Report for U.S. Appl. No. 10/758,136, published on Feb. 8, 2012, dated Jul. 30, 2012, 20 pgs.

Hoebel, Rudi; International Preliminary Report on Patentability for PCT/IB2010/051383, filed Mar. 30, 2010, dated Oct. 4, 2011, 5 pgs.

Hoebel, Rudi; International Search Report and Written Opinion for PCT/IB2010/051383, filed Mar. 30, 2010, dated Feb. 1, 2011, 6 pgs.

Hoebel, Rudi; Issue Notification for U.S. Appl. No. 13/260,917, filed Jul. 4, 2012, dated Apr. 8, 2015, 1 pg.

Hoebel, Rudi; Japanese Office Action for serial No. 2012502862, published Sep. 20, 2012, dated Jan. 16, 2014, 5 pgs.

Hoebel, Rudi; Non-Final Office Action for U.S. Appl. No. 13/260,917, filed Jul. 4, 2012, dated Aug. 12, 2014, 13 pgs.

Hoebel, Rudi; Notice of Allowance for U.S. Appl. No. 13/260,917, filed Jul. 4, 2012, dated Dec. 24, 2014, 16 pgs.

Hoebel, Rudi; Issue Notification for U.S. Appl. No. 14/666,968, filed Mar. 24, 2015, dated Aug. 17, 2016, 1 pg.

Hoebel, Rudi; Notice of Allowance for U.S. Appl. No. 14/666,968, filed Mar. 24, 2015, dated May 18, 2016, 29 pgs.

Hoebel, Rudi; Restriction Requirement for U.S. Appl. No. 14/666,968, filed Mar. 24, 2015, dated Feb. 26, 2016, 8 pgs.

Hoebel, Rudi; Final Office Action for U.S. Appl. No. 15/241,413, filed Aug. 19, 2016, dated Feb. 28, 2018, 12 pgs.

Hoebel, Rudi; Issue Notification for U.S. Appl. No. 15/241,413, filed Aug. 19, 2016, dated Mar. 13, 2019, 1 pg.

Hoebel, Rudi; Non-Final Office Action for U.S. Appl. No. 15/241,413, filed Aug. 19, 2016, dated Oct. 16, 2017, 26 pgs.

Hoebel, Rudi; Notice of Allowance for U.S. Appl. No. 15/241,413, filed Aug. 19, 2016, dated Nov. 16, 2018, 10 pgs.

Hoebel, Rudi; Office Action for Japanese patent application No. 2017-225779, filed Nov. 24, 2017, dated Dec. 17, 2018, 7 pgs.

Hoebel, Rudi; Restriction Requirement for U.S. Appl. No. 15/241,413, filed Aug. 19, 2016, dated Jul. 25, 2017, 8 pgs.

(56) References Cited

OTHER PUBLICATIONS

Hoebel, Rudi; Australian Patent Examination Report for serial No. 2011311151, filed Oct. 7, 2011, dated Jun. 6, 2014, 2 pgs.
TQ-Systems GmbH; Office Action for European application No. 13177924.1, filed Jul. 25, 2013, dated Dec. 17, 2018, 11 pgs.
Alfred Boge;"Vieweg Taschenlexikon Technik: Maschinenbau, Elektrotechnik, Datentechnik" In: Vieweg Taschenlexikon Technik: Maschinenbau, Elektrotechnik, Datentechnik, Vieweg +Teubner Verlag , pp. 339-339, Dec. 31, 2003 (Dec. 31, 2003).
Rossberger, Antonius Georg; International Search Report and Written Opinion for PCT/IB2017/057452, filed Nov. 28, 2017, dated Aug. 7, 2018, 22 pgs.
TQ Systems GmbH; Office Action for Japanese patent application No. 2019-141004, filed Jul. 31, 2019, dated Aug. 24, 2020, 9 pgs.
TQ Systems GmbH; Office Action for Chinese application No. 201780073655.3, dated Jun. 29, 2020, 5 pgs.
TQ-Systems GmbH; Notice of Allowance for Japanese patent application No. 2019-141004, dated Dec. 21, 2020, 4 pgs.
Rossberger, Antonius Georg; International Preliminary Report on Patentability for PCT/IB2019/054085, filed May 17, 2019, dated Dec. 1, 2020, 45 pgs.
Rossberger, Antonius Georg; International Search Report and Written Opinion for PCT/IB2019/054085, filed May 17, 2019, dated Sep. 25, 2019, 53 pgs.
Rossberger, Antonius Georg; Non-Final Office Action for U.S. Appl. No. 16/462,744, filed May 21, 2019, dated Apr. 26, 2021, 55 pgs.
TQ-Systems GmbH; Office Action for Japanese patent application No. 2019-528689, dated Sep. 21, 2021, 5 pgs.
Rossberger, Antonius Georg; Notice of Allowance for U.S. Appl. No. 16/462,744, filed May 21, 2019, dated Nov. 8, 2021, 17 pgs.
TQ Systems, Inc; Office Action for Chinese patent application No. 201980036472.3, dated Nov. 3, 2021, 18 pgs.

* cited by examiner

GEAR, MOTOR-GEAR UNIT, VEHICLE, GENERATOR WITH A GEAR, AND FORCE TRANSMITTING ELEMENT

This application is a Continuation of U.S. application Ser. No. 15/241,413, filed Aug. 19, 2016, which is a Continuation of U.S. application Ser. No. 14/666,968, filed Mar. 24, 2015, which issued into U.S. Pat. No. 9,435,419 on Sep. 6, 2016, which is a Continuation of U.S. application Ser. No. 13/260,917, filed Jul. 4, 2012, which issued into U.S. Pat. No. 9,017,198 on Apr. 28, 2015, and which is a U.S. National Stage application of International PCT Application No. PCT/IB2010/051383, filed Mar. 30, 2010.

The present application relates to a gear having an input shaft and an output shaft. More particularly, the present application relates to a motor-gear unit with such a gear and to a motor vehicle with such a motor-gear unit. The present application also relates to an electric generator with a drive unit such as an internal combustion engine or such as a propeller for water or wind, further having a generator unit for generating electricity and having a gear in accordance with the application.

The present application provides an improved gear, motor-gear unit, vehicle, generator with a gear, and force transmitting element.

The gear has an input shaft and an output shaft and also an outer wheel and an inner wheel which is positioned concentrically in relation to the outer wheel and often inside the outer wheel. There is also a ring-shaped or cylindrical or elliptic traction provided that extends between the outer wheel and the inner wheel. A revolving transmitter lifts or drags the traction means away from the outer periphery of the inner wheel and pushes it onto the inner periphery of the outer wheel. This is a simple and reliable setup for a gearbox which can provide high gear ratios.

There are many ways for connecting the input shaft and the output shaft to the gear. It is especially advantageous to connect the input shaft to the transmitter and to connect the output shaft to the inner wheel or to the outer wheel. The wheel which is not connected to the output shaft needs then to be kept steady or connected with a housing of the gear.

Alternatively, one can also connect the input shaft with the outer wheel or the inner wheel, while the output shaft is connected to the transmitter. The wheel which is not connected to the input shaft needs then to be kept steady or connected with a housing of the gear. This arrangement needs to be carefully designed in order to avoid self-locking of the transmitter but this is especially useful for converting high input torques from slow power sources into high rotational frequencies as often needed by electrical generators.

The traction means can be provided as a closed chain of rotatably interconnected links such as a bolt chain or a roller chain.

It is not only possible to provide the chain as a single chain nut also as a double or triple chain. One advantage of such a double chain or triple chain is that the transmitter can be provided in an axial plane that is different from the axial planes of the inner wheel or outer wheel. Higher gear ratios can then be provided.

The gear can be provided as a one row gear design wherein the traction means has one single radial section that is provided both for the contact with the outer wheel and for the inner wheel. In the one row gear design, the transmitter often contacts the traction means from within the gap between the inner wheel and the outer wheel. The transmitter, the inner wheel, the outer wheel as well as the traction means respectively the pressure means are located essentially in the same axial plane which makes the design axially symmetric.

In an axially asymmetric two row gear design, the inner wheel and the outer wheel are often located in different axial planes, wherein the transmitter is either located in the axial plane of the inner wheel or in the axial plane of the outer wheel. The traction means then extends axially between the axial planes of the inner wheel and the outer wheel, contacting both the inner wheel and the outer wheel at different sections of their respective circumferences.

In a three row gear design, the two pairs of an inner wheel and an outer wheel are often located in different axial planes, wherein the transmitter is located in a third axial plane between the two pairs of an inner wheel and an outer wheel. One can also think of a three row gear design with two inner wheels and one outer wheel or—alternatively—also with two outer wheels and one inner wheel. In a further alternative, it is also possible to provide a double row transmitter with two transmitter sections, wherein each transmitter section is provided in an axial plane which is different from the axial plane of the inner wheel. The traction means then extends axially between the axial planes of the outer wheels and the inner wheel, contacting both the inner wheel and the outer wheels at different sections of their respective circumferences.

It is also possible to provide a axially symmetric three row gear design with two outer wheels and one inner wheel, that are located in different axial planes, wherein the transmitter is located in the axial plane of the inner wheel. It is then also possible to provide a double row transmitter with two transmitter sections, wherein each transmitter section is provided in the axial plane of each outer wheel. The traction means then extends axially between the axial planes of the inner wheels and the outer wheel, contacting both the inner wheels and the outer wheel at different sections of their respective circumferences.

The traction means may also comprise at least one continuous elliptic traction element that can also be a deformable circular ring or cylinder. Such a traction means is easy to manufacture, especially if the traction element is provided in the form of a flexible belt, possibly with teeth. Such a traction element is often made from plastic or rubber which provided on a metal meshing or a woven or non-woven fabric.

In a very advantageous form, the traction element comprises a thin and flexible spline element, that is possibly provided with teeth and it can also be made from plastic. The flexible spline element may comprise a multitude of pins that stand proud of or protrude from at least one axial surface of the spline element and that are coaxially arranged with the flexible spline element. With such a traction element, extremely high gear ratios can be achieved because the difference between the diameter of the outer wheel and the diameter of the inner wheel can be made almost as small as the diameter of the pins.

The transmitter or the transmitters may be positioned on a rotatable transmitter carrier by mounting them concentrically in relation to the outer wheel and the inner wheel. As said before, the transmitter carrier is preferably connected to the input shaft or to the output shaft for achieving high transmission ratios.

The transmitters can be each mounted on a shaft such that they are able to rotate while the shafts are provided on the transmitter carrier. Alternatively, the transmitter may be fixed to the transmitter carrier, wherein the traction means comprises a multitude of rotatable contact elements such as rollers on chain bolts.

It also possible to provide the transmitters eccentrically from the rotation axis of the transmitter carrier such that the rotation axis of the transmitter is positioned off the rotation axis of the transmitter carrier. This provides for new shapes of the outer surface of the transmitters that are easy to manufacture.

Alternatively, the rotation axis of the transmitter may essentially coincide with the rotation axis of the transmitter carrier, wherein a contact surface of the transmitter facing towards the traction means is provided with an essentially elliptic shape. Providing an essentially elliptic shape includes that a non-circular flat surface is provided which is round such that a bearing or a number of balls can be arranged between the contact surface and the traction means.

In one possible use of the gear, an electric motor is provided, a rotor of the electric motor being connected to the input shaft of the gear. For lightweight vehicles, often a DC brushless motor with a radial gap is provided, but other types of motors and also internal combustion engines apply as well, as described below with the embodiments. The DC brushless motor is easy to provide with the gear of the application because the gear housing can be the motor housing at the same time.

A vehicle, in particular a two- or three-wheeled vehicle, can be equipped with such a motor-gear unit, wherein at least one driven wheel of the vehicle is connected to the output shaft of the gear.

The gear may also be used for an electric generator with a drive unit such as an internal combustion engine or a propeller for water or wind and with a generator unit for generating electricity. An input shaft of the gear is then connected to the drive unit and an output shaft of the gear being connected to an input shaft of the generator.

An advantageous transmitter assembly for contacting a traction means in a gear comprises one or more first transmitter elements and one or more a second transmitter elements that are provided on a rotatable transmitter carrier that is mounted concentrically in relation to the outer wheel and the inner wheel and that is preferably being connected to the input shaft or to the output shaft for achieving high transmission ratios. The transmitter elements are each mounted on a shaft such that they can rotate on the transmitter carrier. The first transmitter element and the second transmitter element are provided eccentrically from the rotation axis of the transmitter carrier. Such an arrangement allows for new shapes of the transmitter which provides some extra degrees of freedom for the design of a gear.

It is then possible to tighten or tension the transmitter with the two transmitter elements by shifting them with respect to each other. A guide for shifting the first transmitter element with respect to the second transmitter element may therefore be provided, as well as transmitter adjustment slits with a guiding element, the guiding elements being either provided in carrier adjustment slits in the transmitter carrier or the guiding elements being taken up by guiding slits in adjacent transmitter elements.

In an alternative form, the gear of the application is provided with an input shaft and with an output shaft, wherein the at least one revolving transmitter pushes the pressure means away from the inner periphery of the outer wheel and pushes the pressure means onto the outer periphery the inner wheel. This gear is very similar to the other alternative where the transmitter shifts the traction means away from the outer periphery of the inner wheel into the inner periphery the outer wheel. Most of the design elements of the other gear can be used for the gear with the pressure means, except that the pressure means needs to be able to transmit compressive forces. This is why many chains with movable links cannot be used as a pressure means.

The application also provides a thin and flexible spline element for a gear, the spline element comprising a multitude of pins that stand proud of or protrude from at least one axial surface of the spline element and that are coaxially arranged with the flexible spline element. The multitude of pins may also stand proud of both axial surfaces of the spline element. A flexible spline element in which the multitude of pins are provided in a multitude of axial cylindrical orifices is easy to manufacture. It has turned out that it is advantageous to make the pins from steel, that is later hardened, and the spline element from aluminium.

Figure 2:
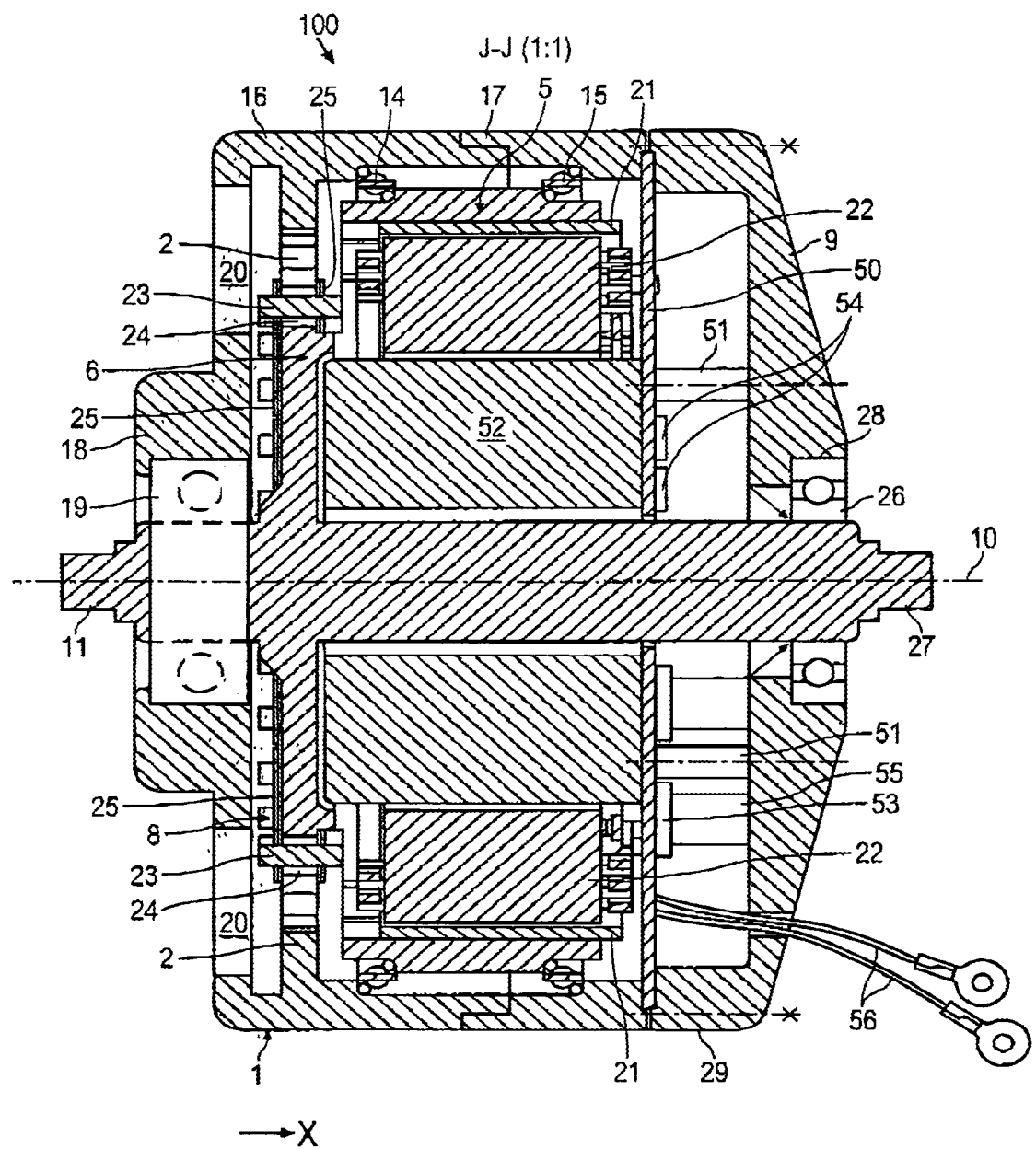
Figure 3:
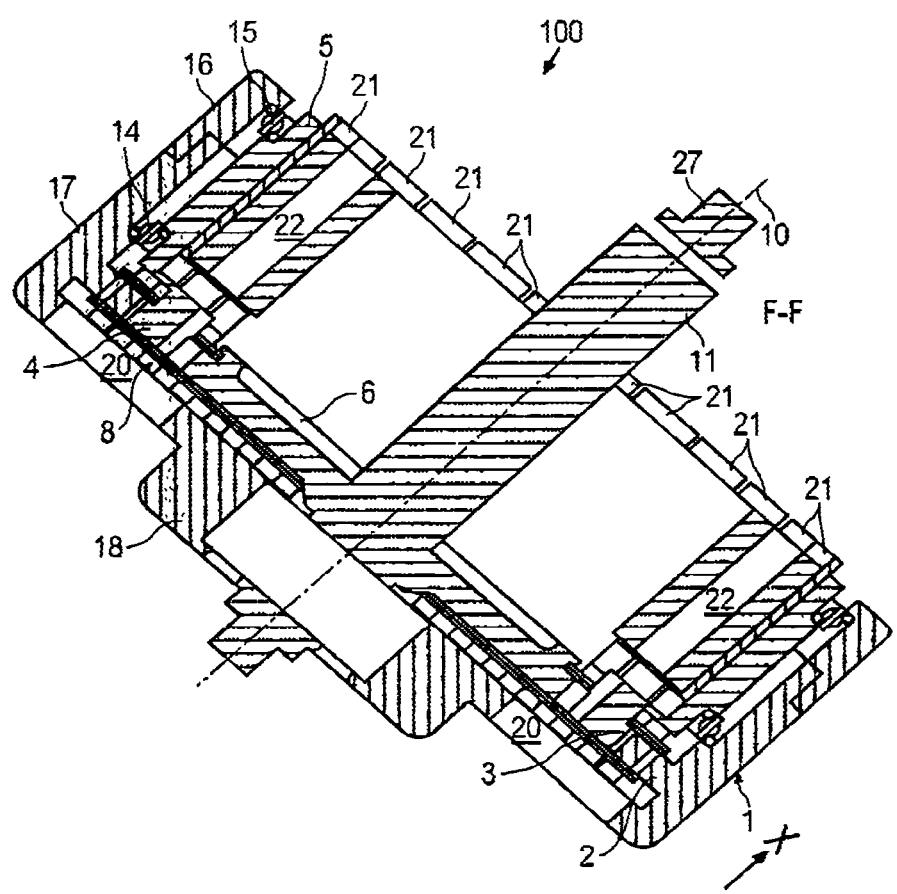
Figure 4:
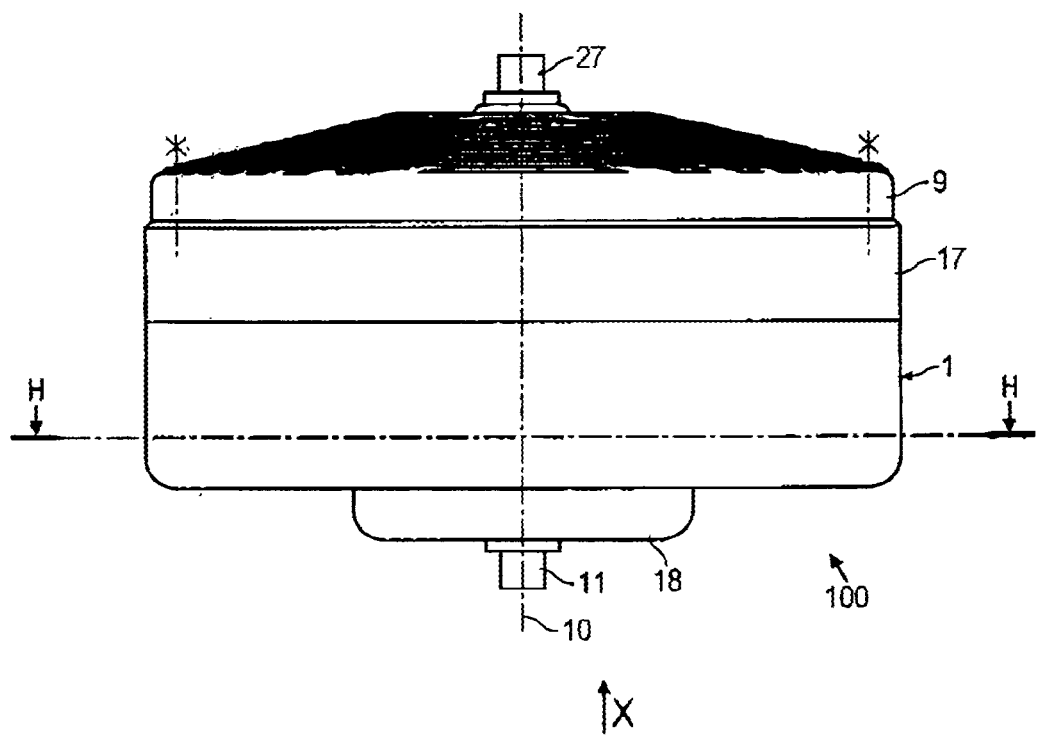
Figure 5:
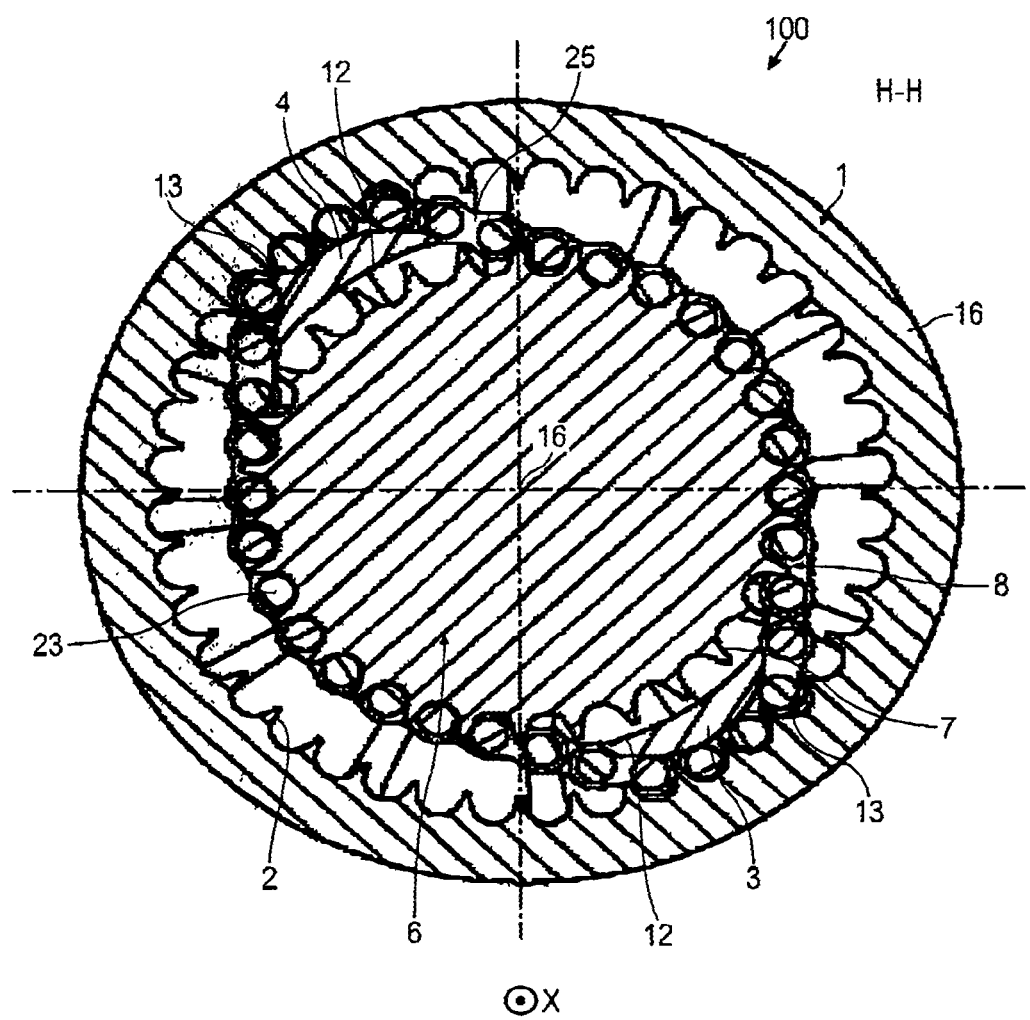
Figure 6:
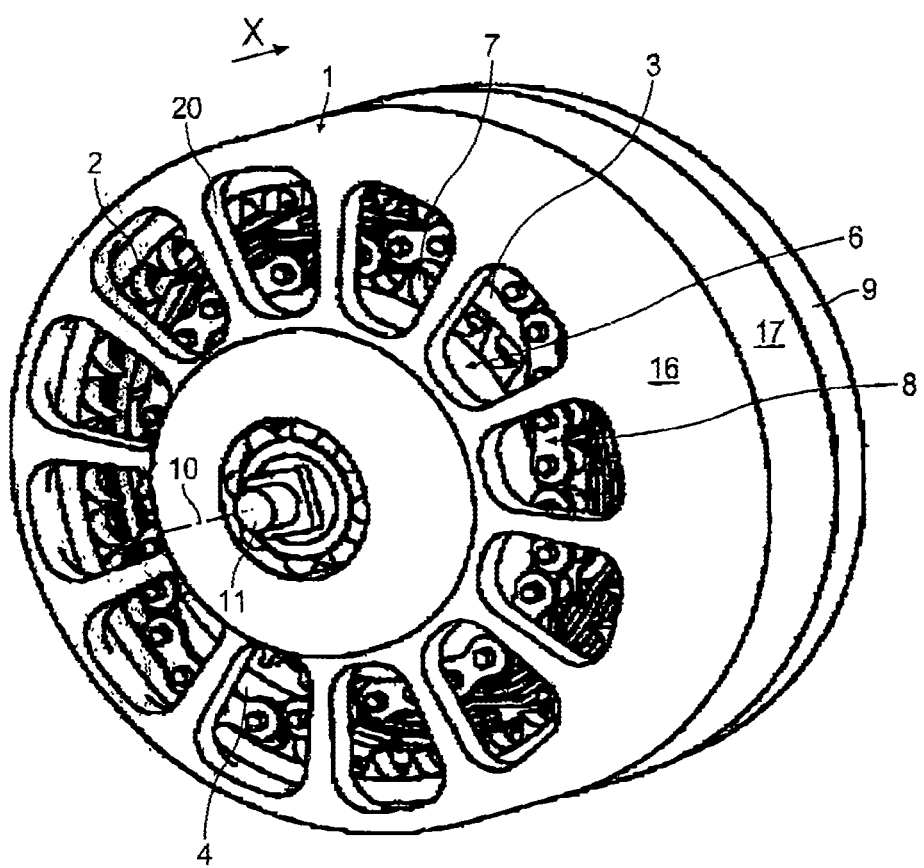
Figure 7:
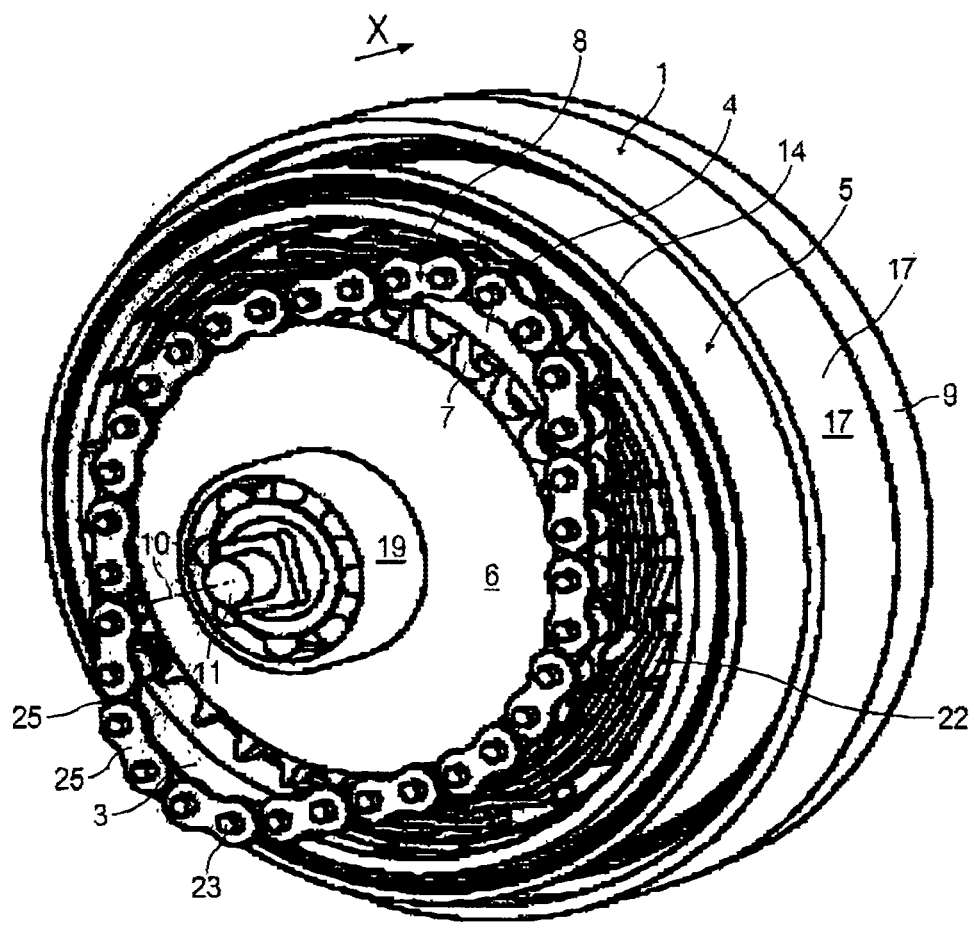
Figure 8:
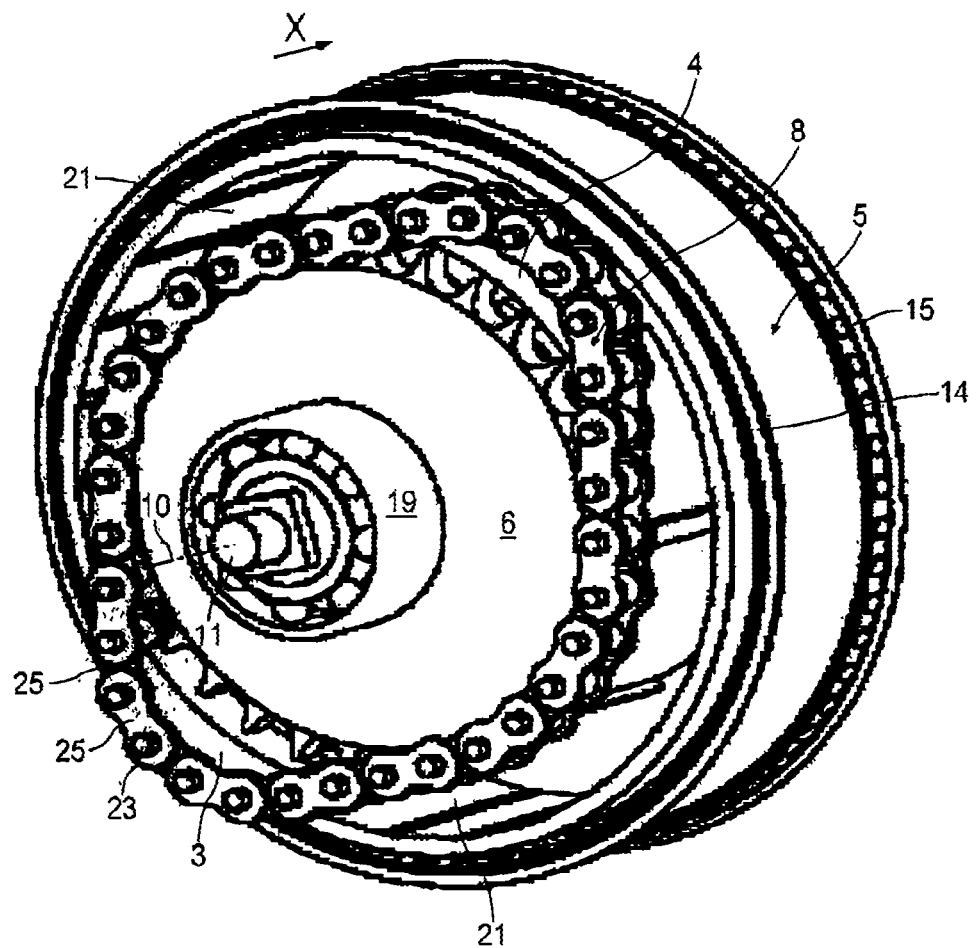
Figure 9:
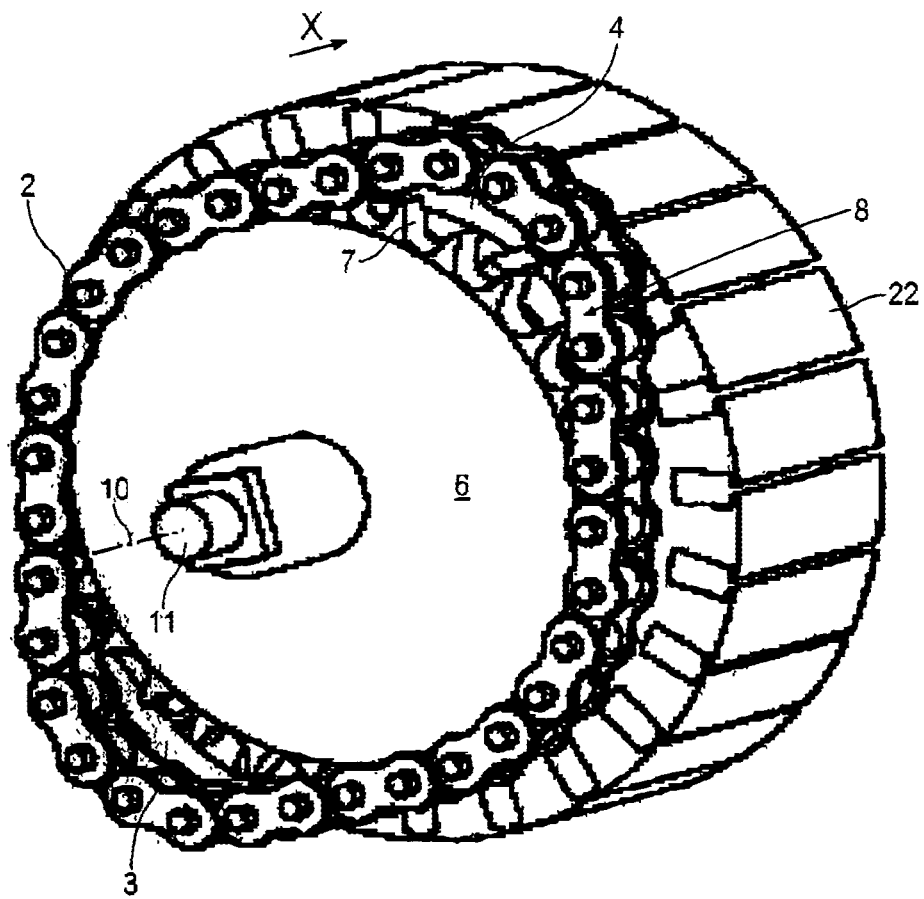
Figure 10:
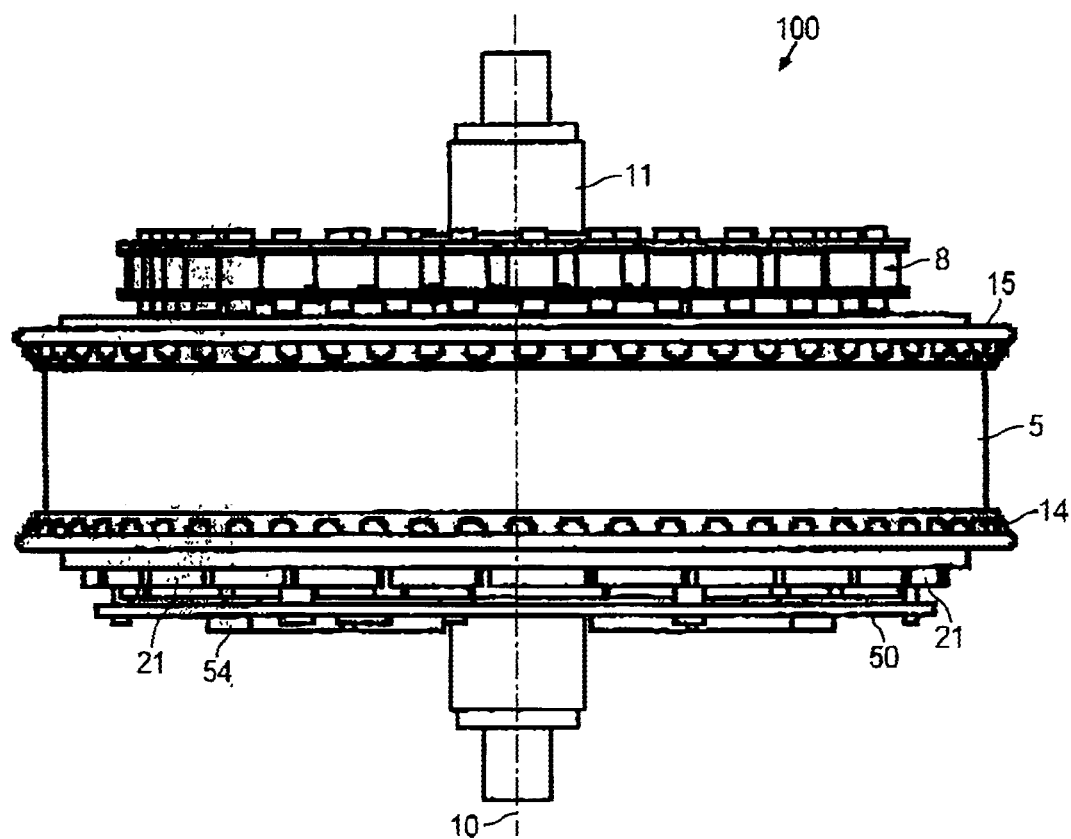
Figure 11:
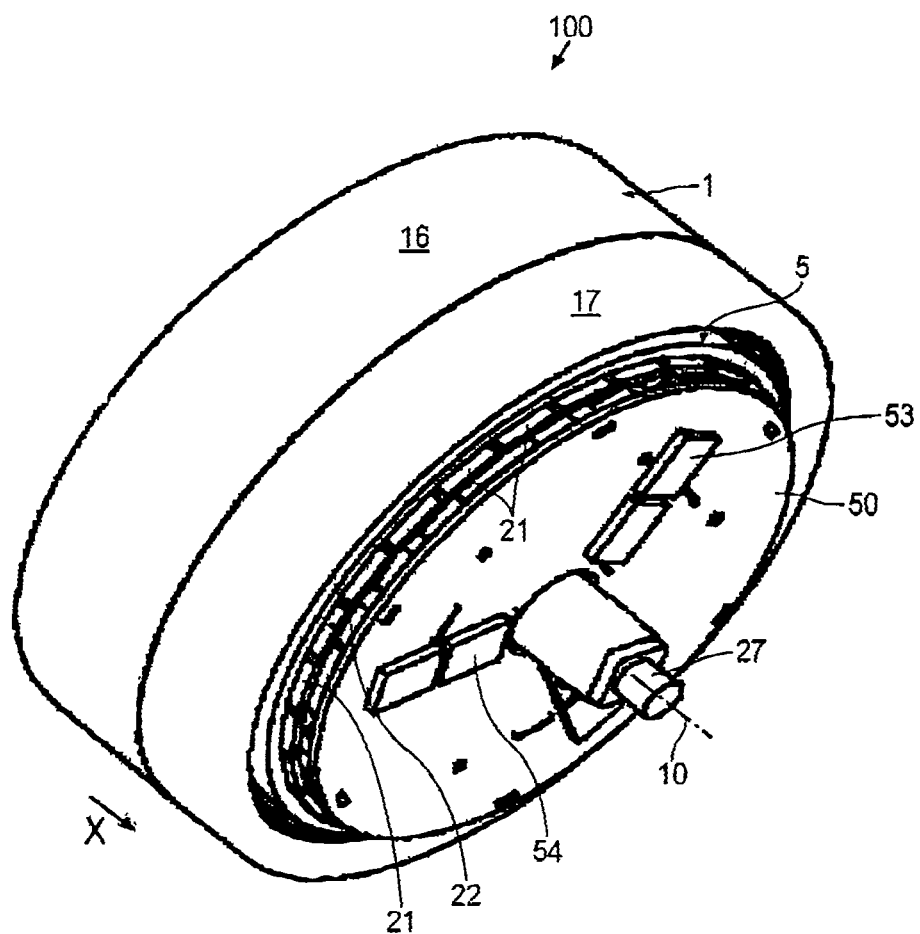
Figure 12:
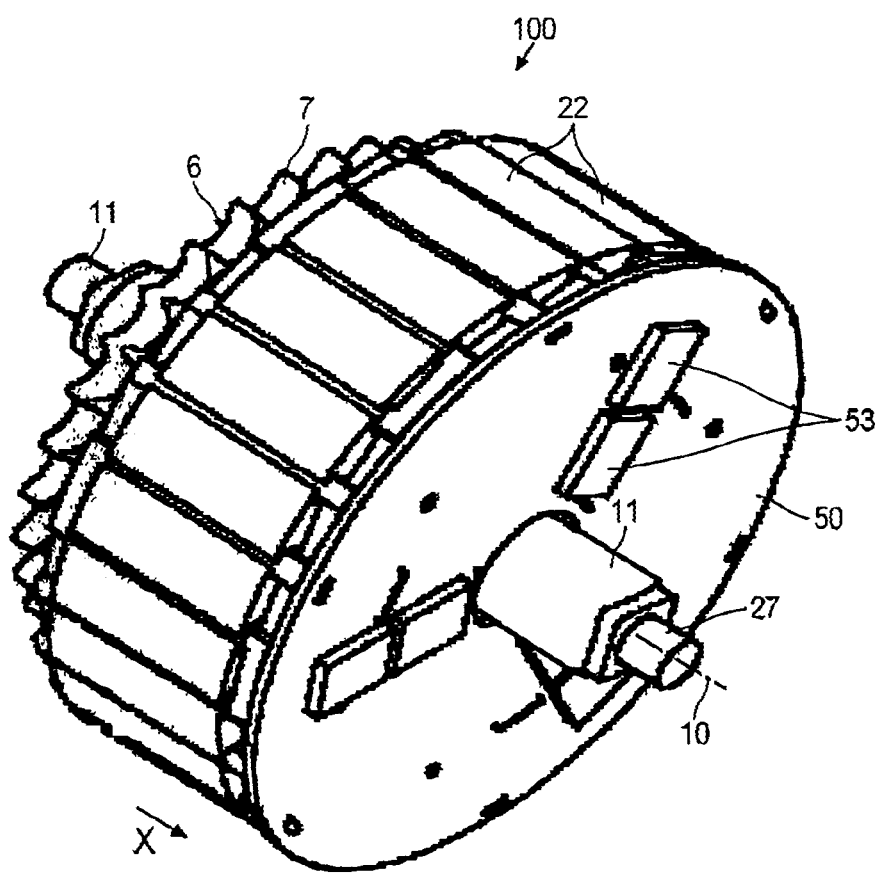
Figure 13:
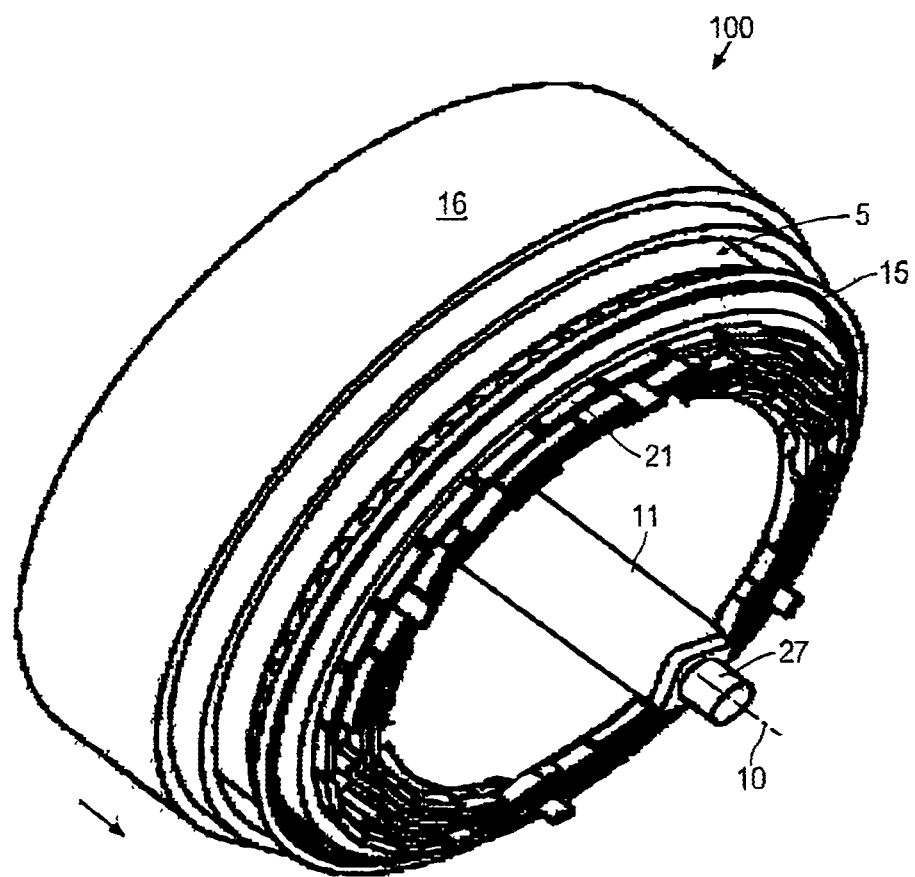
Figure 14:
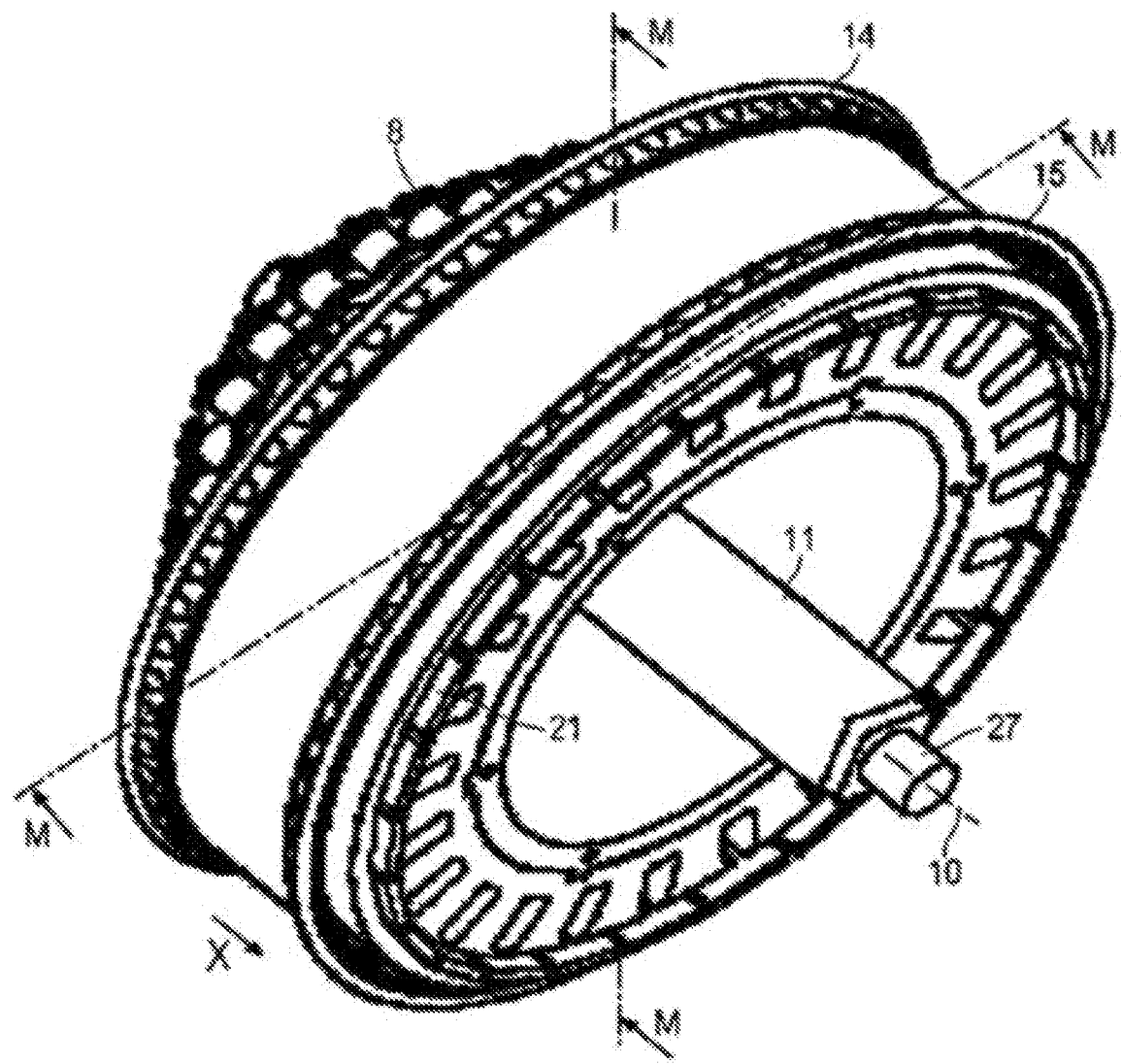
Figure 15:
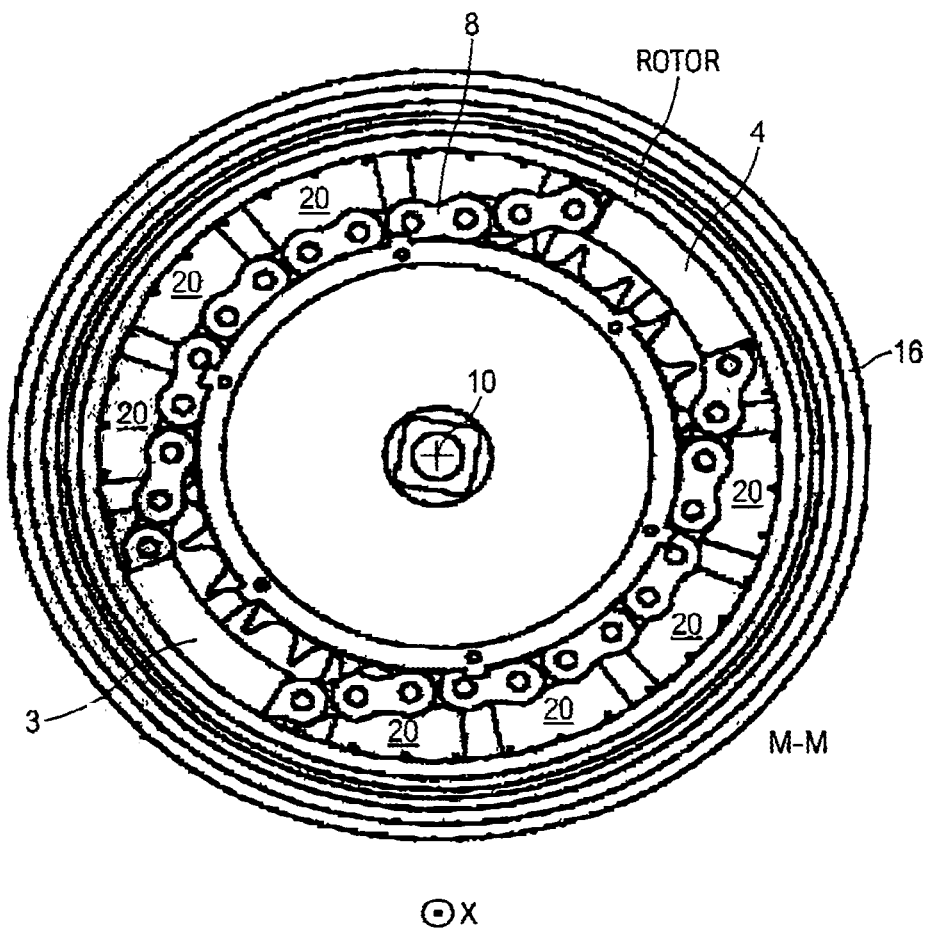
Figure 16:
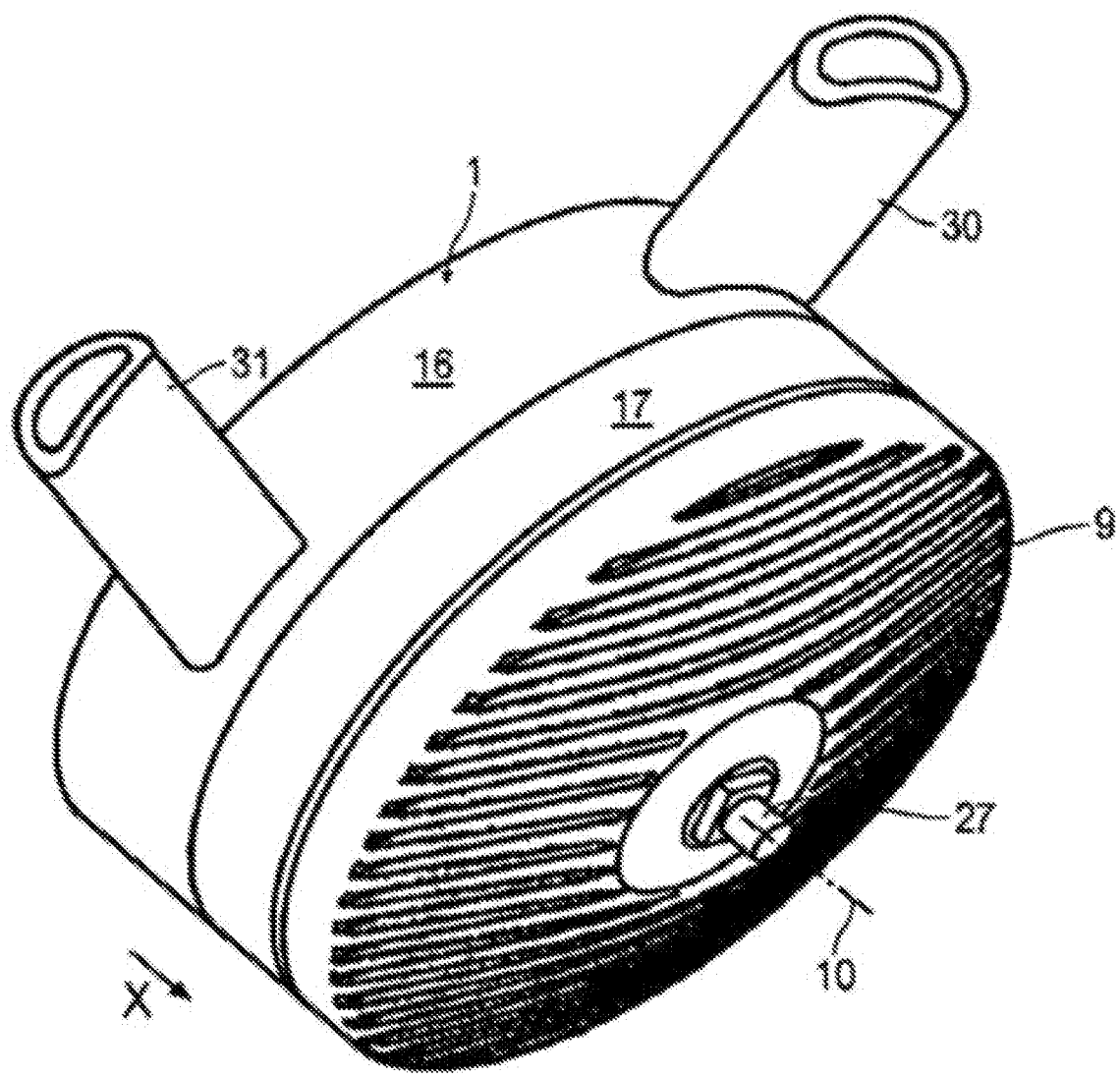
Figure 17:
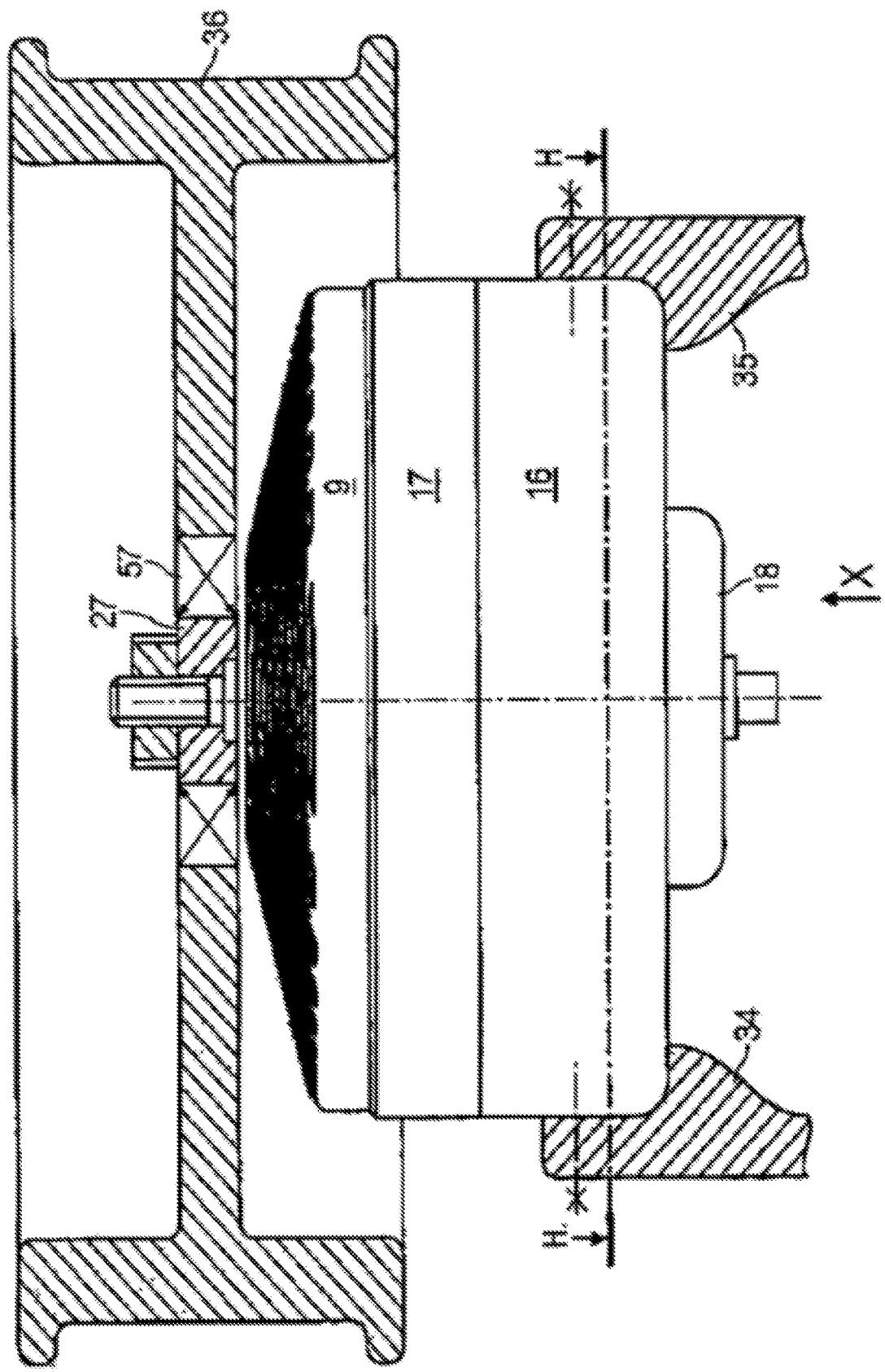
Figure 18:
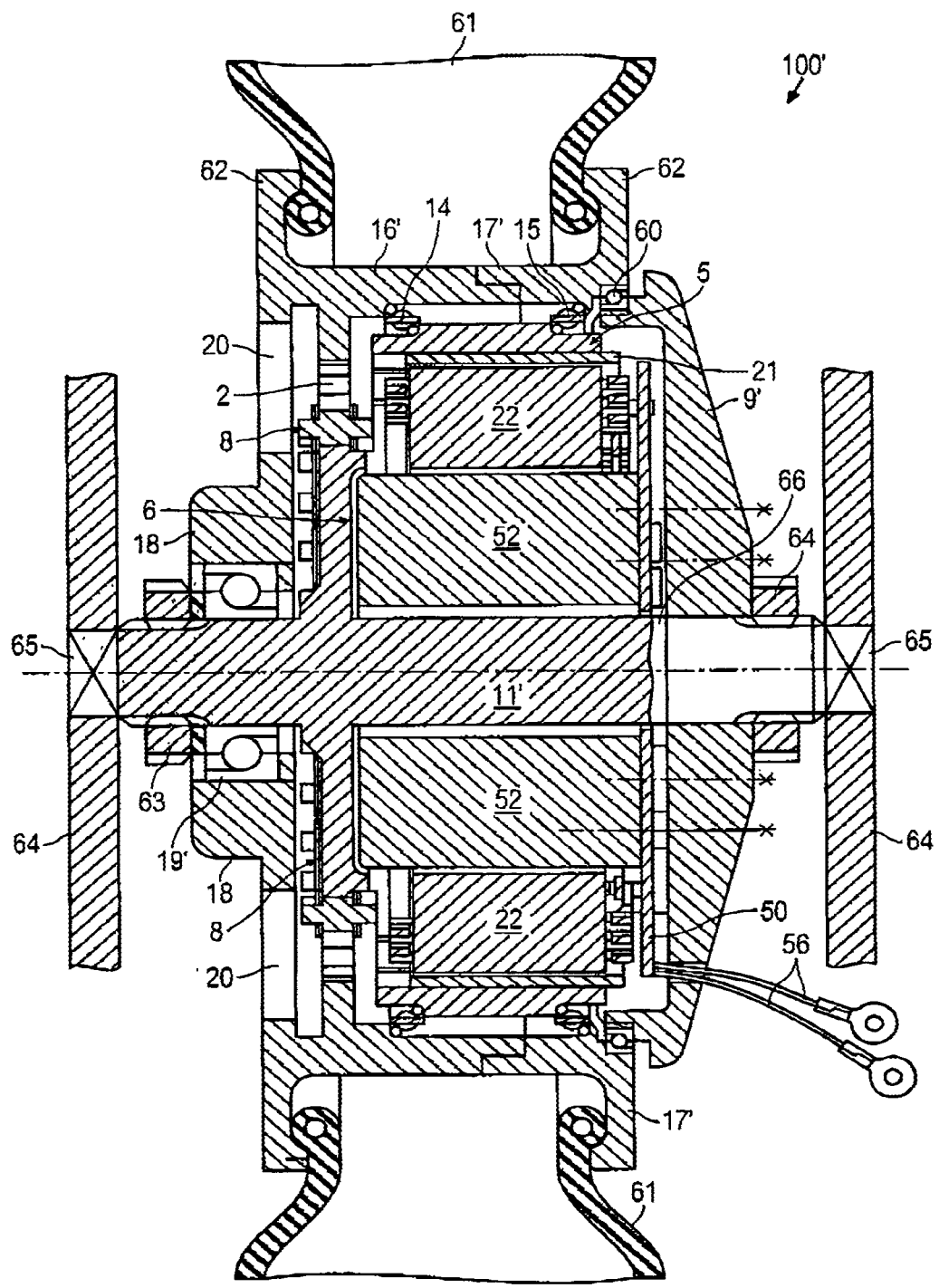
Figure 22:
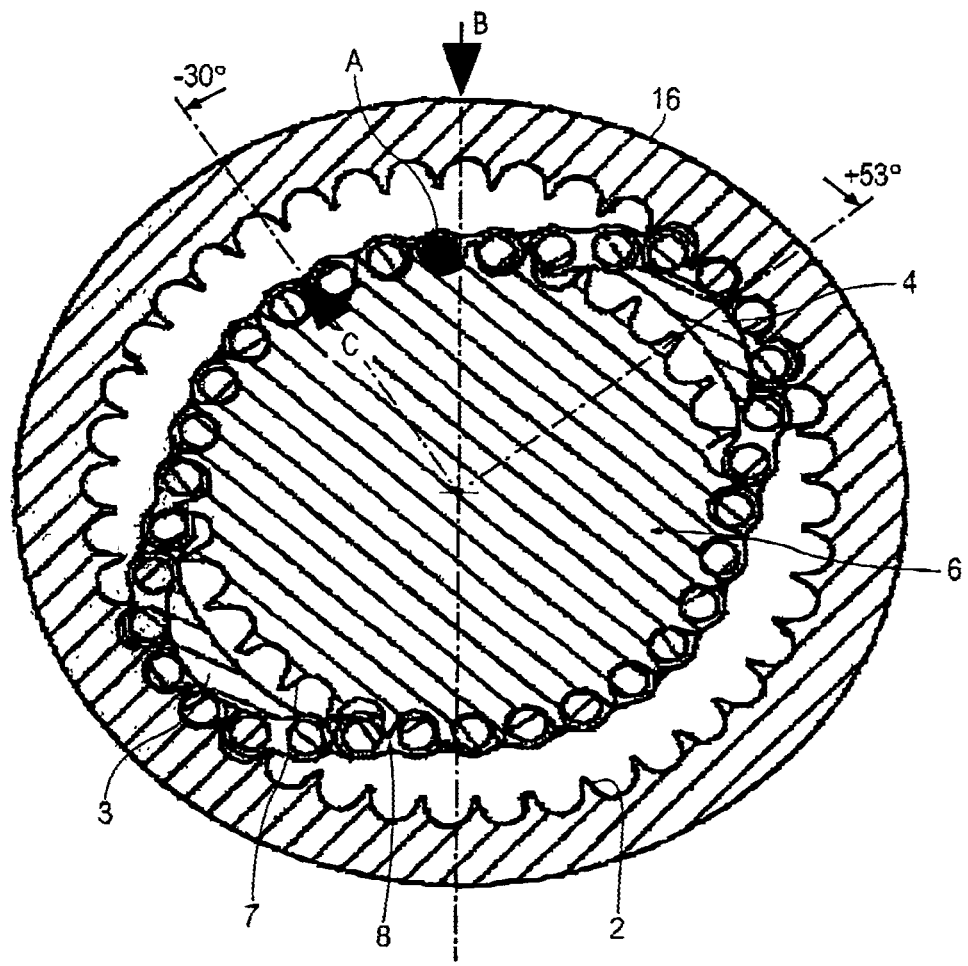
Figure 23:
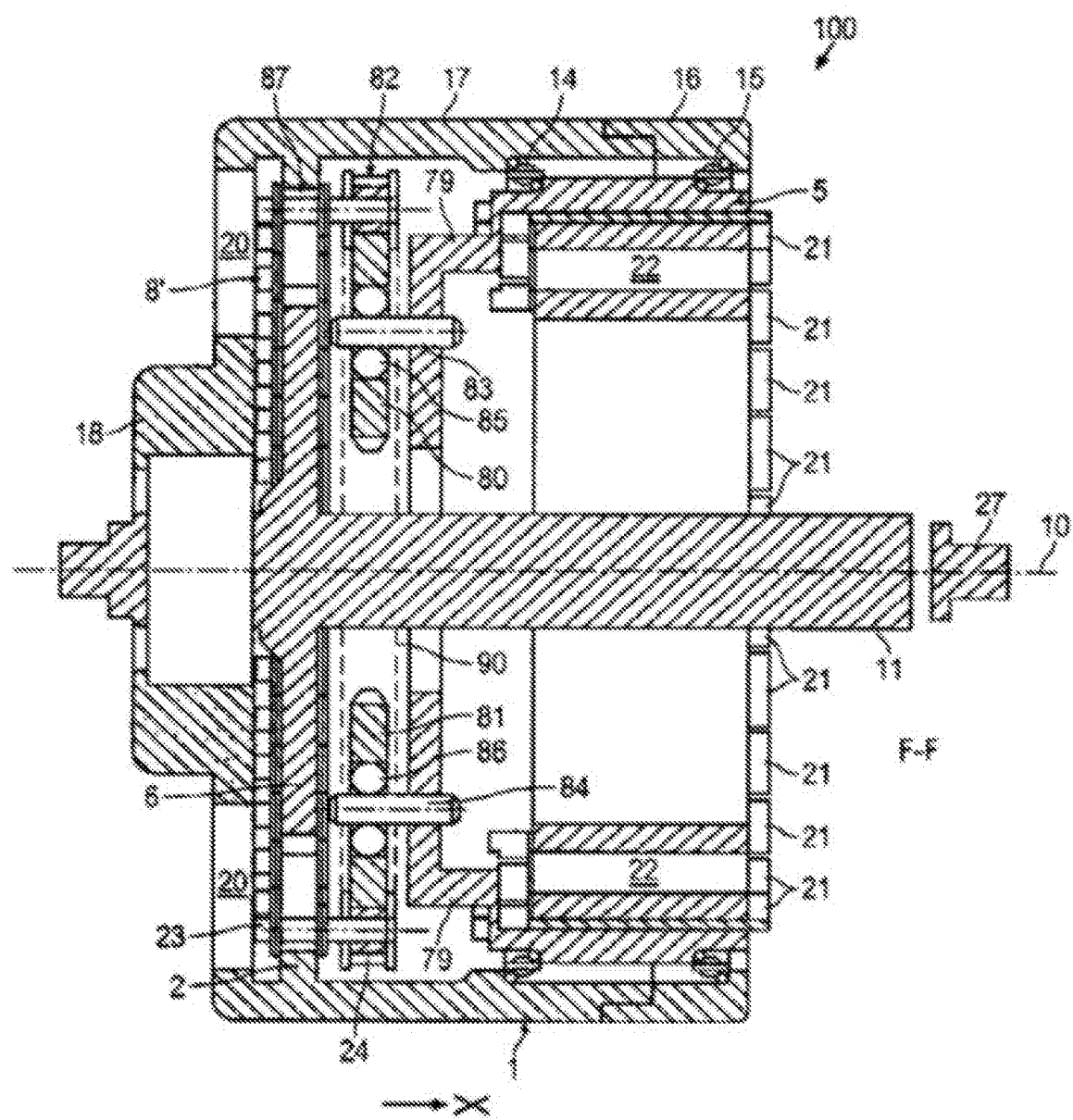
Figure 24:
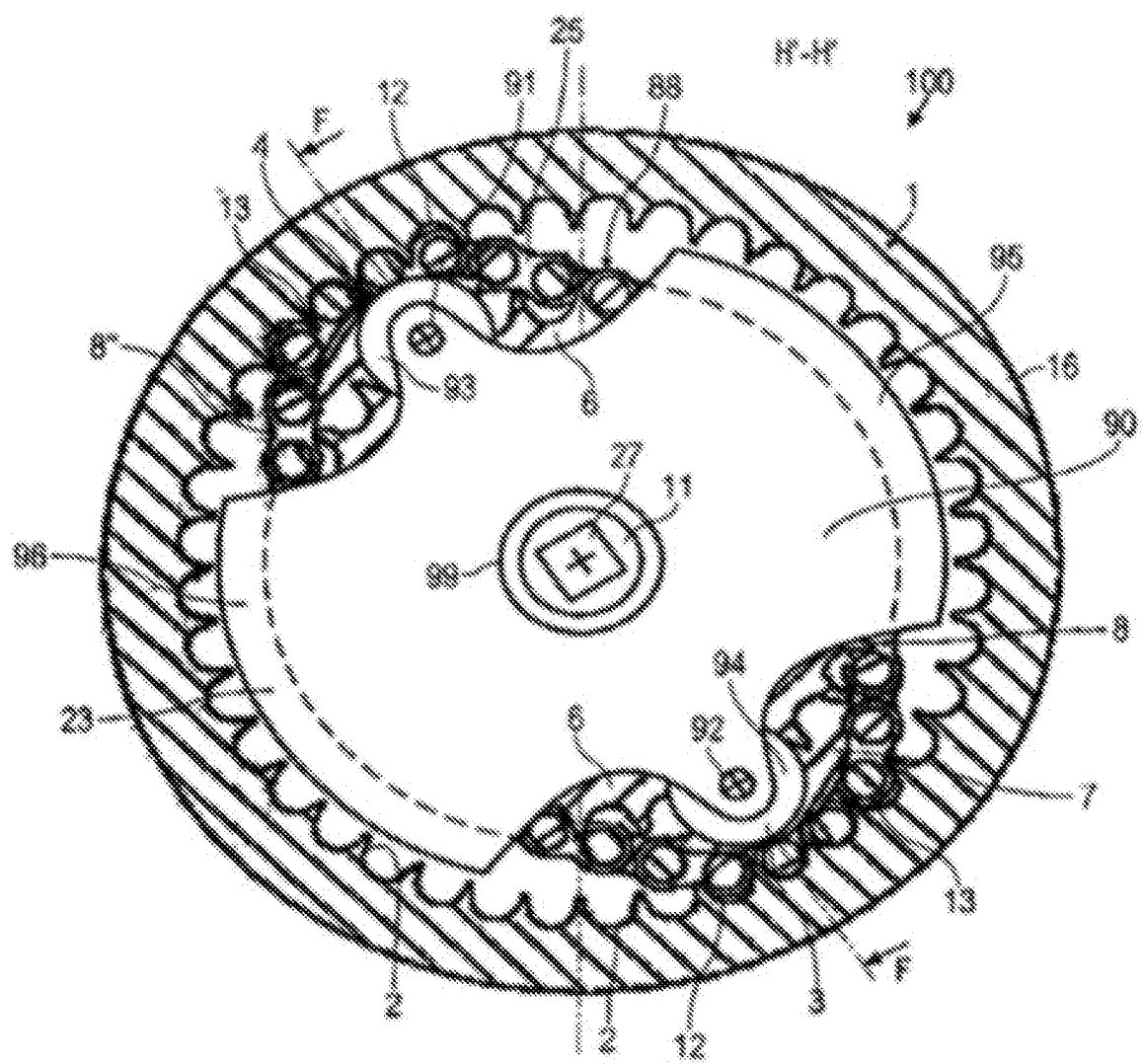
Figure 25:
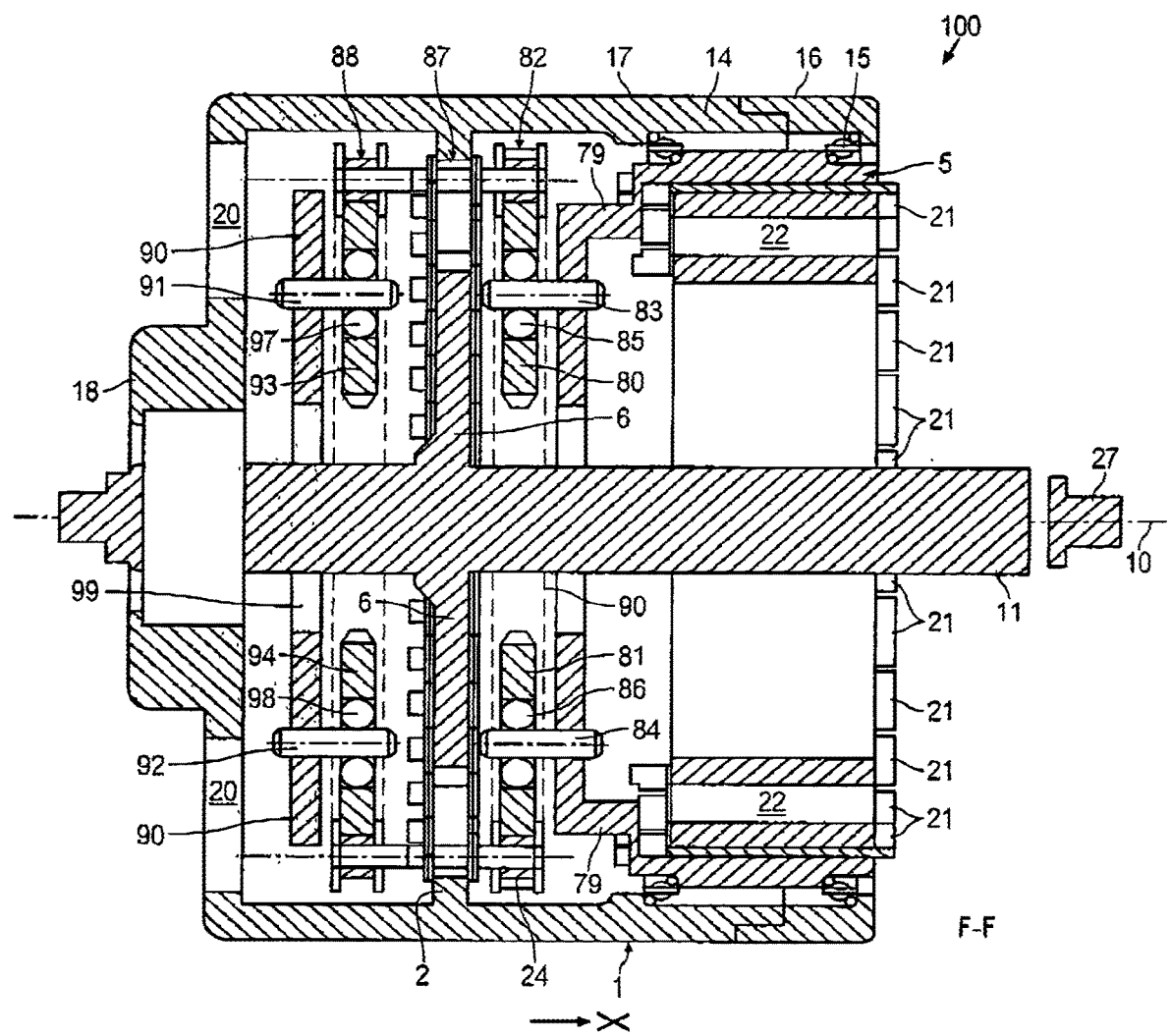
Figure 26:
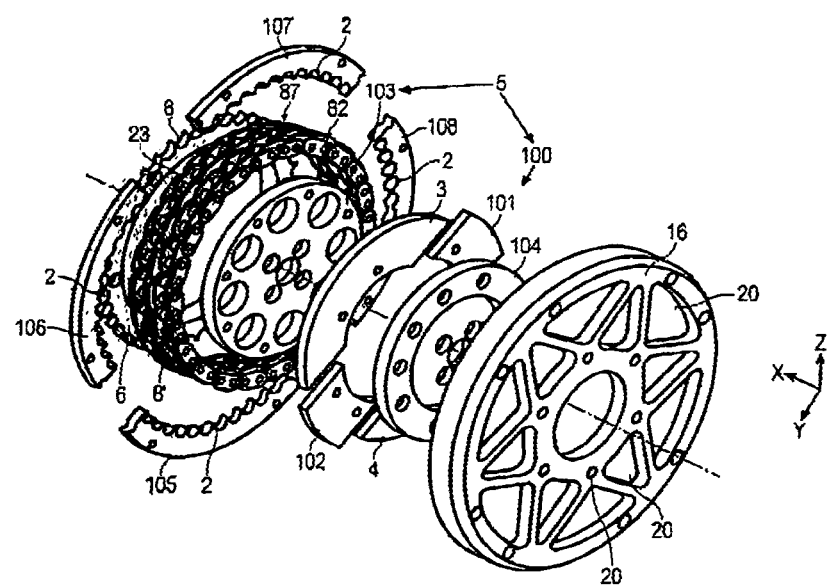
Figure 27:
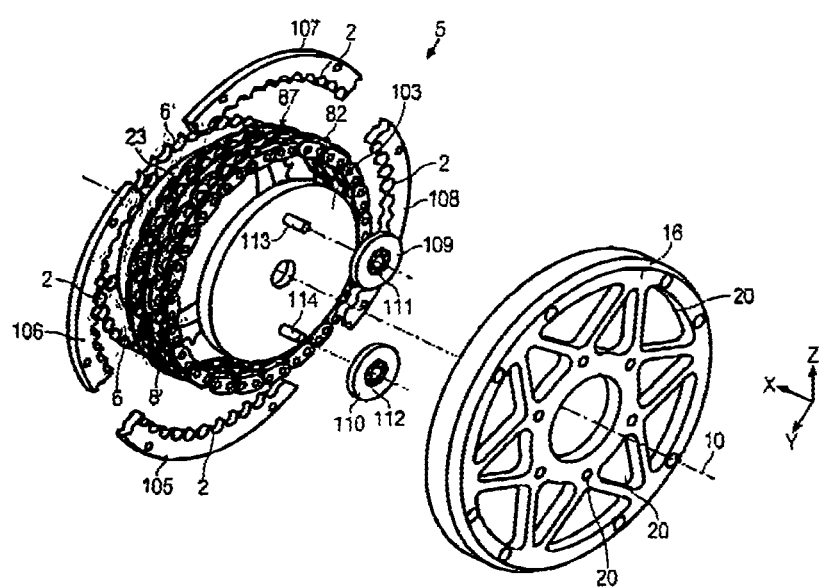
Figure 28:
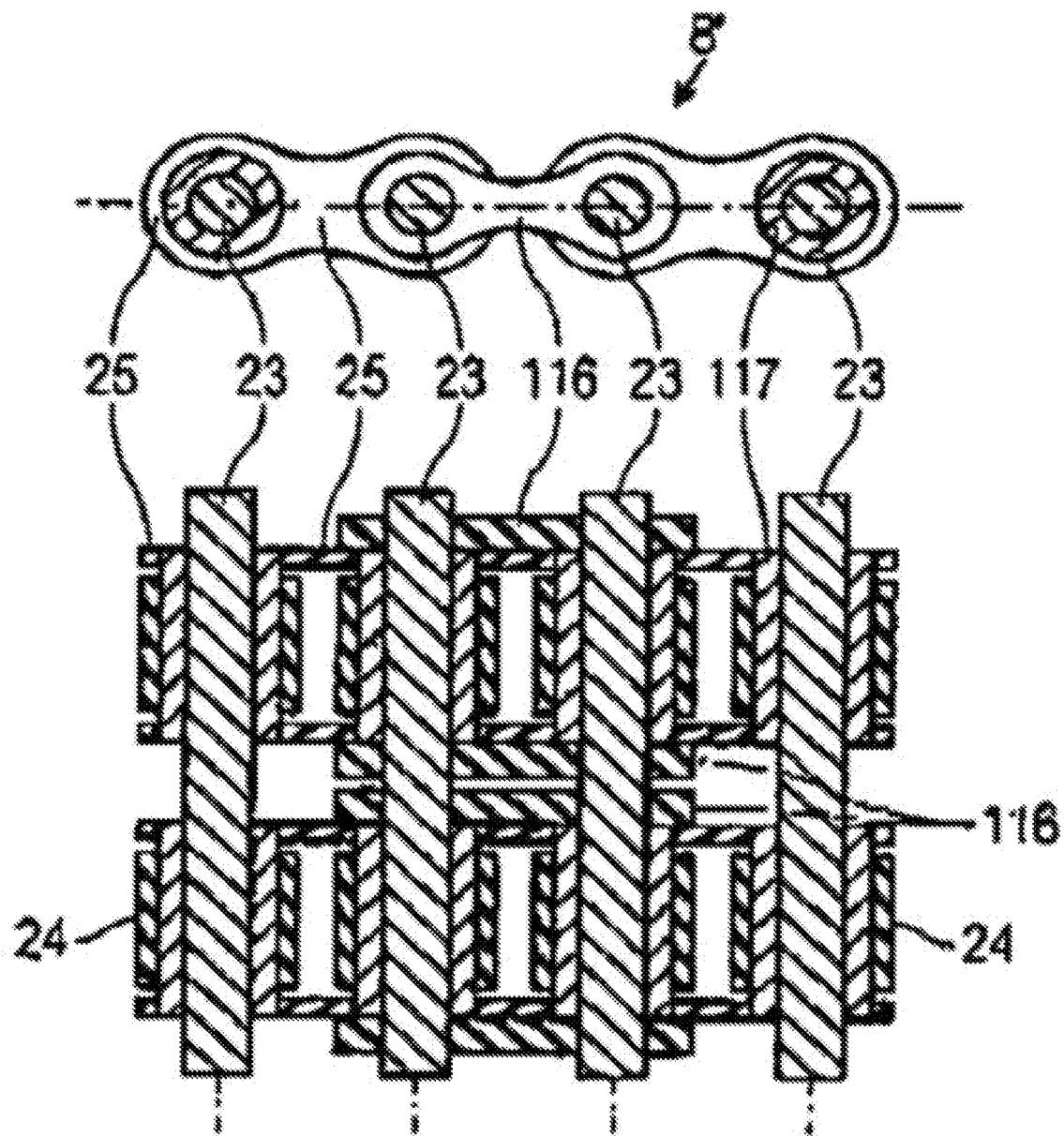
Figure 29:
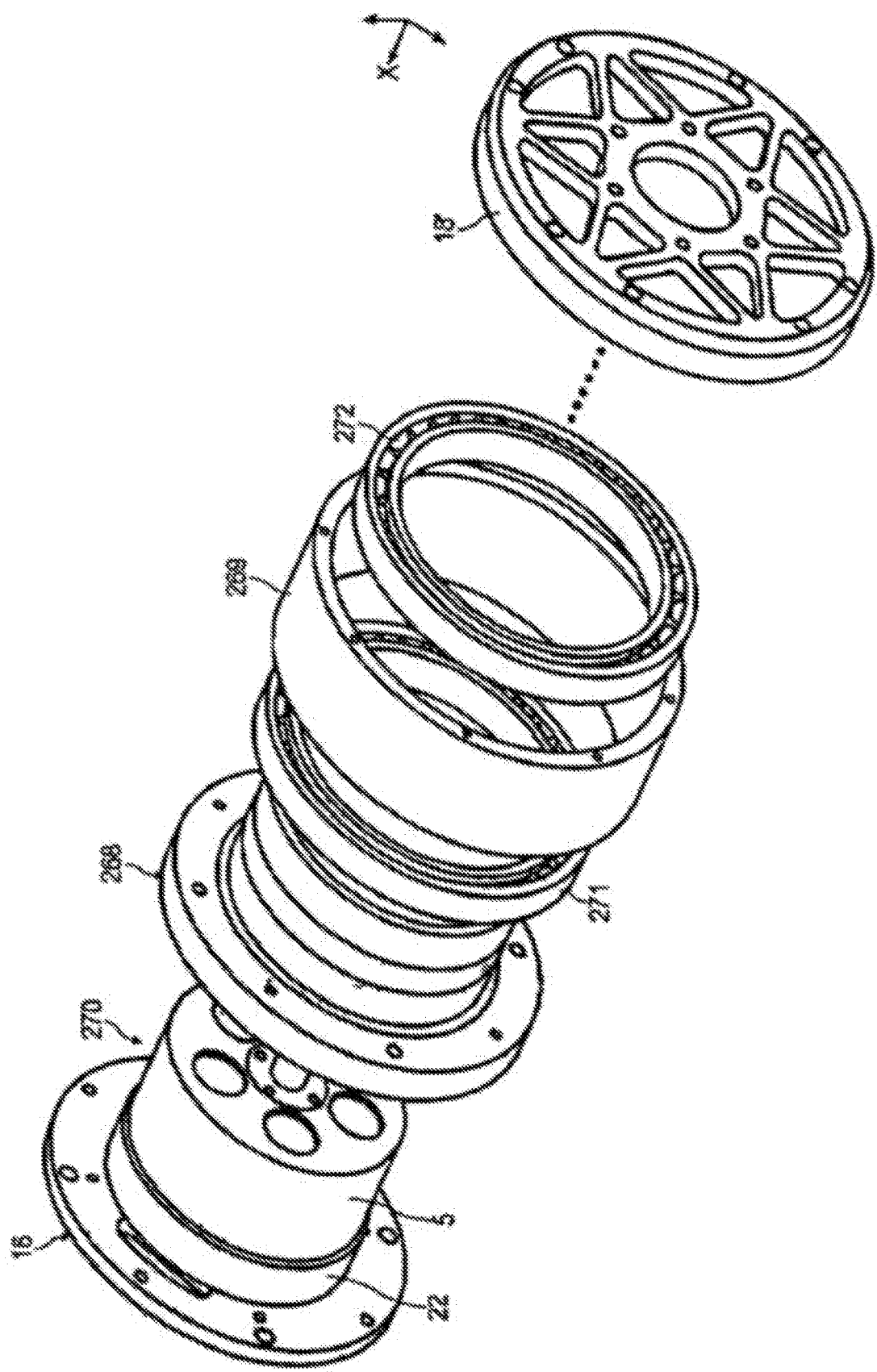
Figure 30:
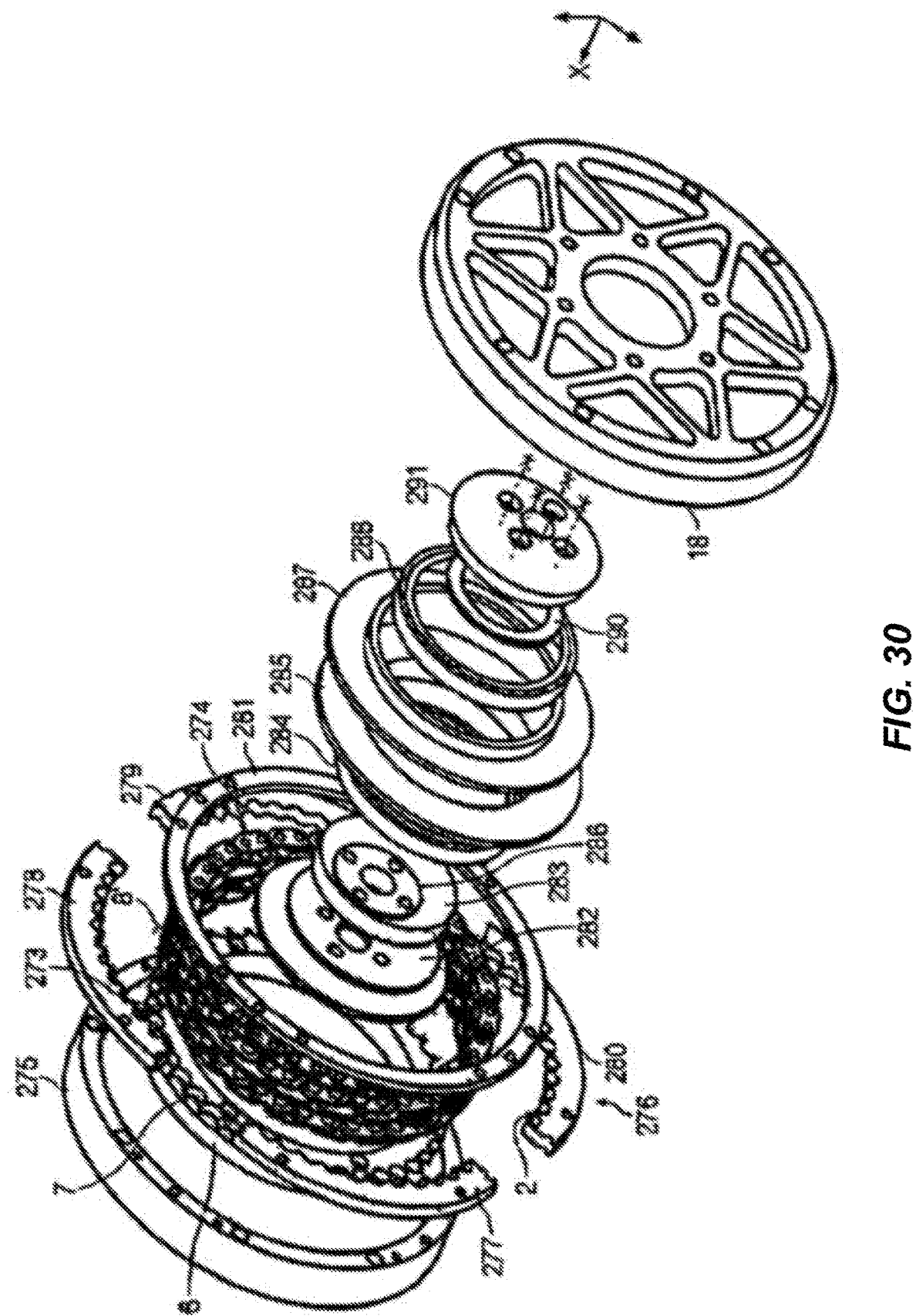
Figure 31:
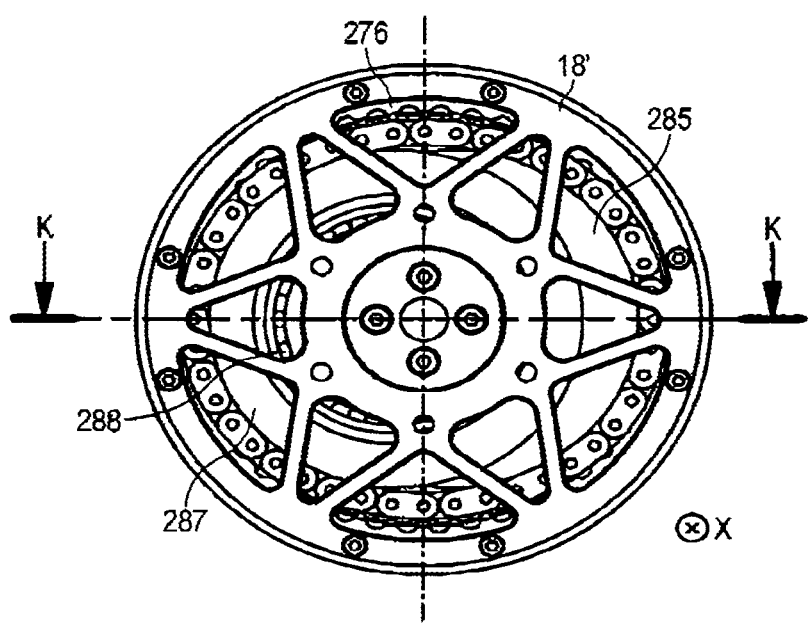
Figure 32:
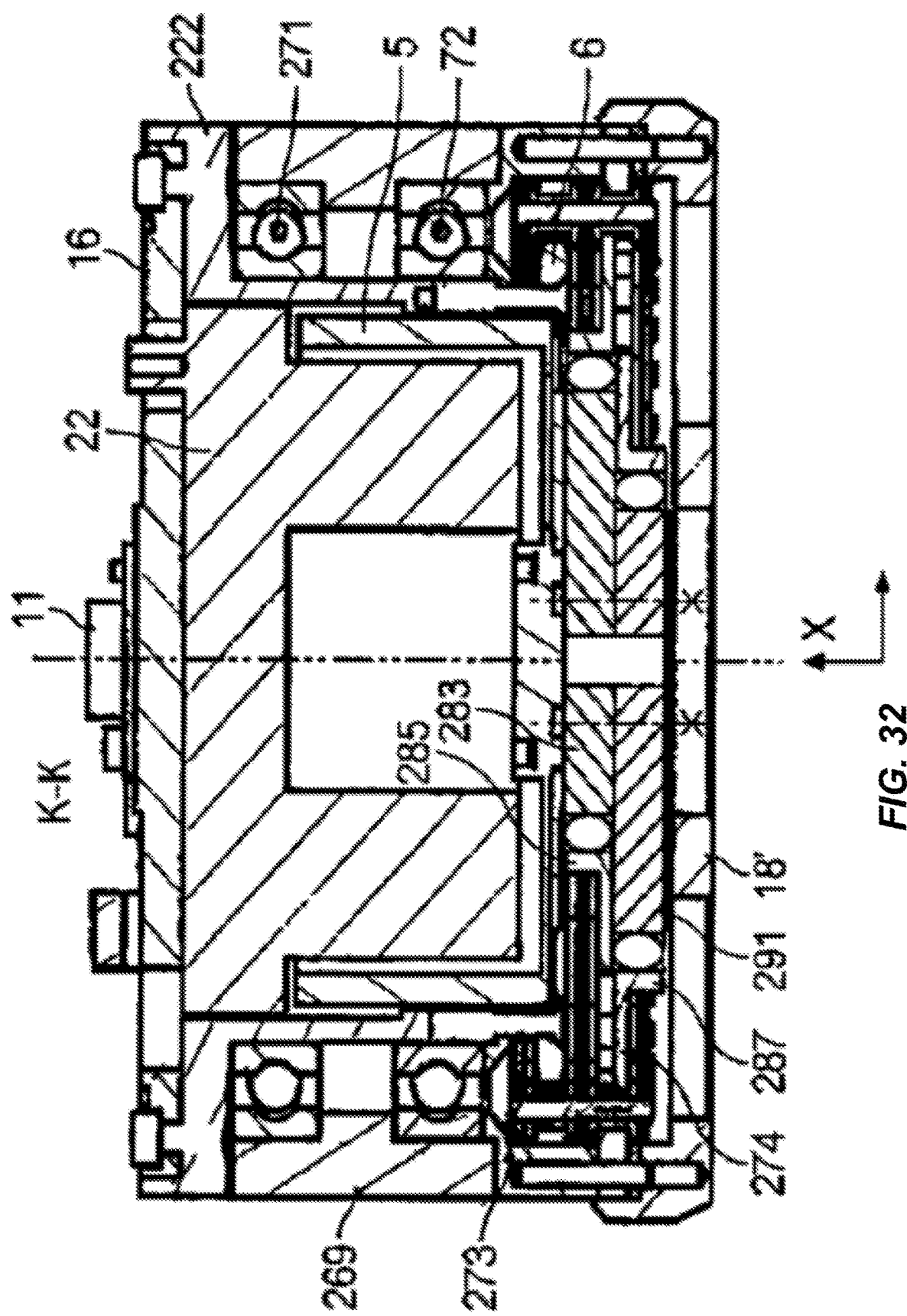
Figure 33:
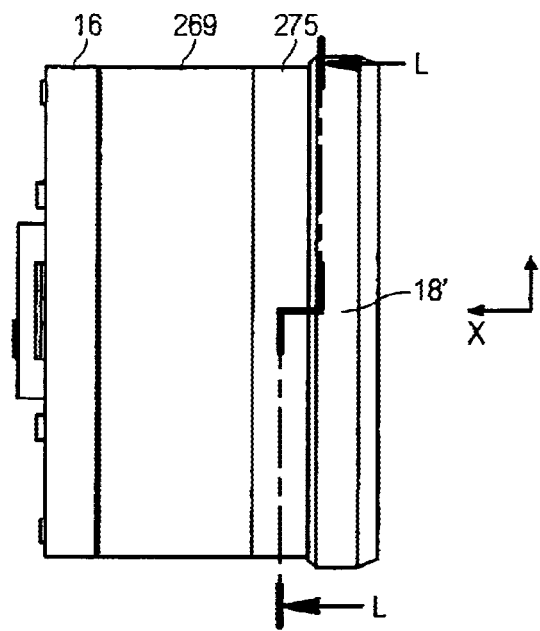
Figure 34:
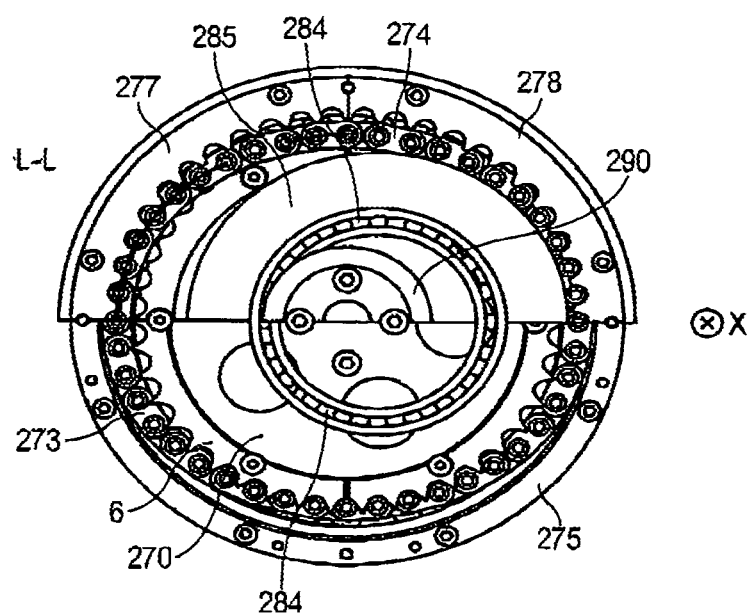
Figure 35:
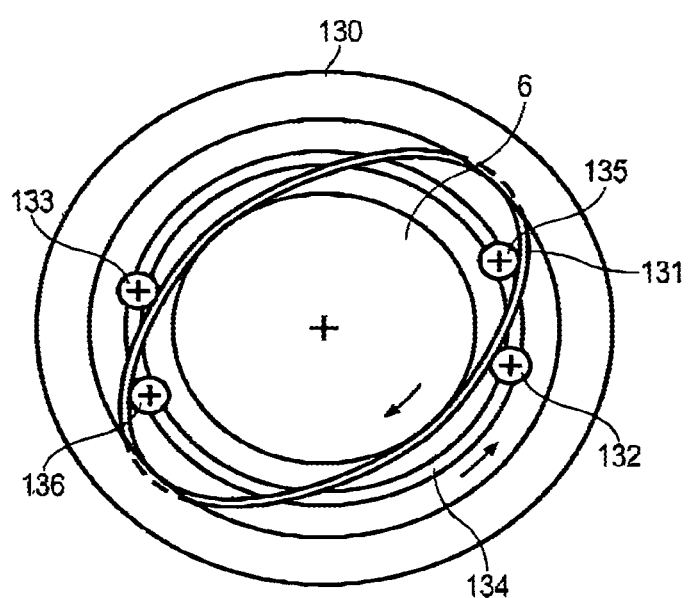
Figure 36:
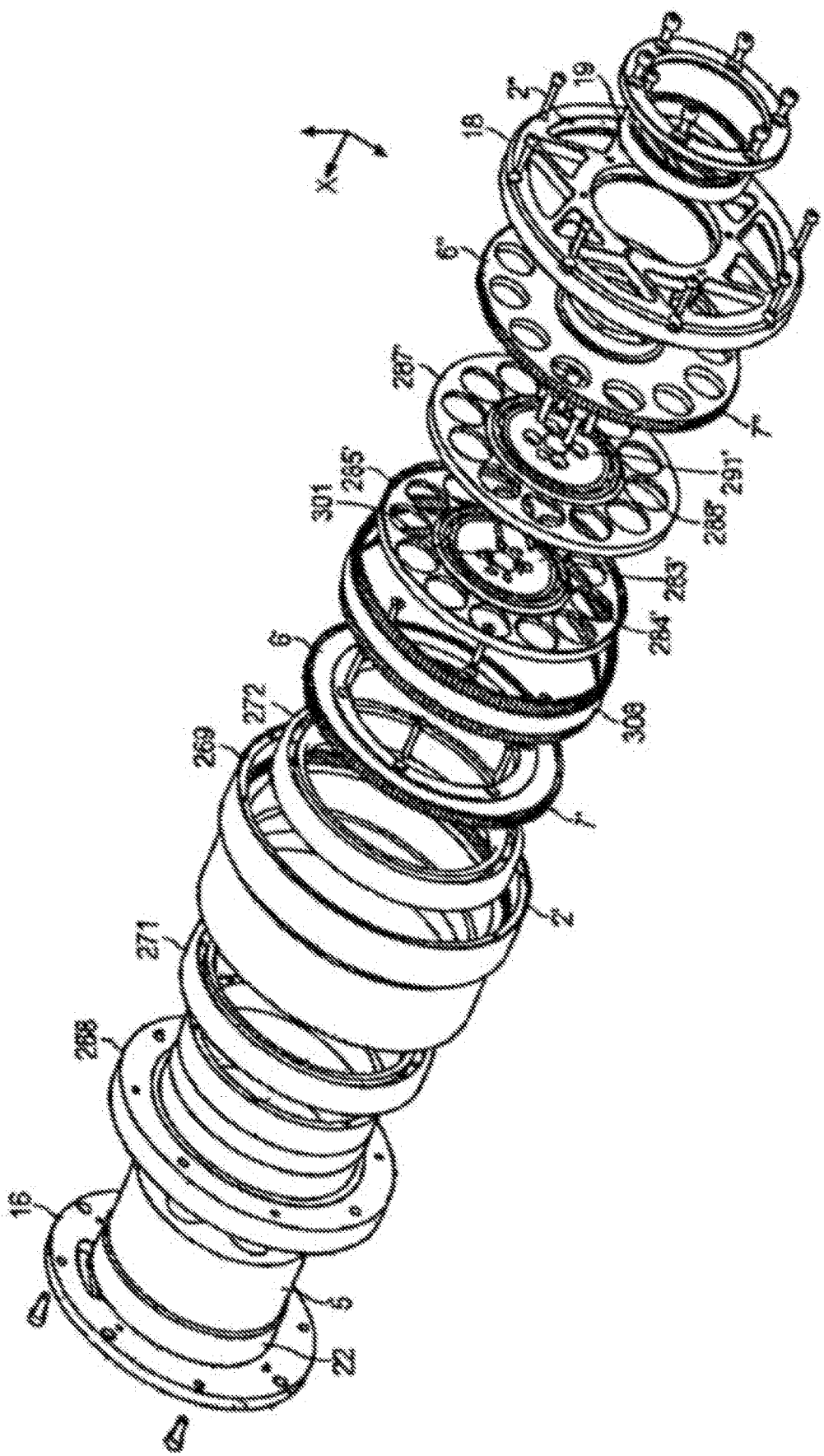
Figure 37:
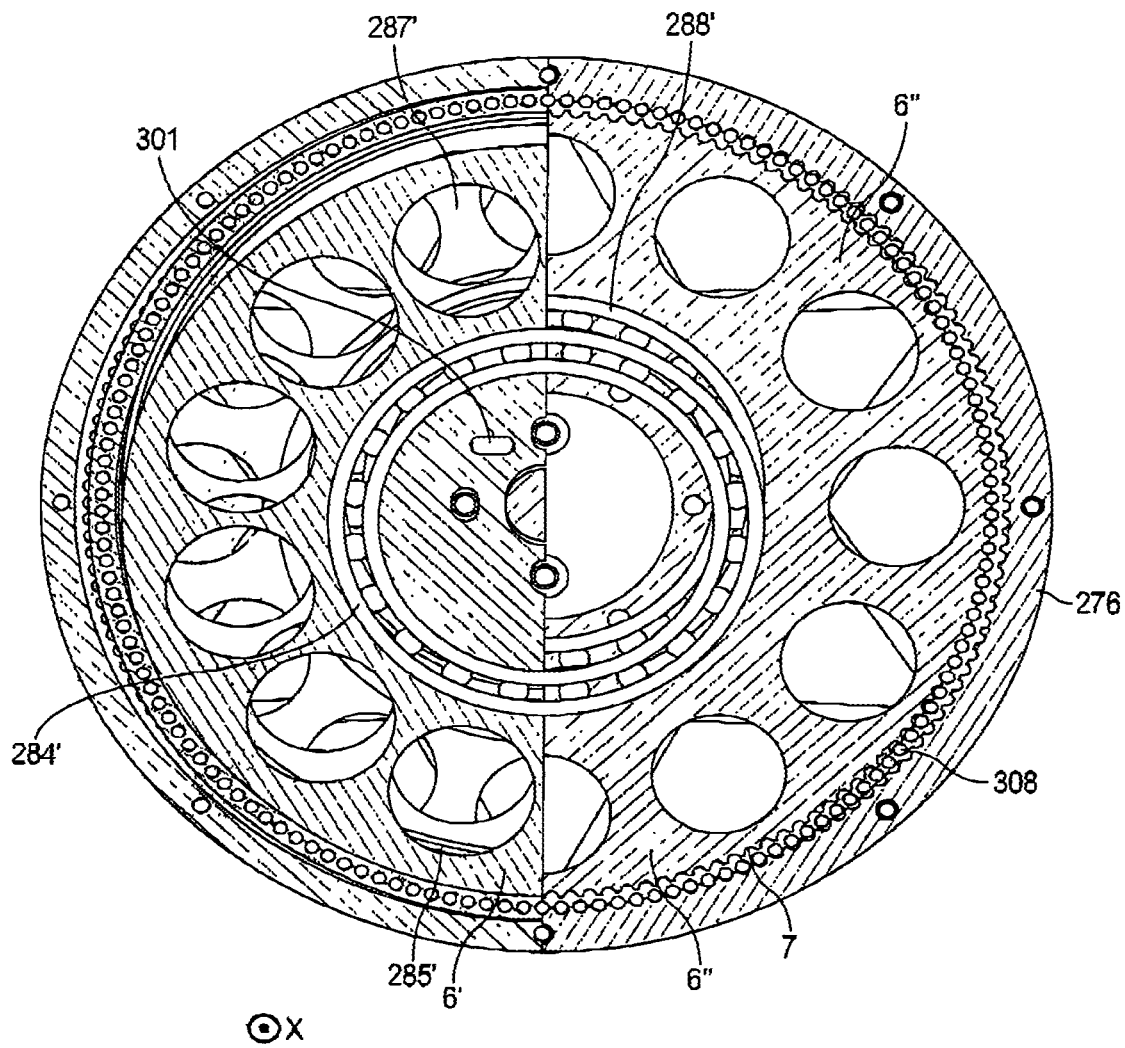
Figure 38:
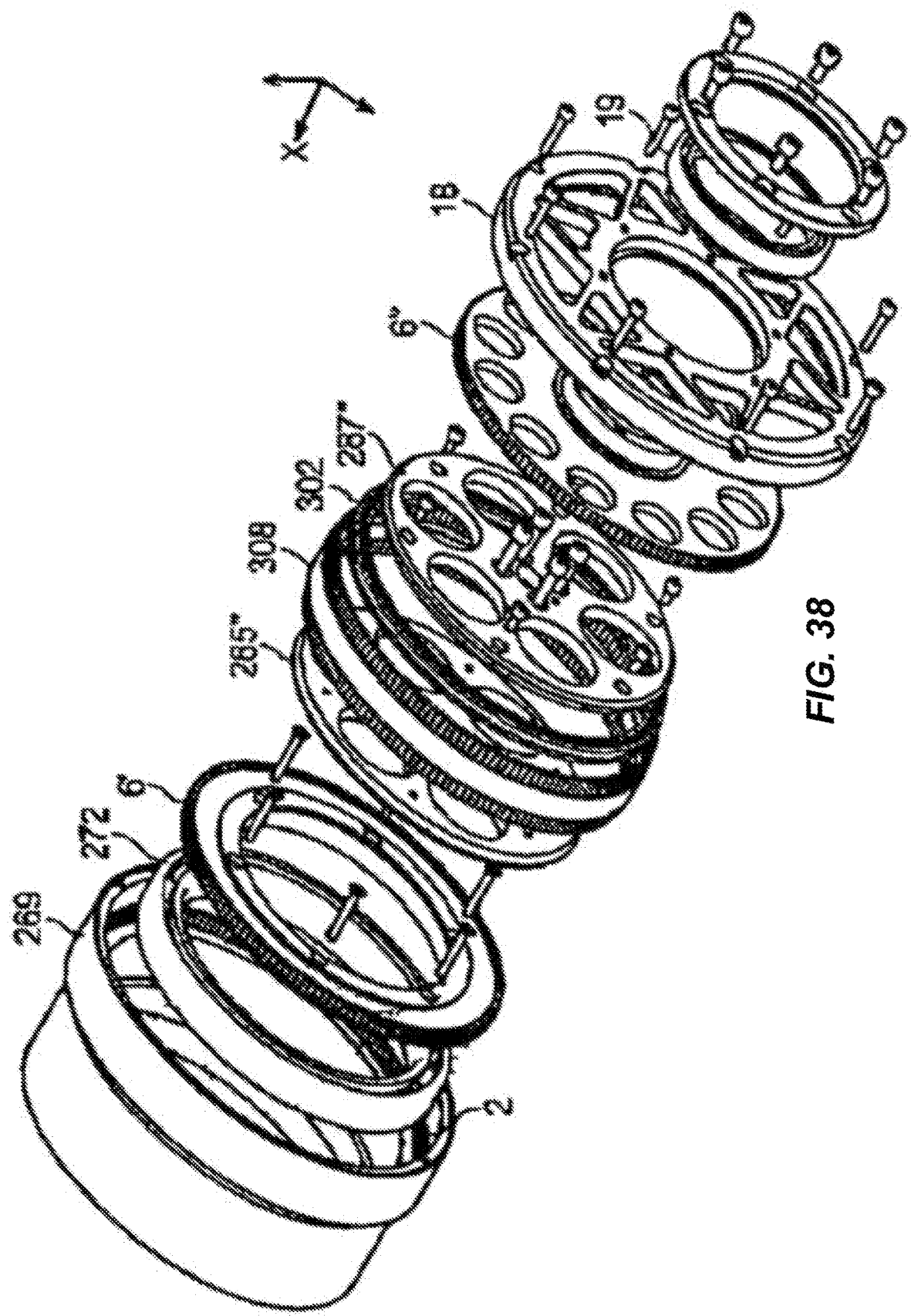
Figure 39:
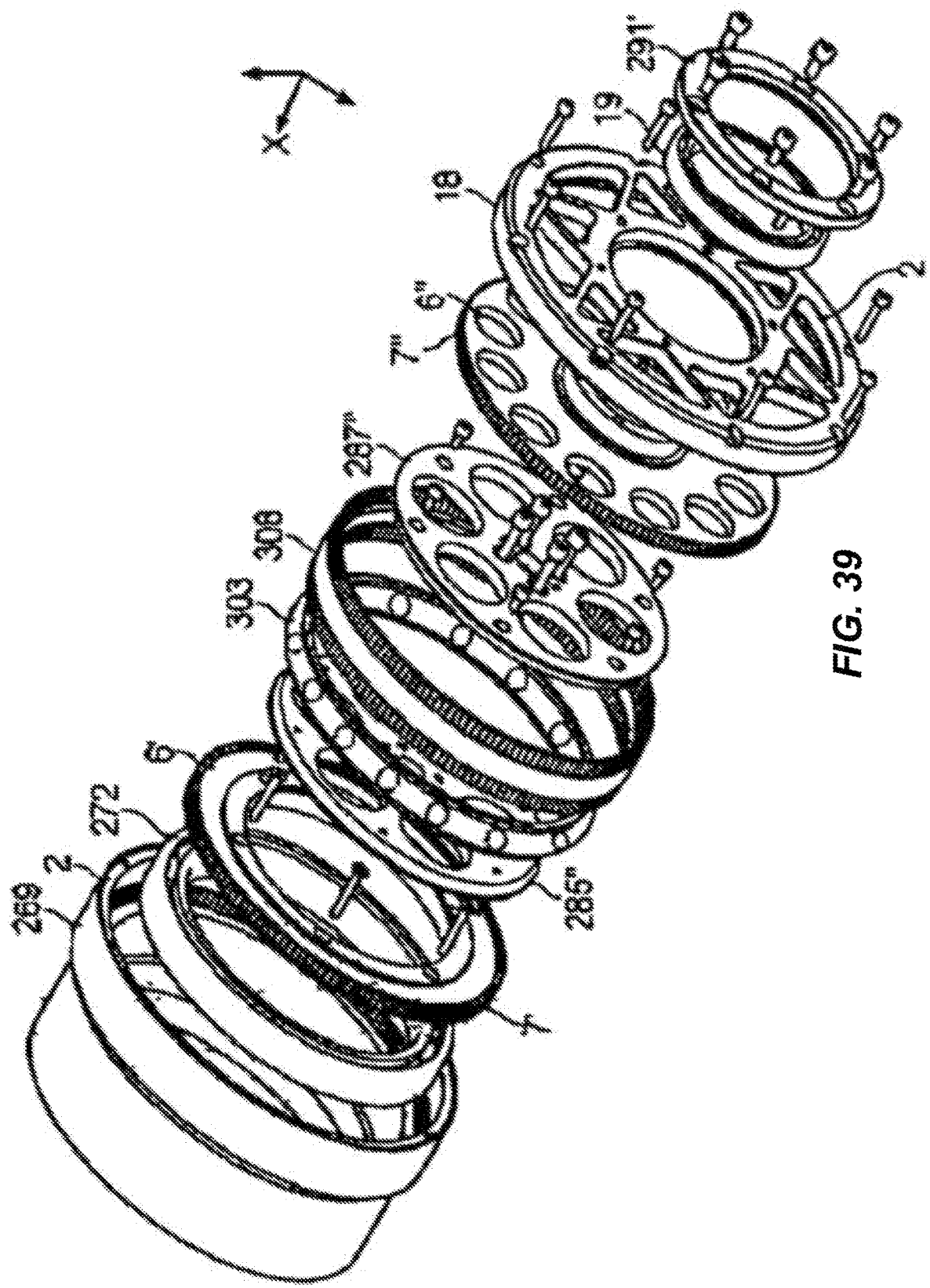
Figure 40:
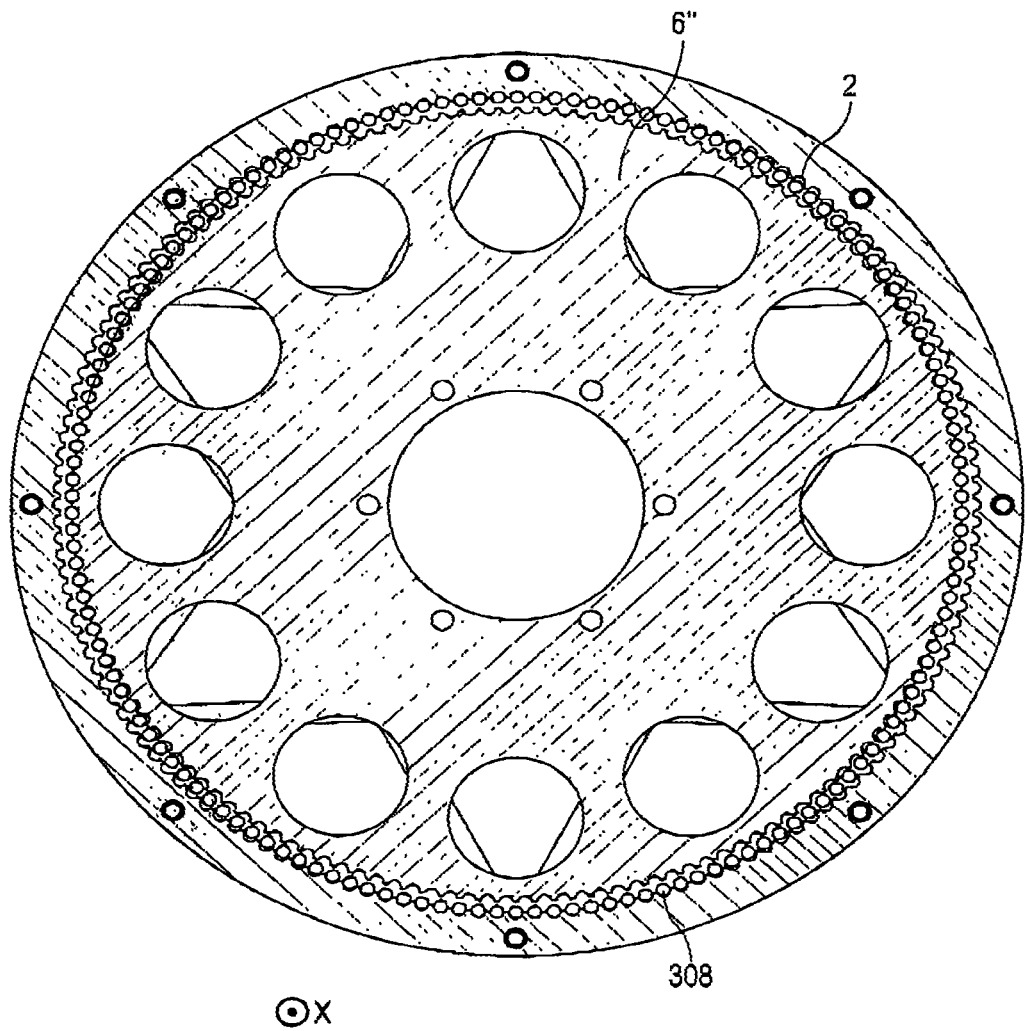
Figure 41:
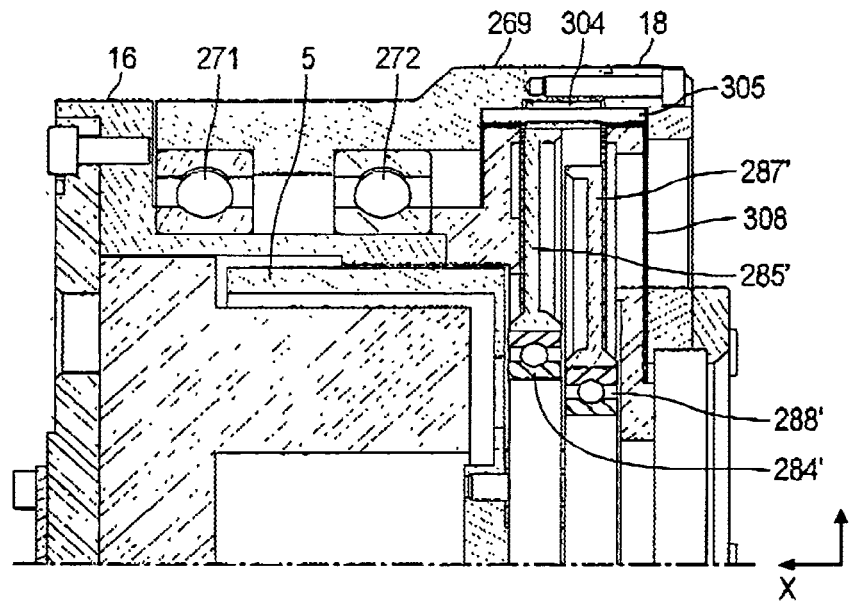
Figure 42:
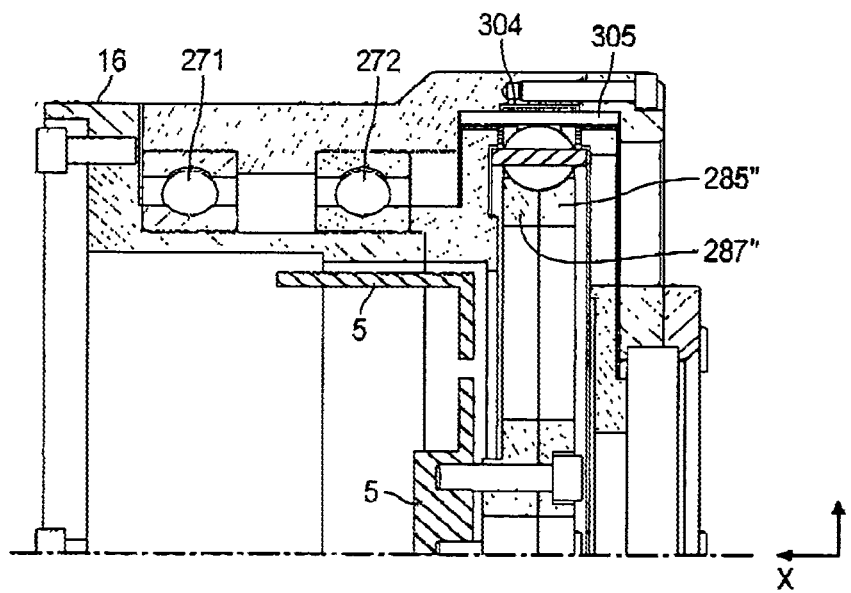
Figure 43:
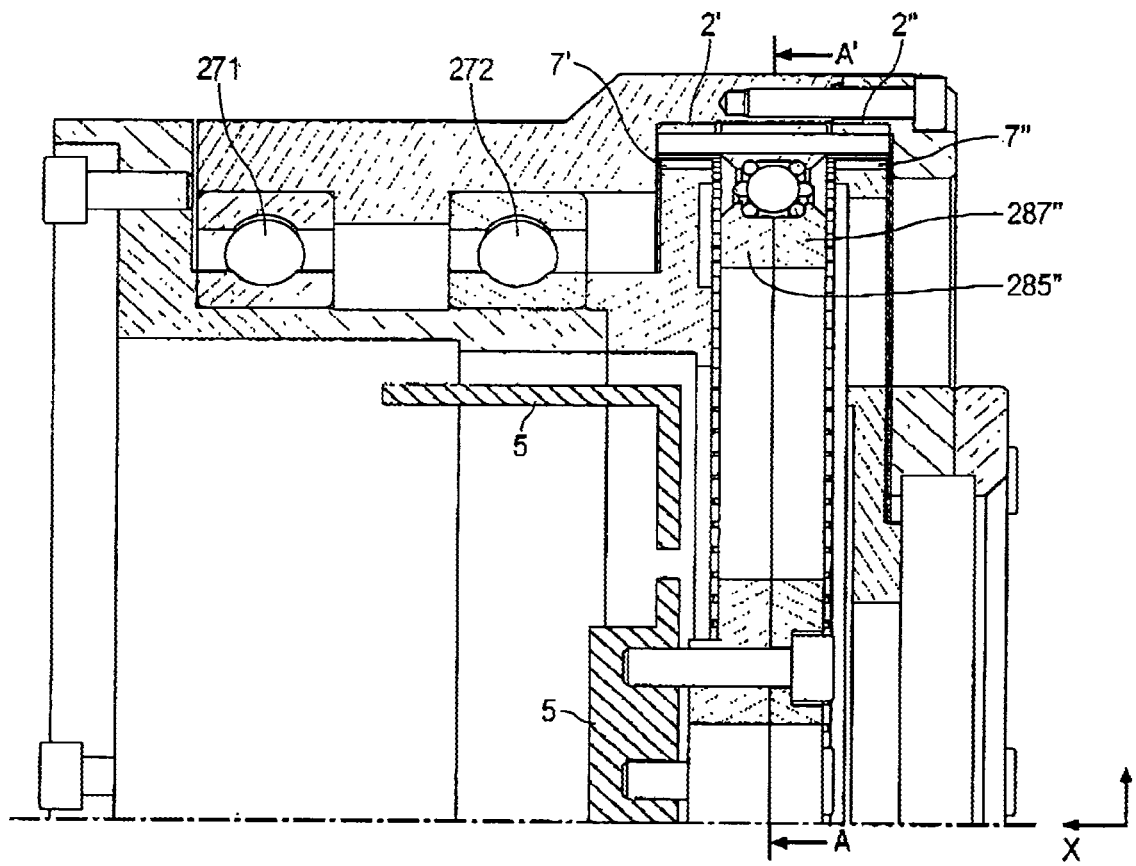
Figure 44:
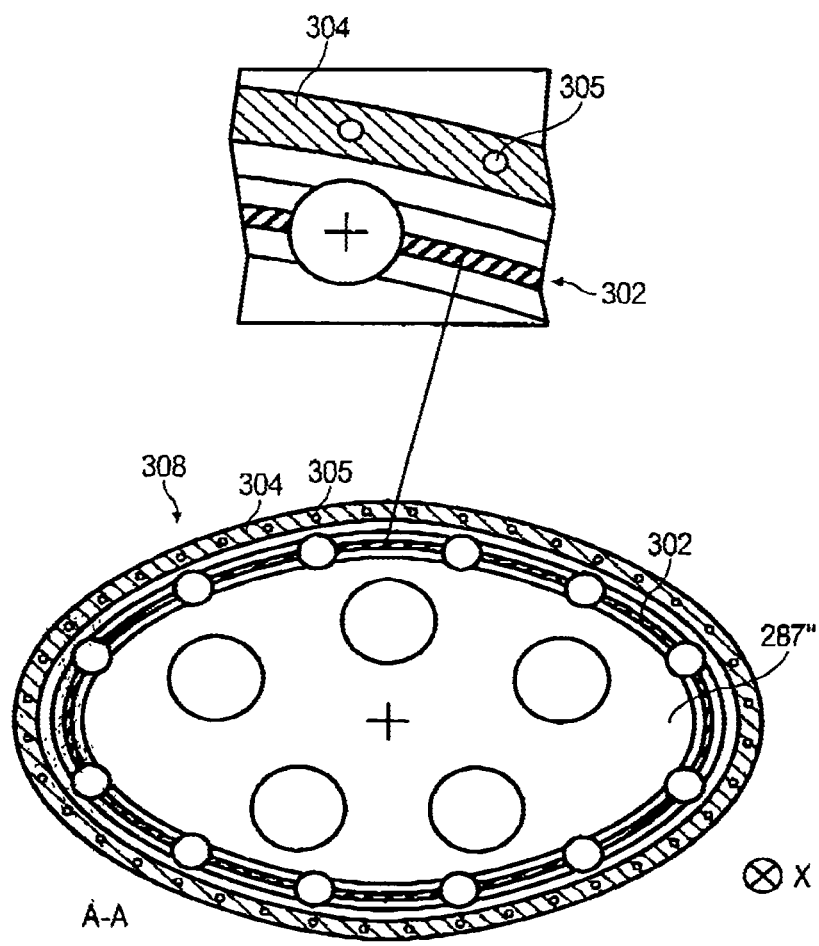
Figure 45:
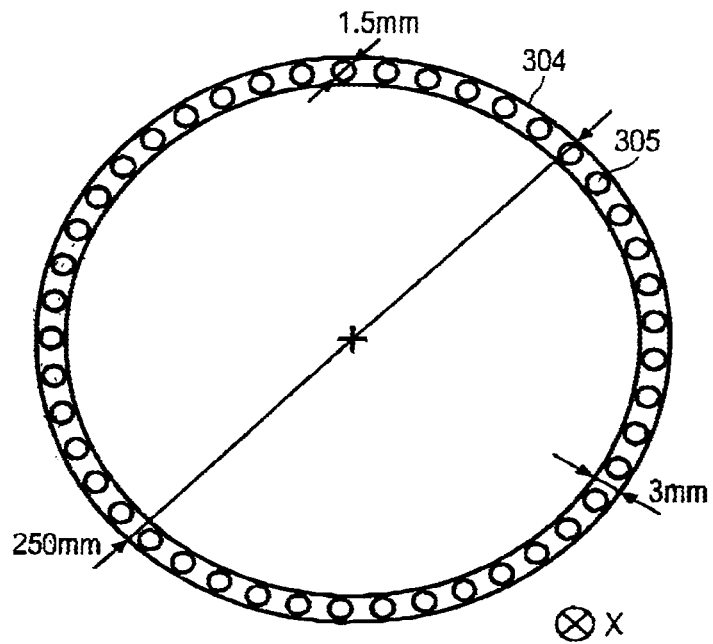
Figure 46:
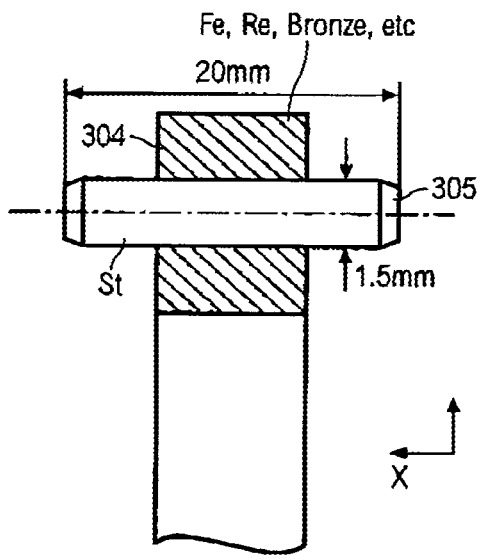
Figure 47:
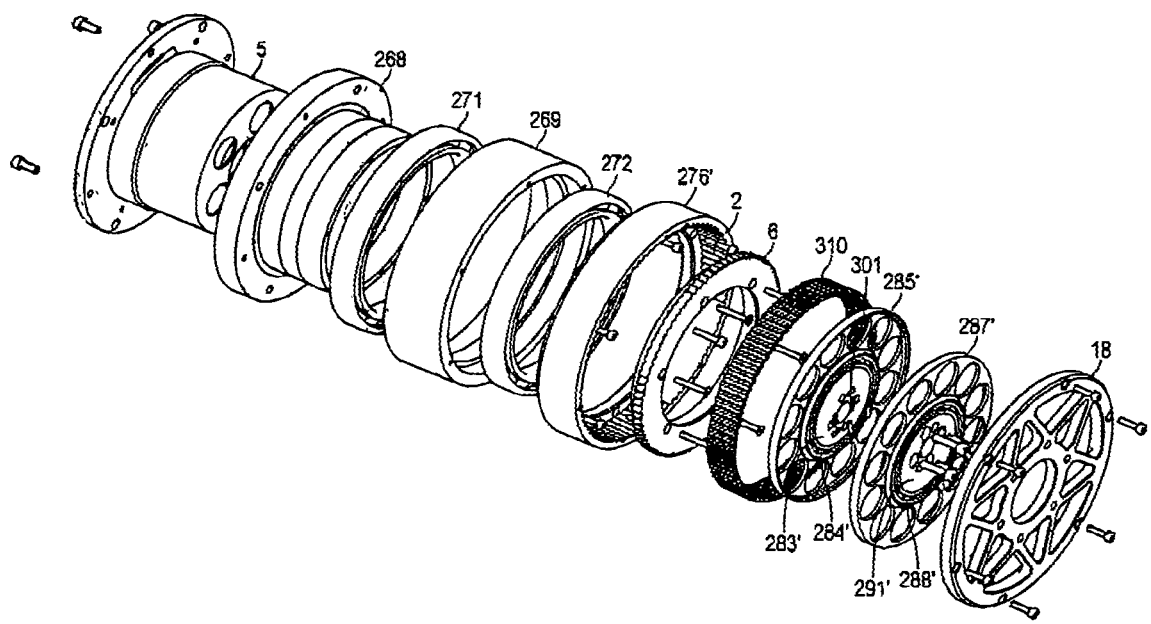
Figure 48:
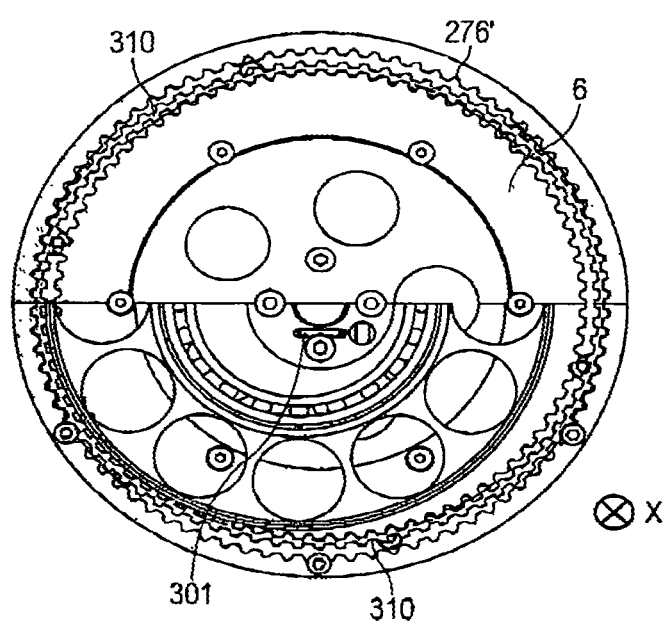
Figure 49:
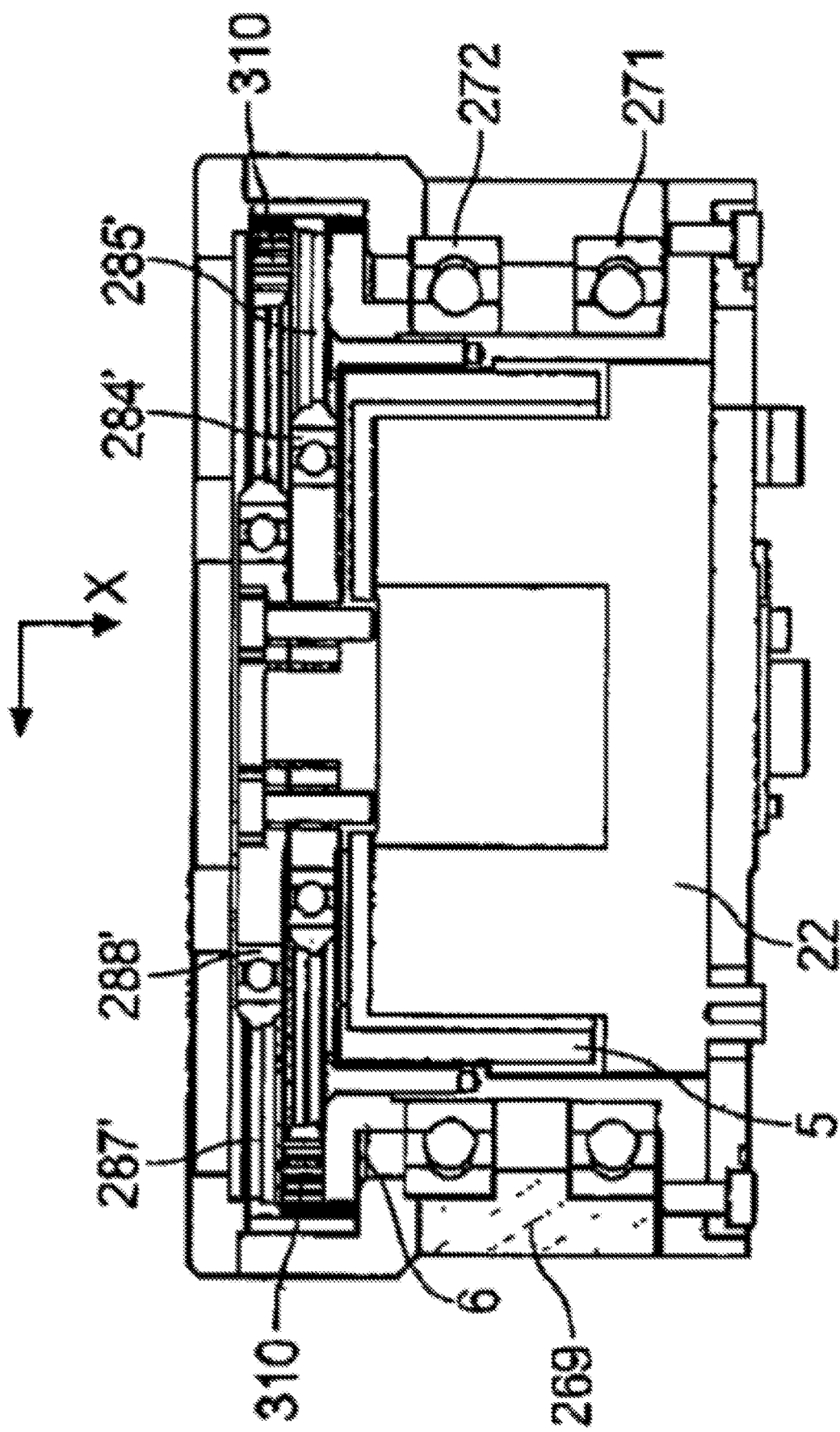

The embodiments of the application are explained in further detail with reference to the following figures, in which FIG. 1 shows a front view of a motor-gear unit as disclosed in the application, FIG. 2 shows a section through the motor-gear unit illustrated in FIG. 1 along the line of intersection marked J-J in FIG. 1, FIG. 3 shows a section through the motor-gear unit illustrated in FIG. 1 along the line of intersection marked F-F in FIG. 1, FIG. 4 shows a top view of the motor-gear unit illustrated in FIG. 1, FIG. 5 shows a section through the motor-gear unit illustrated in FIG. 4 along the line of intersection H-H, FIG. 6 shows an angled front view of the motor-gear unit illustrated in FIG. 1, FIG. 7 shows a view of the motor-gear unit illustrated in FIG. 6 with the outer wheel cover removed, FIG. 8 shows a further view of the motor-gear unit illustrated in FIG. 6, FIG. 9 shows a stator with an inner wheel carrier and inner wheel of the motor-gear unit as illustrated in FIG. 6, FIG. 10 a top view of the stator with inner wheel carrier and inner wheel illustrated in FIG. 9 with the transmitter carrier in place, FIG. 11 shows an angled rear view of a motor-gear unit as illustrated in FIG. 1, FIG. 12 shows a view of the motor-gear unit illustrated in FIG. 11 with the outer wheel removed, FIG. 13 shows a further view of the motor-gear unit illustrated in FIG. 11, FIG. 14 shows a view of the motor-gear unit disclosed in FIG. 11 with the outer wheel removed, FIG. 15 shows a section through the motor-gear unit illustrated in FIG. 14 along a plane of intersection M-M, FIG. 16 shows an angled rear view of a further motor-gear unit as disclosed in the application which is integrated in a vehicle frame, FIG. 17 shows a view of a further motor-gear unit, FIG. 18 shows a top view of a further motor-gear unit with a chain pinion fitted, FIG. 19 to FIG. 22 illustrate the function of the harmonic chain gear disclosed in the invention, FIG. 23 shows a harmonic chain gear as disclosed in one embodiment with a double chain, FIG. 24 shows a view of a harmonic chain gear as disclosed in an embodiment with a triple chain, FIG. 25 shows the harmonic chain gear illustrated in FIG. 24 along the cross-section marked F-F in FIG. 24, FIG. 26 shows an exploded drawing of a further embodiment of a harmonic chain gear with a double chain, FIG. 27 shows an exploded drawing of a further embodiment of a harmonic chain gear, FIG. 28 shows a cut-out of a double roller chain, FIG. 29 shows a partial-exploded drawing of a further embodiment of a motor-gear unit, FIG. 30 shows an exploded drawing of the gear parts omitted in FIG. 29, FIG. 31 shows a view of the motor-gear unit in FIG. 29, FIG. 32 shows a section through the motor-gear unit in FIG. 29, FIG. 33 shows a side view of the motor-gear unit in FIG. 29, FIG. 34 shows a further section through the motor-gear unit in FIG. 29, FIG. 35 shows a version of the previous embodiments with a pressure means, FIG. 36 shows an exploded view of an embodiment of a harmonic chain drive with a two-pin-row pin ring, FIG. 37 shows a cross-section through the motor-gear unit of FIG. 36, FIG. 38 shows an exploded view of an embodiment of a harmonic chain drive with a two-pin-row pin ring and with a wire race bearing, FIG. 39 shows an exploded view of an embodiment of a harmonic chain drive with a two-pin-row pin ring and with and two oval dragger disks, FIG. 40 shows a cross-section through the motor-gear unit as shown in FIG. 38 or FIG. 39, FIG. 41 shows a cross-section through the motor-gear unit as shown in FIG. 36, FIG. 42 shows a cross-section through the motor-gear unit as shown in FIG. 37, FIG. 43 shows a cross-section through the motor-gear unit as shown in FIG. 38, FIG. 44 shows a partial cross-section through the motor-gear unit as shown in FIG. 37, FIG. 45 shows a side view of a pin ring, FIG. 46 shows a cross section through an element of the pin ring, FIG. 47 shows an exploded view of an embodiment of a harmonic chain drive with a tooth belt FIG. 48 shows a first cross-section through the harmonic chain drive of FIG. 47, and FIG. 49 shows a second cross-section through the harmonic chain drive of FIG. 47.

FIGS. 1 to 15 show a first motor-gear unit 100 as disclosed in this application.

As is shown most clearly in FIG. 2, which shows a cross-section through the motor-gear unit 100 disclosed in this application along the line of intersection marked J-J in FIG. 1, said motor-gear unit 100 is divided into a cup-shaped housing 1, an inner wheel 6 which is provided in this case in one piece on an output shaft 11 mounted in the housing 1 such that it is able to rotate, and a roller chain 8 which is guided between the housing 1 and the inner wheel 6 by a transmitter carrier 5 which is mounted in the housing 1 such that it is able to rotate.

As can clearly be seen in FIG. 1, the housing 1 has on its inside radially inward facing outer wheel toothing 2, while the inner wheel 6 has radially outward facing inner wheel toothing 7. The roller chain 8 is designed such that it engages in a form-fitting connection with both the outer wheel toothing 2 and the inner wheel toothing 7.

The transmitter carrier 5 itself is most clearly illustrated in FIG. 3, which shows a further cross-section through the motor-gear unit 100 along the line of intersection marked F-F in FIG. 1.

The first transmitter 3 and the second transmitter 4 which are positioned between the outer wheel toothing 2 and the inner wheel toothing 7 and rotate peripherally with the transmitter carrier 5, each drag a section of the roller chain 8 into the outer wheel toothing 2, the roller chain 8 being lifted off the first 3 and second transmitters 4 by the inner wheel toothing.

The dragging or lifting of the roller chain 8 by the first 3 and second transmitters 4 is illustrated in FIG. 5 which shows a cross-section along the line of intersection marked H-H in FIG. 4. For this purpose the first transmitter 3 and the second transmitter 4 each have a curved sickle-shaped inner face 12 facing the inner wheel toothing 7 and a convex outer face 13 which slides along on the roller chain 8.

The transmitter carrier 5 is designed as a cylindrical body which is mounted in the housing 1 on a front radial bearing 14 and a rear radial bearing 15, such that it is able to rotate about an axis of symmetry 10 of the motor-gear unit 100. In this arrangement, the transmitter carrier 5 is designed as one piece with the first 3 and second transmitters 4 as is illustrated most clearly in FIG. 3.

To simplify the assembly of the bearing of the transmitter carrier 5, the housing 1 is made of two parts: a cup-shaped front housing section 16 and a cylindrical central housing section 17 which mate radially with one another. In this arrangement the front housing section 16 has a forwards extending bearing support 18 in which is positioned a front output shaft bearing 19. Holes 20 in the region between the radial outer part of the front housing section 16 and the bearing support 18 are shown most clearly in FIG. 6. A total of 12 such holes 20 is provided. They are sealed with transparent plastic panels (not illustrated) against oil leakage. These transparent panels provide a view of the oil level in the housing and can be used to monitor the operation of the motor-gear unit 100.

The side of the housing 1 axially opposite the front housing section 16 is closed by a cup-shaped rear housing section 9 which has a receiving opening 28 for a rear output shaft bearing 26 in which the output shaft 11 is mounted such that it is able to rotate.

A disc-shaped stator plate 50 is clamped in an axially centered position between the rear housing section 9 and the central housing section 17, where it is screwed to the rear housing section 9 with fixing bolts 51 such that it is unable to rotate. The stator plate 50 has around its periphery a plurality of armatures 22 which lie opposite the inner casing surface of the transmitter carrier 5. In this arrangement the stators/armatures 22 are surrounded by coil windings (not shown in this view) through which an electrical current flows when the motor-gear unit 1 is in operation. In addition, several intermediate circuit annular capacitors 52 with capacitor connectors 54 are provided as energy accumulators for the inverter components 53 which are also provided on the stator plate 50. Cooling bodies 55 extending between the inverter components 53 and the inner wall of the rear housing section 9 are responsible for heat dissipation. In this arrangement the rear housing section 9 is provided with cooling fins which are shown most clearly in FIG. 4.

The stator plate 50 is provided with electrical power via supply cables 56 which run out through the rear housing section 9.

Positioned on the inside or on the inner casing surface of the cylindrical transmitter carrier 5—and distributed around the periphery of the transmitter carrier 5—is a plurality of permanent magnets 21. These permanent magnets 21 are shown most clearly in FIG. 3 which illustrates a section through the motor-gear unit 100 shown in FIG. 1 along the line of intersection F-F. The rear housing section 9 and other components of the motor-gear unit 100 are removed in FIG. 3. In this arrangement the permanent magnets 21 are designed as parts of the casing surface of an imagined cylinder, such that they lie flush with the inner casing surface of the transmitter carrier 5. Due to the presence of these permanent magnets 21 the transmitter carrier becomes the rotor of an electric motor.

Lying radially opposite the permanent magnets 21 is a number of armatures 22 which are shown most clearly in FIG. 9. The armatures 22 are positioned radially around the inside of the cylindrical casing of the inner wheel 6, such that they are able to rotate about the axis of symmetry 10 together with the inner wheel 6. In this arrangement the armatures 22 are surrounded by a coil winding (not shown in this view) to which an electronic control unit (similarly not shown) applies electrical power. This generates an alternating magnetic field which interacts with the permanent magnet 21.

As is shown particularly clearly in FIG. 3, the permanent magnets 21 extend a little beyond the lower edge of the transmitter carrier 5. Fitted to the stator plate in the vicinity of the peripheral position of the permanent magnets 21 are sensors which allow the position of the transmitter carrier to be identified. In this arrangement it is possible to not only use the standard sensors such as Hall sensors, but also inexpensive optical sensors or simple induction coils in which the permanent magnets 21 generate characteristic induction currents for changes in the position of the transmitter carrier as they move past.

As shown particularly clearly in FIG. 2, the roller chain 8 has a number of bolts 23 on which are positioned rollers 24 and plates 25 which, together with the bolts 23, form a plurality of chain links. In this arrangement the external diameter of the rollers 24, the geometry of the outer wheel toothing 2 and the geometry of the inner wheel toothing 7 are designed so as to create a chain drive between the housing 1 and the inner wheel 6.

In this arrangement a seal (not illustrated here) between the housing 1 and the transmitter carrier 5 ensures that the roller chain 8 as well as the sliding contact between the transmitters 3, 4 and the roller chain 8 and the bearings 14, 15, 19 receives lubrication without oil reaching the region of the stator 22, the stator plate 50 and the magnets 21.

To give a better understanding of the structure of the motor-gear unit 100 FIGS. 6 to 15 show it in various stages of disassembly.

FIG. 6 shows an angled front view of the motor-gear unit 100 in its fully assembled state. There is a clear view through the viewing panels in the holes 20 of the manner in which the gear unit complete with outer wheel toothing 2, roller chain 8, inner wheel toothing 7 and the two transmitters 3, 4 operates.

FIG. 7 shows a view of the motor-gear unit disclosed in FIG. 6 with the front housing section 16 removed. The inner wheel 6 with the inner wheel toothing 6 is clearly visible. The oil seal on the transmitter carrier 5 in the region between the two transmitters 4, 5 has been removed in FIG. 7 giving a view of the armature stampings of the stators 22.

FIG. 8 shows a view of the motor-gear unit 100 illustrated in FIG. 6 with the stator plate 50 removed. The stators 22, which are still visible in FIG. 7, are therefore no longer visible in FIG. 8. As a result, the permanent magnets 21 are clearly visible on the inside of the transmitter carrier 5.

FIG. 9 shows the stator 22 removed in FIG. 8 with the inner wheel 6 and the output shaft 11, and FIG. 10 shows a top view of the stator with the inner wheel 6 as illustrated in FIG. 9, with the transmitter carrier 5 in place and the two bearings 14, 15 and the stator plate 50 and the capacitor connectors 54.

FIG. 11 shows an angled rear view of the motor-gear unit illustrated in FIG. 1 but with the rear housing section 9 removed. The transmitter carrier 5 with the projecting permanent magnets 21, which pass flush by the stator plate, clearly visible. The stator 22 is visible between the permanent magnets 21 and the stator plate 50. This stator 22 is shown particularly clearly in FIG. 12 in which the front housing section 16, the central housing section 17 and the transmitter carrier 5 have also been removed.

FIG. 13 shows a view of the motor-gear unit 100 as illustrated in FIG. 11 with the central housing section 17 and stator plate 50 removed.

FIG. 14 shows another view of the motor-gear unit 100 in the state illustrated in FIG. 10.

FIG. 15 shows a section through the motor-gear unit as illustrated in FIG. 14 along the line of intersection M-M. The transmitter carrier 5 with the two transmitters 3, 4 is clearly visible. The spaces between the transmitters 3, 4 are sealed against oil leakage with plastic inspection glass (not shown here).

When the motor-gear unit 100 illustrated in FIGS. 1 to 15 is in operation the chain drive with the housing 1, the inner wheel 6 and the roller chain 8 is actuated as follows. An alternating voltage is applied in an appropriate manner to the coil windings (not shown here) around the armatures 22 so as to create an alternating electromagnetic field which cooperates with the permanent magnets 21. In this arrangement an electronic control device (of which the inverter components and the intermediate circuit annular capacitors are shown here) ensures that the alternating electromagnetic field sets the transmitter carrier 5 in rotation about the axis of symmetry 10. The first 3 and second transmitters 4 move together with the transmitter carrier 5 in a circular direction about the axis of symmetry 10.

As is seen most clearly in FIG. 5, in this arrangement links in the roller chain 8 are pushed consecutively peripherally towards the outer wheel toothing 2. In the process, the subsequent chain strand in the peripheral direction of the transmitter carrier 5 pulls the inner wheel after it. In these circumstances the difference in radius between the outer wheel toothing 2 and the inner wheel toothing 7 results in a predetermined transmission ratio.

In the above described embodiment, a gear unit is combined with an electric motor. The gear unit, comprising the housing 1 with the outer wheel toothing 2, the inner wheel 6 with the inner wheel toothing 7 and with the output shaft 11, the roller chain 8, the transmitter carrier 5 with the first 3 and second transmitters 4 can also be used with another type of motor that is adapted to drive the transmitter carrier 5. It is in principle also possible to drive the output shaft 11 while securing either the transmitter carrier 5 or the housing 1. The output torque can then be tapped either from the housing 1 or from the transmitter carrier 5.

FIG. 16 shows an angled top view of a further motor-gear unit 100 as disclosed in this application. The motor-gear unit 100 in FIG. 16 is substantially the same as the motor-gear unit 100 shown in FIGS. 1 to 15. Identical parts are given the same reference numerals. In this arrangement a first frame tube 30 and a second frame tube 3 are welded to the periphery of the front housing section 16, forming a frame of a two-wheeled vehicle (not illustrated here). The output shaft 11 drives a rear wheel of the vehicle (not shown here).

FIG. 17 shows a view of a further motor-gear unit which has substantially the same parts as the motor-gear unit shown in the previous figures. Identical parts are given the same reference numerals.

In this arrangement a trailing or driven wheel 33 intended to take a tyre of a two-wheeled vehicle is screwed to the output shaft 11. The trailing wheel 33 is provided with a free-wheeling device or free-wheel 57.

As is shown particularly clearly in FIG. 17, a first transverse link 34 and a second transverse link 35*a*) are fixed to the front housing section 16.

FIG. 18 shows a further motor-gear unit 100 which is designed as a wheel hub motor of a vehicle not shown here in full. Parts which are the same as those in the motor-gear unit 100 shown in FIGS. 1 to 17 have the same reference numerals or the same reference numerals followed by an apostrophe in the case of parts with the same function but a different form.

In contrast to the preceding embodiments the output shaft 11' is fixed. It is mounted on two square ends 65 in wishbone tubes of a vehicle (not illustrated here). A rear shaft nut 64 tightens the rear housing section 9' onto a shaft projection 66 on the output shaft 11'. On the opposite side of the output shaft 11', a front shaft nut 63 sets the play of the bearing 19', 60 by means of which the front housing section 16' and the central housing section 17' are mounted such that they are able to rotate on the output shaft 11' or the rear housing section 9'.

In this arrangement the front housing section 16' and the central housing section 17' are each provided with a rim flange 62, thereby forming a rim upon which the tyre 61 is placed.

The tyre 61 is therefore driven via the front housing section 16' and the central housing section 17' while the output shaft 11' is fixed in the wishbone tubes 64.

FIG. 19 to FIG. 22 illustrate the function of the harmonic chain gear disclosed in the application. In this arrangement links in the roller chain 8 are dragged or lifted successively peripherally by the first 4 and second transmitters 4 into the outer wheel toothing 2.

In this case, the front housing section 16 is fixed to the outer wheel toothing 2. This is indicated by the letter "B" marked on the top of the front housing section 16 which is fixed in FIGS. 19 to 22.

Figure 19:
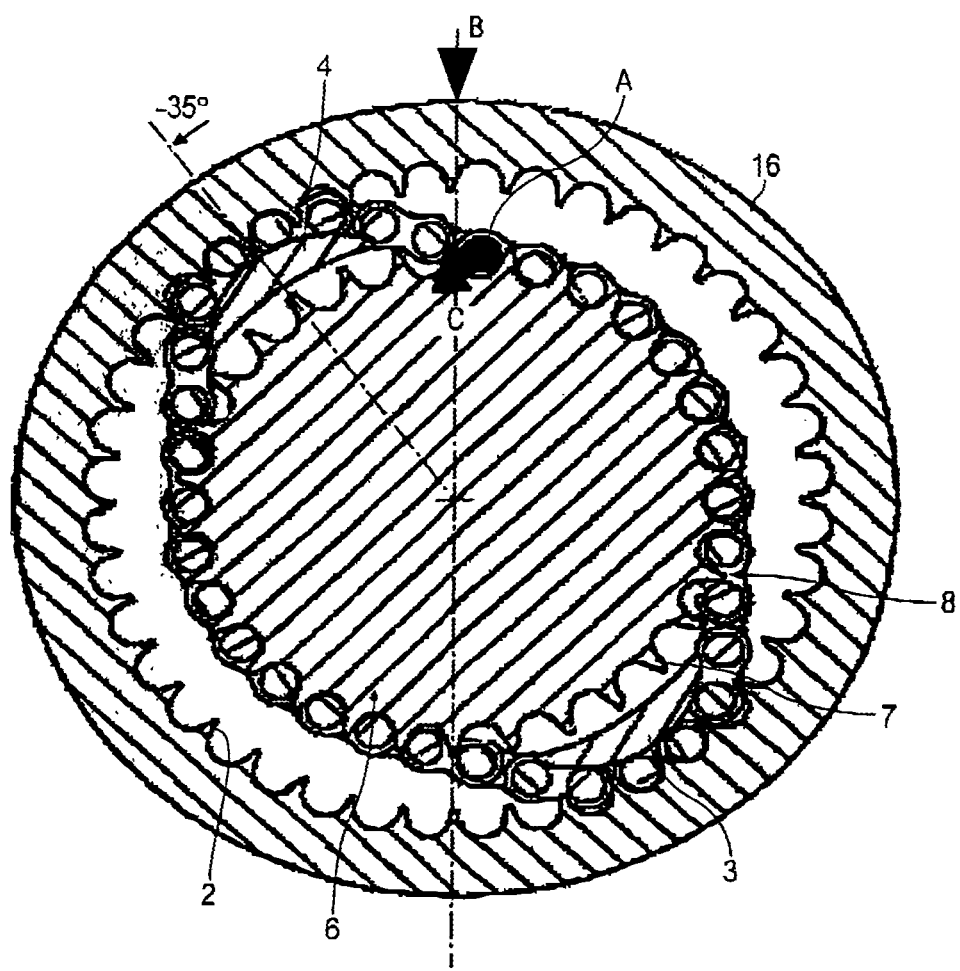
Figure 20:
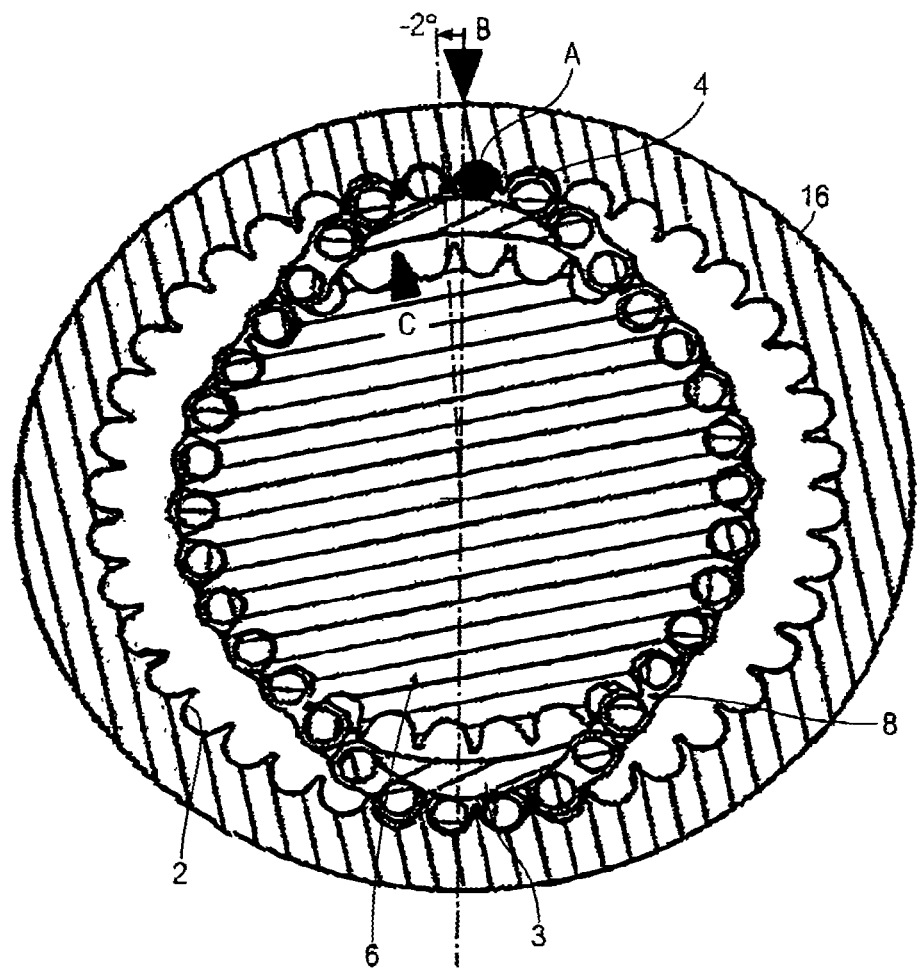
Figure 21:
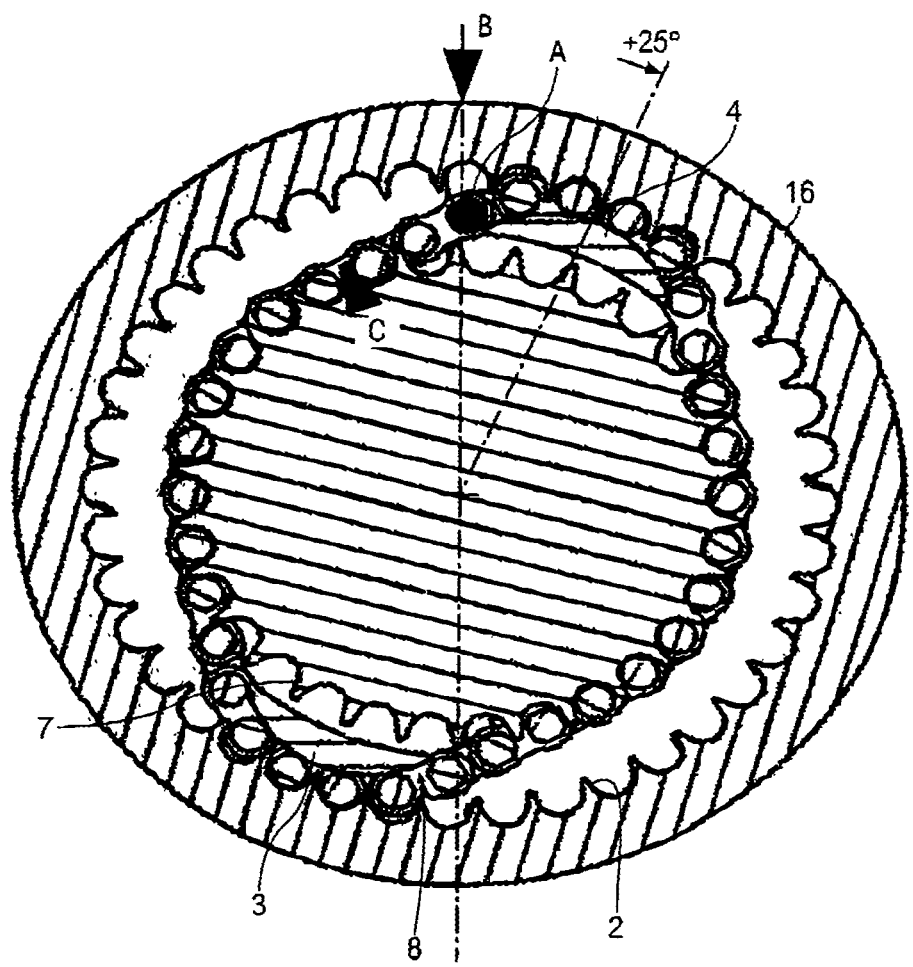

The transmitters 3, 4 revolve with the transmitter carrier 5 which rotates clockwise. In FIG. 19 the second transmitter 4 stands at a position of −35' (degrees), in FIG. 20 the second transmitter 4 stands at a position of 2° (degrees), in FIG. 21 the second transmitter 4 stands at a position of +25° (degrees) and in FIG. 22 the second transmitter 4 stands at a position of +53' (degrees).

In the process the chain strand of the roller chain 8 following the second transmitter 4 in the peripheral direction of the transmitter carrier 5 pulls the inner wheel 6 with it. This is indicated by means of the letter "C" marked on the inner wheel 6 and the letter "A" marked on the roller chain 8.

When the second transmitter 4 moves clockwise from a position of −35° (degrees) in FIG. 19 to a position of +53° (degrees) in FIG. 22, the inner wheel 6 moves by an angle of approx. 30° (degrees) anticlockwise.

In these circumstances the difference in radius between the outer wheel toothing 2 and the inner wheel toothing 7 results in a predetermined transmission ratio of approx. 3:1.

In the application, output can be achieved in several manners. Firstly, the outer wheel 1 can be fixed as is the case in the embodiments illustrated in FIGS. 1 to 17. Here output is via the inner wheel 6 when the electric motor is driving the transmitter carrier 5. Alternatively, the inner wheel 6 can be fixed as in the embodiment illustrated in FIG. 18. In this case output is via the outer wheel 1 when the electric motor is driving the transmitter carrier 5.

Alternatively it is also conceivable for the inner wheel 6 to be driven by the electric motor and to fix either the transmitter carrier 5 or the outer wheel 1. When the outer wheel 1 is fixed, output is via the transmitter carrier 5. Conversely, if the transmitter carrier 5 is fixed, output is via the outer wheel 1. In these designs it is necessary to pay particular attention to the friction characteristics in the region of the roller chain 8 to avoid self-inhibiting.

Self-inhibiting or self-locking can be avoided by means of the appropriate design of the sliding surfaces of the roller chain 8, and also by means of friction-reducing measures such as lubrication or additional bearings in the transmitters 3, 4, for example.

Accordingly the electric motor can also drive the outer wheel 1 with output being either via the transmitter carrier 5 or the inner wheel 6, depending on whether the inner wheel 6 or the transmitter carrier 5 is fixed.

The roller chain 8 can be replaced by other traction or pressure means, for example by a toothed belt which can also be provided with teeth on both sides. A similar design will be illustrated with respect to FIGS. 47-49. Instead of a form-fit as in the embodiments, whereby teeth on the wheels engage in gaps in the roller chain, a form-fit with teeth in the traction or pressure means engaging in gaps in the inner wheel or outer wheels is possible. Finally, it is also conceivable to use a friction connection between the corresponding wheels and the traction or pressure means.

FIG. 23 shows a cross-section F-F of a further motor-gear unit 100 which is designed as a wheel hub motor of a vehicle (not illustrated in full). Parts which corresponds to parts in the previous FIGS. 1 to 22 have the same reference numerals. The section is labelled F-F since the orientation of the cross-section is the same as in FIG. 3 in which the chain 8 is lifted off the inner wheel 6.

In comparison to FIG. 3, the transmitter carrier 5 is extended by a cup-shaped region 79 on the side of the inner wheel 6. Provided on the cup-shaped region 79 are two shafts 83, 84 which are positioned parallel to the axis of symmetry 10. Two gear wheels 80, 81 are mounted on ball bearings 85, 86 on the shafts 83, 84. The gear wheels 80, 81 correspond to the transmitters 3, 4 shown in FIG. 3. The gear wheels 80, 81 are engaged in the inside of a second chain 82 of a double chain 8'. The second chain 82 is indicated by means of a broken line 90. The two shafts 83, 84 are positioned opposite one another in relation to the axis of symmetry 10 and are the same distance from the axis of symmetry 10. In the embodiment illustrated in FIG. 23 this distance is smaller than the radius of the inner wheel 6.

As described above, in operation the transmitter carrier 5 is set in rotation by forces acting on the permanent magnets 21. The outside of a first chain 87 of the double chain 8' is thus drawn into the outer wheel toothing 2 by means of the gear wheels 80, 81. The inside of the first chain 87 of the double chain 8' is engaged with the inner wheel toothing 7 and the inner wheel 6 and, thus, the output shaft 11 are therefore driven in the manner previously shown in FIGS. 19 to 22.

The use of a double chain 8' allows the gear wheels 80, 81 to rotate in a plane parallel to the inner wheel 6. Thus the optimum size can be chosen for the gear wheels 80, 81. Using larger gear wheels 80, 81 increases the contact surface between the gear wheels 80, 81 and the chain 8' and between the chain 8' and the outer wheel toothing 2. The forces occurring are thus more evenly distributed and the load on the chain 8' and the outer wheel toothing 2 reduced. In addition, it is possible to make the distance between the inner wheel toothing 7 and the outer wheel toothing 2 smaller. This means that it is possible to achieve higher speed-reduction at a given tooth size.

Instead of the gear wheels 80, 81 it is also possible to use rollers which push the inside of the second chain 82 outwards. The rollers and, in particular, the gear wheels 80, 81 are able to deflect the forces which occur along the periphery of the chain 8'. This leads to lower friction losses when the chain 8' is drawn into the external teeth 2.

FIGS. 24 and 35 show a further embodiment in which a triple chain 8" is provided in place of the double chain 8' as shown in FIG. 23. Elements already shown in FIG. 23 are not reiterated. The sectional plane H'-H' shown in FIG. 24 is positioned parallel to the corresponding sectional plane H-H shown in FIG. 4 and offset towards the output shaft 11.

A transmitter disc 90 is mounted on the output shaft 11 such that it is able to rotate freely. Provided in the transmitter disc 90 are two shafts 91, 92 on each of which a gear wheel 93, 94 is positioned. The gear wheels 93, 94 are located on opposing sides in relation to the axis of symmetry 10 and engage in a third chain 88 of the triple chain 8" from within. The transmitter disc 90 is cut out in the area of the shafts 91, 92 in such a manner that the region in which the triple chain is lifted off the inner wheel 6 remains free. In the centre of the transmitter disc 90, a circular opening is left free around the output shaft. Two outer regions 95, 96 of the transmitter disc 90 are located outside the periphery of the inner wheel toothing 7 and are connected rigidly to the transmitter carrier 5 by two fixings (not illustrated). The fixings pass through the space between the inner wheel 6 and the outer wheel toothing 2.

FIG. 25 shows a section along the line of intersection marked F-F in FIG. 24 which corresponds to the section shown in FIG. 23. As shown best in FIG. 25, the gear wheels 93, 94 are positioned opposite gear wheels 80, 81 which engage in the second chain 82 of the triple chain 8" from within. Like gear wheels 80, 81, gear wheels 93, 94 are also mounted on ball bearings 97, 98. For reasons of clarity in FIG. 25 the second chain 82 and the third chain 88 are indicated by means of broken lines and only the uppermost and lowermost chain bolts are drawn in full.

Due to the axially symmetrical arrangement of the triple chain 8" in relation to the inner wheel 6 shown in FIG. 25, the load on the triple chain 8" is more uniform than for the double chain 8' shown in FIG. 23.

The transmitter disc 90 can be supported by an additional bearing on the output shaft 11. Instead of a cup-shaped region 79 the transmitter carrier 5 can also be of another suitable shape. In addition, the embodiments shown in FIGS. 23 to 25 can also be combined with the other output variants specified above. Further, it is possible to provide transmitters which are fixed to the transmitter carrier instead of the gear wheels or rollers. This results in a simpler design.

FIG. 26 shows an exploded drawing of a further embodiment of a harmonic chain gear. It is viewed from the side opposite the input. Parts located behind the inner wheel 6 in direction x are not shown. As in FIG. 23, FIG. 26 also shows a double chain 8' with a first chain 87 on the input side and a second chain 82, the first chain 87 and the second chain 82 being integrated into one integral double chain. The first chain 87 is also called first chain row and the second chain 82 is also called second chain row. Unlike in FIG. 23, a chain slide 100 for dragging the first chain 87 of the double chain 8' into the outer wheel toothing 2 is provided in the axial plane of the second chain 82. The outer wheel which contains the outer wheel toothing 2, comprises four parts, being made up of four identically shaped quarter rings 105, 106, 107, 108. The length of the double chain 8' is dimensioned such that the double chain 8' lies adjacent to the periphery of the chain slide 100. An inner wheel 6 is located in the plane of the input-side chain 87 of the double chain 8' and is designed as a ring with external toothing. A transmitter carrier 5 passes through the inside of the inner wheel 6.

The chain slide consists of four plates 3, 4, 101, 102 located in the plane of the chain 82. In the region of the plates 3, 4 the double chain 8' is lifted off the inner wheel 6. The plates 3, 4, 101, 102 thus serve as transmitters 3, 4, 101, 102 for transmitting the torque between the toothing of the inner wheel 6 and the outer wheel toothing 2. The plates 3, 4, 101, 102 of the chain slide 100 are screwed in position between a round centring plate 104 and a disc-shaped slide chain holder 103. The centring plate 104 and the chain slide holder 103 thus form components of the transmitter carrier 5. Screw holes are provided in the quarter rings 105, 106, 107, 108 of the inner wheel 6, in the chain slide holder 103, in the plates of the chain slide 100, in the centring plate 104 and in the front housing section 16 for assembly from the front. If input is to be via the outer wheel and output via the transmitter carrier 5, assembly is carried out as follows. The outer wheel is screwed to a hollow cylinder which is connected to a rotor of the drive motor. The inner wheel 6 is screwed to a further hollow cylinder which is connected to the stator 22. In addition, the chain slide holder 103, the chain slide 100 and the centring plate 104 are screwed to the output shaft 11 by means of screw holes positioned one above the other.

In an alternative embodiment to FIG. 26 the chain slide of the transmitter carrier can also be designed as one part and the inner wheel can consist of a different number of parts. The transmitter carrier 5 can also be designed such that rollers or gear wheels—as shown in FIG. 23—are fitted to it which drag or lift the double chain 8' into the outer wheel toothing 2.

Due to the use of a double chain 8', the pressure force of the transmitter 3, 4, 101, 102 does not act directly on the outer wheel 105, 106, 107, 108. Any running noise can be compensated for by the double chain 8'. In particular, the outer wheel can be made from a plurality of parts and is thus easier to manufacture.

In the above described embodiment, a gear unit is often combined with an electric motor. The gear unit comprising the double chain 8', the chain slide 100, the outer wheel toothing 2, the inner wheel 6, and the transmitter carrier 5 with the transmitters 3, 4, 101, 102 can be combined with any type of motor, engine or turbine. It is in principle possible to drive the outer wheel 105, 106, 107, 108, the inner wheel 6 or the transmitter carrier 5. If the outer wheel 105, 106, 107, 108 is driven, one can then secure either the transmitter carrier 5 and tap the output torque from the inner wheel 6 or one secures the inner wheel 6 and taps the output torque from the transmitter carrier 5. If the inner wheel 6 is driven, one can then secure either the transmitter carrier 5 and tap the output torque from the outer wheel 105, 106, 107, 108, or one can secure the outer wheel 105, 106, 107, 108 and tap the output torque from the transmitter carrier 5. If the transmitter carrier 5 is driven, one can then either secure the inner wheel 6 and tap the output torque from the outer wheel 105, 106, 107, 108, or one can secure the outer wheel 105, 106, 107, 108 and tap the output torque from the inner wheel 6.

FIG. 27 shows an exploded drawing of a further embodiment of a harmonic chain drive. Components similar to those shown in FIG. 26 have the same reference numerals. Instead of the chain slide 100 shown in FIG. 26, FIG. 27 has discs 109, 110 with a circular shape for dragging or lifting the double chain 8' into the outer wheel toothing 2. The discs 109, 110 are mounted on ball bearings 111, 112 on shafts 113, 114 such that they are able to rotate. The shafts 113, 114 are fitted to a dragger holder 103 parallel to the axis of symmetry 10 and they are positioned opposite one another in relation to the axis of symmetry 10 and they are located essentially at the same distance from the axis of symmetry 10.

FIG. 28 shows a cut-out from the double chain 8' as used in the embodiment as shown in FIG. 26. The double chain 8' is designed as a roller chain. In the double chain 8', a bush 117 is surrounded by a roller 24. The two bushes 117 are connected together by two plates 25. Four outer plates 116 join two chain links. The four outer plates 116 sit directly on the bolts 23.

Provided between a bush 117 and a roller 24 is a space into which lubricant can be introduced. The rollers 24 are therefore able to rotate freely on the bush 117. The use of a roller chain rather than a simple bush chain reduces the friction between dragger and chain as a result of the rotating rollers. Thus in the embodiment illustrated in FIG. 27 it is possible to dispense with the ball bearings 111, 112.

On the other hand, a chain without rollers, a bush chain or bolt chain for example, can also be used if any slip between dragger and chain is compensated for by ball bearings such as in the embodiment of FIG. 27.

As can be seen best in the embodiments of FIGS. 24, 25, and 27, it is possible to design a region of the transmitter carrier as a toothed or non-toothed eccentric disc which is mounted eccentrically in relation to the axis of the output shaft to transmitting torque over the chain 8, 8', 8" between the outer wheel toothing 2 and the inner wheel 6. In this arrangement, the region of the toothing of the eccentric disc about the point furthest away from the axis of the output shaft 11 and the eccentric mounting of the eccentric disc corresponds to a transmitter as shown in the embodiments of FIGS. 1-15 or FIG. 26. The inner wheel 6 is pressed against the chain 8, 8', 8" by an eccentric movement of the toothed eccentric disc, and the chain 8, 8', 8" is moved further by the eccentric movement of the eccentric disc. If the inner wheel 6 is moved in relation to the outer wheel, the chain 8, 8', 8" would engage the transmitter and move the transmitter carrier 5 around its axis of rotation.

When using an eccentric disc as a transmitter, it is possible to use balls or rollers—rather than a traction means—as pressure means to roll around the rounded spaces between the teeth of the outer external toothing 2.

FIGS. 29 to 34 show a further embodiment of a motor-gear unit with a double chain. In this embodiment the output shaft takes the form of an output ring 269. The eccentric discs 283, 291, eccentric cam bearings 284, 288 and dragger discs 285, 287 form a transmitter.

FIG. 29 shows a partially-exploded drawing of the further embodiment of a motor-gear unit. The gear parts of the motor-gear unit are omitted in FIG. 29; they are shown in FIG. 30 and are indicated by a number of dots in FIG. 29. FIG. 29 shows, from left to right, a front housing section 16, a motor block 270 with a partially-visible stator block 22 and a rotor 5, a support cylinder 268 on which an output ring 269 is concentrically mounted on a first output bearing 271 and a second output bearing 272, and a bearing holder 18'.

Positioned concentrically inside the motor block 270 is a shaft 11 (not illustrated in FIGS. 29 and 30). Similar to the embodiment shown in FIG. 18, this shaft 11 is fixed to a frame by a wishbone, which is also not shown here. The output ring 269 is connected to a rim flange in a manner similar to that shown in FIG. 18. Unlike in FIG. 18, however, the output ring 269 is mounted on a support cylinder 268 and not directly on the rotor 5, as shown in FIG. 18. This increases stability and reduces friction in comparison with the version shown in FIG. 18. In addition, in the version shown in FIG. 29 it is easier to use the same motor design as is used when output is via the inner wheel.

The support cylinder 268 is designed as a hollow cylinder with a flange, the flange of the support cylinder 268 being screwed to a flange on the motor block 270. The output bearings 271, 272 are designed as annular ball bearings which are positioned concentrically inside the output ring 269, one on the motor side and one on the gear side.

Located between the gear-side output bearing 272 and the bearing holder 18' are gear parts which are shown in FIG. 30.

FIG. 30 shows an exploded drawing of the gear parts omitted in FIG. 29. FIG. 30 shows, from left to right, an annular outer wheel holder 275, an annular inner wheel 6, a double chain 8', an outer wheel 276 consisting of the four identical ring sections 277, 278, 279, 280, an outer wheel holding ring 281, a disc-shaped eccentric cam holder 282, a motor-side eccentric cam 283, a motor-side eccentric cam bearing 284, a motor-side dragger ring 285, a gear-side dragger ring 287, a gear-side eccentric cam bearing 288, a spacer ring 290, a gear-side eccentric cam 291 and a rim holder 18', as shown in FIG. 29.

The outer wheel holder 275 is screwed firmly to a front face of the rotor 5, which is shown in FIG. 29. The four ring components 277, 278, 279, 280 of the outer wheel 276 are fixed between the outer wheel holding ring 281 and the outer wheel holder 275 via screw holes.

The outer wheel 276, the outer wheel holder ring 279 and the rim holder 18' are screwed via screw holes positioned one above the other to the outer wheel holder 275, which is in turn screwed firmly to the output ring 269.

The motor-side circular eccentric disc 283 is screwed fast eccentrically to the disc-shaped eccentric cam holder 282 which is in turn screwed fast concentrically to the front face of the rotor 5. Located on the eccentric cam holder 282 is a disc-shaped projection on which is placed the motor-side eccentric cam bearing 284. Positioned concentrically to the centre point of the motor-side eccentric disc 283 on the outside of the motor-side eccentric disc 283 is the motor-side eccentric cam bearing 284. Positioned concentrically to the centre point of the motor-side eccentric cam bearing 284 on the outside of the motor-side eccentric cam bearing 284 is the motor-side dragger ring 285.

The gear-side circular eccentric disc 291 is screwed fast to the motor-side circular eccentric disc 283. Located between the eccentric discs 283 and 291 is spacer ring 290, which is placed on a disc-shaped projection 286 of the motor-side eccentric cam 283. Positioned concentrically to the centre point of the gear-side eccentric disc 291 on the outside of the gear-side eccentric disc 291 is the gear-side eccentric cam bearing 288. Positioned concentrically to the centre point of the gear-side eccentric cam bearing 288 on the outside of the gear-side eccentric cam bearing 289 is the gear-side dragger ring 287.

In this arrangement the motor-side eccentric disc 283 and the gear-side eccentric disc 291 are positioned in relation to one another such that the point on the eccentric disc 283 furthest away from the shaft 11 and the point on the eccentric disc 291 furthest away from the shaft 11 are opposite one another in relation to the shaft 11. In addition, the eccentric cam holder 282, the motor-side eccentric cam 283 and the gear-side eccentric cam 291 are screwed to a front face of the rotor 5 by four screws which pass through screw holes positioned one above the other. These screws are indicated schematically in FIG. 30. The two identical dragger rings 285 and 287 have an L-shaped profile as are shown particularly clearly in FIG. 32. It is therefore possible to make the two identical eccentric cam bearings 284 and 288 and the two eccentric discs 283 and 291 thicker than the width of the gear-side chain 274 of the double chain 8'.

The inner wheel 6 is positioned in the axial plane of a motor-side chain 273 of the double chain 8', whereas the outer wheel 76 and the motor- and gear-side dragger rings 85, 87 are positioned in the axial plane of a gear-side chain 274 of the double chain 8'. The radii of the dragger rings 285, 287 are dimensioned such that the gear-side chain 274 of the double chain 8' engages in the outer wheel toothing 2 in two dragger regions in which the dragger rings 285, 287 lie adjacent to the double chain 8', the two dragger regions being substantially opposite one another in relation to the axis of symmetry of the shaft 11. In addition, the length of the double chain 8' is dimensioned such that the motor-side chain 73 of the double chain 8' engages in the inner wheel 6 in two regions which are roughly opposite one another and which are approximately 45 degrees distant from the dragger regions.

In the embodiment of FIGS. 29-34, the transmitter carrier and the transmitter comprise the eccentric cam holder 282, the eccentric cam 283, the eccentric cam bearing 284, the dragger ring 285, the dragger ring 287, the gear-side eccentric cam bearing 288, the spacer ring 290, the gear-side eccentric cam 291 and the rim holder 18'. The transmitters comprise the dragger ring 258 and the dragger ring 287, respectively. Furthermore, an outer wheel 276 with an outer wheel toothing 2 is given by the four ring components 277, 278, 279, 280, 276.

FIG. 31 shows a view of the motor-gear unit of FIG. 29 as seen from the gear side. In this arrangement, the motor-side dragger ring 285, the gear-side dragger ring 287 and the gear-side eccentric cam bearing 288 are visible through the holes in the rim holder 18'.

FIG. 32 shows a section through the motor-gear unit of FIG. 29 along the line of intersection marked K-K in FIG. 30 which runs through the opposing dragger regions. The two chain rows 273, 274 of the double chain 8' are shown in cross-section, one continuous chain bolt being visible on the left and another on the right. The inside of the dragger rings 285, 287 in opposing dragger regions lie adjacent to the gear-side chain 274 of the double chain 8'. The motor-side chain 273 of the double chain 8' is lifted off the inner wheel in the plane of the line of intersection K-K.

FIG. 33 shows a side view of the motor-gear unit of FIG. 29. In order to illustrate the internal structure of the motor-gear unit in FIG. 33 the line of intersection L-L is shown as angled.

FIG. 34 shows a further section through the motor-gear unit of FIG. 29 along the line of intersection marked L-L in FIG. 33. The motor-side dragger ring 285, the motor-side eccentric cam bearing 284 and the spacer ring 290 placed in front of it are shown in the front part of the sectional plane which runs through the gear-side chain 274 of the double chain 8'. FIG. 34 shows that the radius of the spacer ring 290 is dimensioned such that it is larger than the smallest distance between the motor-side eccentric cam bearing 284 and the axis of symmetry of the shaft 11.

A further part of the motor-side eccentric cam bearing 284 is shown in the rear section of the cutting plane L-L which runs through the motor-side chain 273 of the double chain 8'. The inner wheel 6, adjacent to which lies the motor-side chain 273 in the lower region of FIG. 30, is also shown. Behind it can be seen part of the front face of the rotors 5 in which ventilation holes are provided.

When the motor is in operation, the rotor 5 is set in rotation by the action of a force on permanent magnets fitted to it. This causes the eccentric discs 283, 291 which are screwed to the rotor 5, to rotate about the shaft 11. The rotation of the eccentric discs 283, 291 about the shaft 11 is transmitted via the eccentric cam bearings 284, 288 to the dragger discs 285, 287, which are positioned concentrically in relation to the axis of symmetry of the eccentric cam 283, 291. The rotation of the dragger discs 285, 287 causes the dragger regions of the gear-side chain 274 to rotate about the axis of symmetry of the shaft 11 as well. In the process the dragger discs 285, 287 rotate on the eccentric cam bearings 284, 288 and thereby deflect, the lateral force of the double chain onto the dragger discs 285, 287.

The double chain 8' has fewer chain links than the number of teeth on the outer wheel 276. In addition, the chains of the double chain 8' engage in the teeth in the inner wheel 6 and the outer wheel 276. The double chain 8' therefore has no slip in relation to them. As a result the outer wheel must progress nA−nK teeth, i.e. (nA−nK)/nA*360°, around the shaft 11 for each revolution of the dragger discs, nA being the number of teeth on the outer wheel and nK being the number of chain links in the double chain 8'. This gives a speed reduction ratio of nA/(nA−nK).

The outer wheel 276 transmits its rotational movement to the outer wheel holder 275, and to the output ring 269 to which it is connected by a screw connection. The output ring 269 rotates on the output bearings 271 and 271. The rotational movement of the output ring 269 is transmitted to a drive wheel of a vehicle. This can be achieved directly via a drive wheel rim flange fitted directly to the output ring 269 or indirectly via a chain drive in a manner similar to that shown in FIG. 18.

A motor-gear unit as shown in the embodiment illustrated in FIGS. 29 to 34 offers a number of advantages. Since the distance between the dragger rings 285, 287 and the shaft 11 remains constant and the dragger rings 285, 287 also largely fill the space inside the outer wheel, very little imbalance is generated.

Due to the special arrangement of the dragger rings 285, 287 it is possible to choose large dragger ring 285, 287 radii. This enables the dragger regions to be extended so that no sporadic loads occur. In addition it is also possible to achieve a higher speed reduction since the change length of the double chain 8' can also be longer.

The mounting of the dragger rings 285, 287 on ball bearings 284, 288 which are positioned a preset distance from the shaft 11 ensures that no or little slip occurs between the double chain 8' and the outer wheel toothing 2. Friction losses are also reduced. In addition it is not necessary to use a roller chain to compensate for slip. A simple bolt chain is sufficient. This also means that the design of the double chain 8' can be more stable.

Further advantages of the embodiment with the double chain as illustrated in FIGS. 29 to 34 have already been detailed in relation to the embodiments shown in FIGS. 23 to 27 with the double/triple chain. The same or similar advantages apply here.

In the embodiment illustrated in FIGS. 29 to 34, it is possible to use a double roller chain instead of, or in addition to, the eccentric cam bearing 284, 288.

In a version of the embodiment illustrated in FIGS. 29 to 34 the output can also be via the inner wheel 6. To this end, the dragger discs 285, 287 and the outer wheel 276 are provided in the motor-side chain plane 273 and the outer wheel 276 is fixed to a stationary part of the housing. The inner wheel 6, on the other hand, is provided in the gear-side chain plane 274 and the inner wheel 6 is fixed to an output ring 269.

In this arrangement the radius of the output ring 269 is usefully larger than the radius of the outer wheel 276. In this context, the term 'fix' is taken to include indirect fixing using intermediate parts.

In the case of both output via the outer wheel 276 and output via the inner wheel 6 it is also possible to transmit the rotational movement inwards to an output shaft 11, instead of outwards to an output ring 269, in which case both the output ring 269 and the output bearings 271, 272 are omitted. The inner wheel 6 and the outer wheel 276 can then be fixed to the output shaft 11, and the output shaft 11 can be supported on ball bearings in a manner similar to that illustrated in FIG. 2 for the inner wheel 6.

FIG. 35 shows a version of the previous embodiments having a pushing means or pressure means. A pressure means 131 is provided between a rotating inner wheel 6 and a stationary outer wheel 130 in place of a traction means. The pressure means 131 may for example take the form of a flexible metal ring or metal cylinder. The pressure means 131, the inner wheel 6 and the outer wheel 130 are shaped such that there is little or no slip between the pressure means 131 and the inner wheel 6 and between the pressure means 131 and the outer wheel 130. This shaping may take the form of teeth, for example.

Two pressure wheels 132, 133 are positioned on a rotating carrier ring 134 in such a manner that they are positioned before the pressure means 13 in the direction of movement of the carrier ring and make contact with the pressure means 131. In this arrangement the carrier ring and the pressure wheels 132, 133 correspond to a transmitter located between the inner wheel 6 and the outer wheel 130. To reinforce the pressure means 131 it is also possible to optionally provide stabilising wheels 135, 136 which work against the pressure wheels 132, 133 adjacent to the pressure means. As a further option it is also possible to provide as a component of the transmitter two further pressure wheels (not illustrated) in order to push the pressure means against the inner wheel from the outside. The pressure wheels or stabilising wheels are positioned such that they are able to rotate about their axis and the pressure means 131 are able to revolve. The revolving pressure means 131 transmits its revolving movement to the inner wheel 6.

In the version illustrated in FIG. 35 it is also possible for the inner wheel to be stationary and output to be via the outer wheel 130. In this case input and output both have the same direction of rotation.

FIGS. 36 to 46 show further embodiments wherein parts which are already mentioned above are not in explained in further detail.

FIG. 36 shows an exploded view of an embodiment with a two-pin-row pin ring 308. To the right of the second output bearing 272 FIG. 35 shows, from left to right, a first inner ring 6', a two-pin-row pin ring 308, a motor side dragger disk 285' with motor side eccentric cam 283' and motor-side eccentric cam bearing 284', a gear side dragger disk 287' with a gear-side eccentric cam 291' and a gear-side eccentric cam bearing 288', a second inner ring 6" as well as parts shown in previous embodiments. The dragger disks 285' and 287' are shaped as circular disks.

This is a three row gear design wherein the two pairs 6', 2' respectively 6", 2" of an inner wheel and an outer wheel are located in different axial planes, wherein the transmitter carrier with transmitters 285', 287', 283', 284', 288', 291' is located in a third axial plane between the two pairs 6', 2' respectively 6", 2" of an inner wheel and an outer wheel. The first inner ring 6' and the second inner ring 6" are connected to the stator 22. An outer wheel toothing 2', 2" is designed as a two row inner toothing of an output ring 269.

Here, the two pin rows of the pin ring 308 as a traction means extend between the inner peripheries 2', 2" of the outer wheels and the outer peripheries 7', 7" of the inner wheels 6', 6". The protruding parts of the pins 305 which can be best seen in FIG. 46 provide the function of the bolts of a traction chain that interact with the teeth of the outer wheels and inner wheels 6', 6". In the case of a driven transmitter 285', 287', 283', 284', 288', 291', the pin ring 308 is lifted off the outer peripheries 7', 7" of the inner wheels 6', 6" and pushed against the inner peripheries 2', 2" of the outer wheels, thereby creating a relative movement between the inner wheels and the outer wheels. In cases, where the inner wheels 6', 6" are driven, a relative movement between the outer wheels and the pin ring 308—and thereby the transmitter 285', 287', 283', 284', 288', 291'—is provided. In still other cases, where the outer wheel is driven, a relative movement between the inner wheel 6', 6" and the pin ring 308—and thereby the transmitter 285', 287', 283', 284', 288', 291'—is provided. The transmitter 285', 287', 283', 284', 288', 291' is then driven by the pin ring 308.

The output ring 269 is rigidly connected to an output drive such as a rim flange.

On the motor-side eccentric cam 283' four adjustment slits 301 are provided, which are oriented at a right angle to a radius of the motor-side eccentric cam 283'. The four adjustment slits 301 comprise two pairs of adjustments slits. The adjustment slits 301 of each pair have the same orientation and the adjustments slits 301 of the pairs are oriented perpendicular to each other. Guiding cylinders are provided in the adjustment slits, which can be seen in FIG. 47. Holes in the gear side eccentric cam 291' are shaped as oblong holes.

Via the adjustment slits 301, the eccentricity of the dragger 285' and 287' can be adjusted by shifting the eccentric cams 283', 291' and thereby the dragger disks 285' and 287' along the adjustments slits 301. Thereby, the two-pin-row pin ring 308 is tightened. When the center of the gear side eccentric cam 291' is moved away from the symmetry axis 10 along two of the guiding cylinders, the pin ring 308 is tightened. The oblong holes of the gear-side eccentric cam 291' allow movement of the gear-side eccentric cam 291' relative to screws which pass through the oblong holes.

When the gear side eccentric cam is tightened to the motor side eccentric cam via the screws, which pass through the oblong holes of the gear side eccentric cam 291' and through corresponding holes of the motor side eccentric cam 283', the gear side eccentric cam 291' is pressed against the guiding cylinders and against the motor side eccentric cam 291', and the position of the gear side eccentric cam 291' is fixed.

FIG. 37 shows a cross section through the motor-gear unit of FIG. 36.

FIGS. 38 and 39 show an exploded view of two embodiments of a harmonic chain drive with a two sided pin ring 308 and a wire race bearing 302. In contrast to the embodiment of FIG. 36, the dragger disks 285" and 287" are not designed as circular dragger disks but as oval shaped dragger disks. Preferentially, the center of the ovals lies on the symmetry axis 11 such that the oval shaped disks lie on top of each other. The eccentric cams 283', 291' shown in FIG. 36 are not used in the embodiment of FIG. 38. Also, the eccentric cam bearings are not used here. Instead, the friction is taken up by the wire race bearing 302, 303 also known as "Franke bearing". The wire race bearing 302, 303 is arranged between the dragger disks 265", 287" and the output ring 269. Through the revolving movement of the dragger disks 285", 287" the wire race bearing 302, 303 is deformed and is pressed against the outer wheel toothing 2. During operation, the wire race bearing 302, 303 takes up the friction between the dragger disks 285", 287" and the inner surface of the two-pin-row pin ring 308, which can be best seen in FIG. 46.

FIGS. 38 and 39 differ in the type of wire race bearing 302, 303. In FIG. 38 a complete wire race bearing 302 is used, comprising four wire rings and a flexible ball cage. The four wire rings are arranged such that they enclose the balls of the ball bearing. The balls are held in the flexible ball cage. The four wire rings can be seen in the cross sectional view of FIG. 43. In alternative embodiments, the number of the wire rings may also be two, three or more than four. In FIG. 39, an inner part 303 of a wire race bearing is used, comprising a flexible ball cage but no wire rings.

FIG. 40 shows a cross sectional view through a motor gear unit according to FIG. 38 or FIG. 39. A slit is provided between the inner wheel toothing and the outer wheel toothing such that the slit is just large enough to take up the pins 305. The smaller the slit, the larger the transmission ratio for a given tooth size of the toothings. As a result, particularly large transmission ratios are possible for the embodiments with a pin ring 308.

FIG. 41 shows a cross section through the motor gear unit according to FIG. 36. The cross section is taken in a plane that passes through the opposing dragger regions, from which one dragger region is shown. It can be seen that the motor side dragger ring 285' pushes against a flexible ring 304 of the pin ring 308 such that the pin 305 pushes against an outer wheel. The outer wheel is designed as two outer wheels which are realized as inner toothings of the bearing support 18 and the output ring 269, which are rigidly connected with screws. The toothings are not shown here, but in FIG. 36. The eccentric cams on which the dragger rings 285', 287' are supported via bearings are screwed to the rotor 5 via four screws from which on screw end is visible in FIG. 42.

FIG. 46 shows a detailed view of the two-pin-row pin ring 308. The two pin rows of the two-pin-row pin ring 308 are formed by steel made pins 305 of width 20 mm and thickness 1.5 mm which are protruding from both sides of the central elastic ring 304. The elastic ring 304 is preferentially made from metal, such as iron, aluminium, bronze or other alloys. The elastic ring 304 comprises elongated gaps in which the pins 305 may be fitted.

FIG. 42 shows a cross sectional view through the motor gear unit according to FIG. 37. The cross section is similar to the cross section of FIG. 41. But in contrast to FIG. 41, the flexible ring is pushed outside not by two slightly axially asymmetric dragger discs but by the balls of the bearing that are located in the middle plane of the flexible ring element 304 of the traction means or pin ring such that the balls follow a circular path on the inner surface of the pin ring 308. It can further be seen that balls of an inner part of a wire race bearing are supported in a round groove of the oval dragger disks 285", 287", so as to guide the balls from the inner side. A flexible cage of the inner part of the wire race bearing is shown in cross section. On the inside of the flexible ring 304, a round groove is provided as well, so as to guide the balls from the outer side. Through the use of the circular grooves it is no longer necessary to provide ring wires to guide the balls but a flexible cage with balls is sufficient, such as provided by an inner part of a wire race bearing.

FIG. 43 shows a cross sectional view through the motor gear unit according to FIG. 38. In contrast to the previous FIG. 42, a full wire race bearing is provided. The four wires can be seen in the outer corners of a square-shaped gap, which is bound by a rectangular opening of the dragger disks 285", 287". and a rectangular opening on a part on the inside of the flexible ring 304 of the pin ring 308. The four wires are supported by the rectangular opening. A ball cage is shown in cross-section on each side of the ball.

FIG. 44 shows a partial cross section through the motor gear unit according to FIG. 37. From the inside to the outside, an oval dragger disk 287', the wire race bearing 302 and the two-pin-row pin ring 308 are shown. A ball cage and wire rings of the race ball bearing 302 are shown from the side. In an enlarged section, the ball cage is shown from the side.

FIGS. 45 and 46 show detailed views of the two-pin-row pin ring 302. In this view, an inner and an outer border of an elastic ring 304 are shown, in which pins 305 are provided with a diameter of 1.5 mm. The distance from the inner to the outer ring is 3 mm and the radius of the undeformed race ball bearing is 205 mm. An advantage of the race ball bearing 302 in the abovementioned embodiments is its deformability by the pressure of the dragger disks 285', 285", 287', 287".

In the embodiments of FIGS. 36-46, which comprise a pin ring 302, a transmitter carrier with transmitters which is arranged inside the pin ring 302, revolves around the axis 10. The transmitters push against the flexible inner ring of the pin ring 302 and, in two opposing dragger regions, lift the pins of the pin ring from the inner wheel/wheels. In the dragger regions, the pins 305 of the pin row are pushed between the teeth of the outer wheel toothing/toothings. The pins 305 in turn exert a lateral force against the outer wheel toothing/toothings such that the outer wheel turns.

In the embodiments, the transmitters are realized as circular or oval shaped dragger disks or dragger rings and the transmitter carriers are realized as a support on which the transmitter are fixed. A bearing which takes up the friction can be seen as part of the transmitter for those embodiments which provide a flexible bearing between the dragger disks and the outer wheel toothing and as part of the transmitter carrier in the embodiments in which the dragger disks are supported on the bearing from the inside.

FIG. 47 shows a further embodiment in which a tooth belt 310 is used as pressure means.

To the right of the second output bearing 272 FIG. 35 shows, from left to right, an outer wheel 276', a first inner ring 6', a tooth belt 310, a motor side dragger disk 285' with motor side eccentric cam 283' and motor-side eccentric cam bearing 284', a gear side dragger disk 287' with a gear-side eccentric cam 291' and a gear-side eccentric cam bearing 288', as well as parts shown in previous embodiments. The dragger disks 285' and 287' are shaped as circular disks.

This design corresponds to a two row gear design wherein the the inner wheel 6 and the dragger disks 285', 287' are located in two different axial planes. The outer wheel 276' extends over the whole width of the tooth belt 310, in contrast to the previous embodiments comprising a two-pin-row pin ring. The inner ring 6 is connected to the stator 22. An outer wheel toothing 2 is designed as inner toothing of an outer ring 276'.

The tooth belt 310 as a traction means extends between the inner periphery 2 of the outer wheel 276' and the outer periphery of the inner wheel 6. The teeth of the tooth belt 310, which is designed as a tooth belt with inner and outer toothing, have the function of the bolts of a traction chain that interact with the teeth of the outer wheel 276' and the inner wheels 6. In the case of a driven transmitter 285', 287', 283', 284', 288', 291', the tooth belt 310 is lifted off the outer periphery 7 of the inner wheels 6 and pushed against the inner peripheries 2 of the outer wheel 276', thereby creating a relative movement between the inner wheels and the outer wheels. In cases where the inner wheel 6 is driven, a relative movement between the outer wheel 276' and the tooth belt—and thereby the transmitter 285', 287', 283', 284', 288', 291'—is provided. In still other cases, where the outer wheel is driven, a relative movement between the inner wheel 6 and the tooth belt—and thereby the transmitter 285', 287', 283', 284', 288', 291'—is provided. The transmitter 285', 287', 283', 284', 288', 291' is then driven by the tooth belt.

The output ring 269 is rigidly connected to an output drive such as a rim flange.

On the motor-side eccentric cam 283' four adjustment slits 301 are provided, which are oriented at a right angle to a radius of the motor-side eccentric cam 283'. Guiding cylinders are provided in the adjustment slits 301. Holes, that are provided in the gear side eccentric cam 291', are shaped as oblong holes. The mechanism of adjustment and tightening of the tooth rim is analogous to the previous description with reference to FIG. 36.

FIG. 48 shows a cross section through the harmonic chain gear of FIG. 47 along an angled plane, such that half of the plane cuts in front of the inner wheel 6 and the other half cuts in front of the motor-side dragger disk 285'. The position of the dragger disks 285' and 287' is such that the two opposing dragger regions lie at the border of the two halves of the cross section. It can be seen that the adjustment slit is in the direction of a line which connects the dragging regions.

FIG. 49 shows a cross section through the harmonic chain gear of FIG. 47, wherein the cutting plane runs through the symmetry axis 10 and the opposing dragger regions. Part of the tooth belt 310 is shown in the dragger regions. Two of the four screws with which the eccentric cams are fixed to the rotor 5 are seen in cross section, as are two of the six screws with which the inner wheel 6 is fixed to the stator 22.

For the embodiments which are shown or described in this application, it is in principle possible to use all types of electric motors together with the harmonic chain drive gear. Brushless DC motors in which the rotor is provided with permanent magnets can be simple and at the same time advantageous in this arrangement. To this end the stator has coil windings, as shown in the embodiments, to which a suitably pulsed direct voltage is applied, and generates an alternating magnetic field which cooperates with the permanent magnets which in turn causes the rotor to rotate. In this arrangement it is possible to provide sensors in the region of the rotor in the form of auxiliary coils or Hall sensors to determine the momentary position of the rotor taken into account in controlling the current through the coil windings. Sensor-less motor designs are also conceivable in which the current rotor position is determined by an induction voltage in a coil or coils of the stator.

In further versions it is possible to use synchronous motors or asynchronous motors together with the harmonic chain drive gear as disclosed in the application. In such cases they are often referred to as AC motors. Asynchronous motors have the advantage that they can be operated without brushes because a rotating electromagnetic field entrains the rotor which is designed as a short-circuit winding in which the alternating field induces a magnetic field.

Alternatively it is also possible to use DC motors in which brushes are used to apply current to the rotor coil.

The coils in the rotor and the stator of synchronous motors and DC motors can be operated in series or in parallel. In principle all combinations are conceivable, i.e. synchronous series motors, synchronous parallel or shunt motors, DC series motors and DC parallel or shunt motors. Synchronous motors can also be fitted with a permanent magnet as the rotor, in which case a combination with a rotor coil is also conceivable.

Synchronous motors which can be operated in parallel have a torque curve which is largely constant in relation to speed. Conversely, the available torque of a synchronous motor operated in series rises as speed increases.

With asynchronous motors and also with synchronous parallel motors a tipping point is observed at which a maximum torque is reached. When the speed falls below a certain level, the available torque decreases. In rotary-current motors in particular angle of rotation has no particular influence on stationary torque.

In motors with series connection behaviour a stronger fall in speed can be observed under load. Motors with series connection behaviour are therefore particularly suitable for the subject matter of the application because operating without switchgear, i.e. with a fixed speed reduction, is possible over a wide speed range.

Here DC series motors which develop a very high speed at low load, but in which the speed then drops sharply as load increases, have proved particularly successful. They produce a high-speed drive with high starting torque which is particularly desirable when driving vehicles. When starting from stationary a series motor and in particular a DC series motor has a high torque which permits high starting acceleration. The speed can reach very high levels entirely without load. An electronic control unit advantageously counters this by reducing power through the application of a lower drive voltage to the motor.

With appropriate switching to control the coils of the stator of an asynchronous motor it is possible to generate similar properties, there is also the advantage that no collector and no brushes are required to drive the rotor. In fact, this results in a more robust short-circuit rotor of simple design which has a characteristic curve similar to that of the series motor.

In terms of the structural design of the electric motor, both double and single split axial motors are possible. A radial motor with an inner rotor or an outer rotor is also conceivable. Outer rotors have the advantage of a higher moment of inertia which has a favourable effect on the running smoothness of the drive unit it forms. Combinations of axial motors and radial motors are also conceivable, in particular when they are designed as outer rotors.

The subject matter of the application can be realised with a wide range of electric motor types including AC motors, DC motors, brushless DC motors, series-wound motors, shunt-wound motors, synchronous motors and asynchronous motors. Internal combustion engines such as piston engines or even combustion turbines can also be used.

The above mentioned types of electric motors can in principle also be used as a generator, wherein the part of the gear that is connected with the main shaft of the motor is the output shaft of the gear.

The gear can also be employed to use a slow-speed drive unit such as a water turbine or wind turbine, to drive a generator at a relatively high speed.

Alternatively, the gear can also be employed to use a high-speed drive unit such as an internal combustion engine or a gas or fuel combustion turbine to drive a generator at a relatively low speed.

The embodiments of the application which have been described above have in principle in common an outer wheel and an inner wheel, whereby a traction means extends between the inner periphery of the outer wheel and the outer periphery of the inner wheel. Commonly used traction means include plastic or metal chains, toothed belts and deformable metal or plastic cylinders or other elliptic shapes. In the case of a driven transmitter, the traction means is lifted off the outer periphery of the inner wheel and pushed against the inner periphery of the outer wheel, thereby creating a relative movement between the inner wheel and the outer wheel. In cases where the inner wheel is driven, a relative movement between the outer wheel and the traction means—and thereby the transmitter—is provided. In still other cases, where the outer wheel is driven, a relative movement between the inner wheel and the traction means—and thereby the transmitter—is provided. The transmitter is then driven by the traction means.

The application also covers a further embodiment in which a pressure means or pushing means for transmitting mainly compression forces is provided in place of a traction means which transmits mainly tensile forces between the inner wheel and the outer wheel. Metal or plastic cylinders or other elliptic shapes are often used as a pressure means. Such a gear then has an input shaft and an output shaft, the gear having an outer wheel, an inner wheel arranged concentrically in relation to the outer wheel and the pressure means extending between the outer wheel and the inner wheel, and at least one revolving transmitter which urges or pushes the pressure means away from the inner periphery of the outer wheel and towards the outer periphery of the inner wheel. In the case of a driven transmitter, the pressure means is pushed off the outer periphery of the inner wheel and pushed against the inner periphery of the outer wheel, thereby creating a relative movement between the inner wheel and the outer wheel. In cases, where the inner wheel is driven, a relative movement between the outer wheel and the traction means—and thereby the transmitter—is provided. In still other cases, where the outer wheel is driven, a relative movement between the inner wheel and the pressure means—and thereby the transmitter—is provided. The transmitter is then driven by the pressure means.

The pressure means may be designed as a flexible metal sheath which is able to transmit thrust forces and bending moments. Where this is the case the transmitters lie against the outside of the sheath and drag it from tooth to tooth. The subject matter of the application also relates to a harmonic chain gear in which the transmitters are mounted on shafts such that they are able to rotate and the shafts are provided on the transmitter carrier. In this arrangement, the transmitters may be designed as gear wheels or rollers.

In an axially asymmetric one row gear design such as in the embodiments of FIGS. 1-22 and in FIG. 35, the traction means respectively the pressure means has one single radial section that is provided both for the contact with the outer wheel and for the inner wheel. In the one row gear design, the transmitter generally contacts the traction means respectively the pressure means from within the gap between the inner wheel and the outer wheel. The transmitter, the inner wheel, the outer wheel as well as the traction means respectively the pressure means are located essentially in the same axial plane.

In an axially asymmetric two row gear design such as in the embodiments of FIG. 23, FIGS. 26-34, and FIGS. 47-49, the inner wheel and the outer wheel are often located in different axial planes, wherein the transmitter is either located in the axial plane of the inner wheel or in the axial plane of the outer wheel. The traction means respectively the pressure means extends axially between the axial planes of the inner wheel and the outer wheel, contacting both the inner wheel and the outer wheel at different sections of their respective circumferences.

In a three row gear design such as in the embodiments of FIGS. 36-46, the two pairs of an inner wheel and an outer wheel are located in different axial planes, wherein the transmitter is located in a third axial plane between the two pairs of an inner wheel and an outer wheel.

In a further embodiment which is not shown in the Figures, a three row gear design is provided with two inner wheels and one outer wheel or—alternatively—also with two outer wheels and one inner wheel.

It is also possible to provide a three row gear design with one inner wheel and one outer wheel. As shown in FIGS. 24-25, it is then also possible to provide a double row transmitter with two transmitter sections, wherein each transmitter section is provided in an axial plane which is different from the axial plane of the inner wheel. The traction means respectively the pressure means extends axially between the axial planes of the outer wheels and the inner wheel, contacting both the inner wheel and the outer wheels at different sections of their respective circumferences.

It is also possible, despite not being shown in the Figures, to provide an axially symmetric three row gear design with two outer wheels and one inner wheel, that are located in different axial planes, wherein the transmitter is located in the axial plane of the inner wheel. It is then also possible to provide a double row transmitter with two transmitter sections, wherein each transmitter section is provided in the axial plane of each outer wheel. The traction means respectively the pressure means extends axially between the axial planes of the inner wheels and the outer wheel, contacting both the inner wheels and the outer wheel at different sections of their respective circumferences.

In short, combinations of any number of inner wheels and any number of outer wheels are possible, wherein a single row transmitter or a multiple row transmitter with multiple transmitter sections can be used. The embodiments show only some of the many combinations that are disclosed in the present application.

The invention claimed is:

1. A gear comprising:
an input shaft;
an output shaft
an outer wheel comprising teeth;
an inner wheel positioned concentrically in relation to the outer wheel, the inner wheel comprising teeth;
a pressure means extending between an inner periphery of the outer wheel and an outer periphery of the inner wheel, the pressure means comprising a tooth belt with inner and outer toothing, a plurality of teeth of the inner and outer toothing of the tooth belt engaging the teeth of the outer wheel and the inner wheel; and at least one revolving transmitter comprising:
- a motor-side dragger disk comprising a motor-side eccentric cam and a motor-side eccentric cam bearing; and
- a gear-side dragger disk comprising a gear-side eccentric cam and a gear-side eccentric cam bearing; and wherein the motor-side dragger disk and the gear-side dragger disk are shaped as circular disks; and wherein the input shaft is connected to the transmitter such that the transmitter is configured to lift the tooth belt off of the outer periphery of the inner wheel and to push the tooth belt against the inner periphery of the outer wheel to create relative movement between the inner wheel and the outer wheel when driven by the input shaft.

2. The gear of claim 1, characterised in that the output shaft is connected to the inner wheel.

3. The gear of claim 1, characterised in that the output shaft is connected to the outer wheel.

4. A motor-gear unit with the gear of claim 1, the motor-gear unit comprising an electric motor, a rotor of the electric motor being connected to the input shaft of the gear.

5. The motor-gear unit of claim 4, characterised in that the electric motor is a DC brushless motor with a radial gap.

6. A motor-gear unit with the gear of claim 1, the motor-gear unit comprising an internal combustion engine, an output shaft of the engine being connected to the input shaft of the gear.

7. A vehicle comprising the motor-gear unit of claim 4, characterised in that at least one driven wheel of the vehicle is connected to the output shaft of the gear.

8. An electric generator with a drive unit and with a generator unit and with the gear of claim 1, an input shaft of the gear being connected to the drive unit and an output shaft of the gear being connected to an input shaft of the generator.

* * * * *